(12) United States Patent
Smith et al.

(10) Patent No.: US 11,637,746 B2
(45) Date of Patent: Apr. 25, 2023

(54) OBJECT IDENTIFICATION FOR GROUPS OF IOT DEVICES

(71) Applicant: INTEL CORPORATION, Santa Clara, CA (US)

(72) Inventors: Ned M. Smith, Beaverton, OR (US); Mark Kelly, Leixlip (IE); Michael Nolan, Maynooth (IE); Davide Carboni, London (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/459,653

(22) Filed: Aug. 27, 2021

(65) Prior Publication Data

US 2022/0255796 A1    Aug. 11, 2022

Related U.S. Application Data

(63) Continuation of application No. 16/466,992, filed as application No. PCT/US2017/068828 on Dec. 28, 2017, now Pat. No. 11,108,627.

(Continued)

(51) Int. Cl.
*G06F 15/173* (2006.01)
*H04L 41/0806* (2022.01)
(Continued)

(52) U.S. Cl.
CPC ...... *H04L 41/0806* (2013.01); *G06F 16/1824* (2019.01); *G06F 16/1834* (2019.01);
(Continued)

(58) Field of Classification Search
CPC ... H04L 41/0806; H04L 67/10; H04L 67/104; H04L 67/562; H04L 67/1046;
(Continued)

(56) References Cited

U.S. PATENT DOCUMENTS

| 6,058,383 A | 5/2000 | Narasimhalu et al. |
| 8,996,459 B2 | 3/2015 | Arthursson et al. |

(Continued)

FOREIGN PATENT DOCUMENTS

| EP | 2566204 | 3/2013 |
| WO | 20065800 | 11/2000 |

(Continued)

OTHER PUBLICATIONS

European Patent Office, "Communication under Rule 94(3) EPC", issued in connection with European Patent Application No. 17835980.8, dated Mar. 29, 2021, (4 pages).

(Continued)

*Primary Examiner* — Yves Dalencourt
(74) *Attorney, Agent, or Firm* — Hanley, Flight & Zimmerman, LLC

(57) ABSTRACT

An Internet of Things (IoT) network composite object includes a device owner with name server and sub-object list, sub-objects, and a blockchain recording the sub-objects. An IoT network composite object includes a device owner with composite object type name server, and blockchain. An IoT network coalition group includes coalition group name server, coalition group member list, and blockchain. An IoT network apparatus includes device identity generator, message publisher, network applier, device describer, and packer sender. An IoT network apparatus includes a device registrar to register device to first network through a portal to second network, device joiner, token requester, and authentication request sender. An IoT network apparatus includes an identity verifier to verify the identity of an authentication request, and an authentication request response returner. An IoT network apparatus including a caller entity credential issuer, an object entity provisioner, credential presenter, and access control list policy applier.

26 Claims, 45 Drawing Sheets

Related U.S. Application Data

(60) Provisional application No. 62/441,070, filed on Dec. 30, 2016.

(51) Int. Cl.

| | | |
|---|---|---|
| *H04L 67/10* | (2022.01) | |
| *H04L 67/12* | (2022.01) | |
| *H04W 4/70* | (2018.01) | |
| *G06F 16/182* | (2019.01) | |
| *H04L 9/08* | (2006.01) | |
| *H04L 9/32* | (2006.01) | |
| *H04L 45/00* | (2022.01) | |
| *H04L 67/104* | (2022.01) | |
| *H04L 69/18* | (2022.01) | |
| *H04W 4/08* | (2009.01) | |
| *H04W 84/22* | (2009.01) | |
| *H04L 41/12* | (2022.01) | |
| *H04L 69/22* | (2022.01) | |
| *H04L 67/1087* | (2022.01) | |
| *H04W 12/69* | (2021.01) | |
| *H04L 61/4505* | (2022.01) | |
| *H04L 61/5069* | (2022.01) | |
| *H04L 67/562* | (2022.01) | |
| *H04W 84/18* | (2009.01) | |
| *H04L 9/00* | (2022.01) | |

(52) U.S. Cl.
CPC .......... *H04L 9/0825* (2013.01); *H04L 9/3239* (2013.01); *H04L 41/12* (2013.01); *H04L 45/20* (2013.01); *H04L 61/4505* (2022.05); *H04L 61/5069* (2022.05); *H04L 67/10* (2013.01); *H04L 67/104* (2013.01); *H04L 67/1046* (2013.01); *H04L 67/1093* (2013.01); *H04L 67/12* (2013.01); *H04L 67/562* (2022.05); *H04L 69/18* (2013.01); *H04L 69/22* (2013.01); *H04W 4/08* (2013.01); *H04W 4/70* (2018.02); *H04W 12/69* (2021.01); *H04W 84/22* (2013.01); *H04L 9/50* (2022.05); *H04L 2209/56* (2013.01); *H04W 84/18* (2013.01)

(58) Field of Classification Search
CPC ............. H04L 67/1093; H04L 61/4505; H04L 61/5069; H04L 69/22; H04W 4/08; H04W 4/70; H04W 84/18; H04W 84/22; G06F 16/1824; G06F 16/1834
USPC ........................................................ 709/223
See application file for complete search history.

(56) References Cited

U.S. PATENT DOCUMENTS

| | | | |
|---|---|---|---|
| 10,425,414 B1 | 9/2019 | Buckingham et al. | |
| 11,108,627 B2 | 8/2021 | Smith et al. | |
| 11,282,139 B1* | 3/2022 | Winklevoss | G06Q 40/04 |
| 2002/0031230 A1* | 3/2002 | Sweet | H04L 63/061 |
| | | | 380/278 |
| 2004/0081203 A1 | 4/2004 | Sodder et al. | |
| 2007/0233881 A1 | 10/2007 | Nochta et al. | |
| 2012/0210066 A1 | 8/2012 | Joshi et al. | |
| 2013/0346842 A1 | 12/2013 | Koara | |
| 2015/0156266 A1 | 6/2015 | Gupta | |
| 2015/0244690 A1 | 8/2015 | Mossbarger | |
| 2016/0182497 A1 | 6/2016 | Smith | |
| 2016/0191345 A1 | 6/2016 | Despotovic et al. | |
| 2016/0275461 A1 | 9/2016 | Sprague et al. | |
| 2016/0380968 A1 | 12/2016 | Sarwar et al. | |
| 2018/0117446 A1 | 5/2018 | Tran et al. | |
| 2018/0285879 A1 | 10/2018 | Gadnis et al. | |

FOREIGN PATENT DOCUMENTS

| | | |
|---|---|---|
| WO | 2004073281 | 8/2004 |
| WO | 2009141385 | 11/2009 |
| WO | 2015126734 | 8/2015 |
| WO | 2015130752 | 9/2015 |
| WO | 2017066002 | 4/2017 |
| WO | 2018125989 | 7/2018 |
| WO | 2018126029 | 7/2018 |
| WO | 2018126065 | 7/2018 |
| WO | 2018126075 | 7/2018 |
| WO | 2018126076 | 7/2018 |
| WO | 2018126077 | 7/2018 |

OTHER PUBLICATIONS

International Search Report for related PCT Application PCT/US2017068806 with a completion dale of Mar. 14, 2018 and dated Mar. 21, 2018, 3 pages.

Kim et al; "Increasing Web Server Throughput with Network Interface Data Caching"; Computer Systems Laboratory, Rice University Houston Texas; Operating Systems Review, vol. 36 No. 5; ACM Oct. 2002.

International Search Report for related PCT Application PCT/US2017068830 with a completion date of Mar. 14, 2018 and dated Mar. 22, 2018, 2 pages.

Ergen et al; "MAC Protocol Engine for Sensor Networks" Global Telecommunications Conference Nov. 2009 GLOBECOM, Piscataway New Jersey. 17 pages.

International Search Report for related PCT Application PCT/US2017/068828 with a completion dale of Mar. 22, 2018 and dated Mar. 29, 2018, 3 pages.

Hardjono et al; "Cloud-Based Commissioning of Constrained Devices using Permissioned Blockchains" Proceedings of ACM IoT Privacy, Trust & Security—IoTPTS 2016 Xi'an, China, May 2016, 8 pages.

International Search Report for related PCT Application PCT/US2017/068743 with a completion date of Jun. 28, 2018 and dated Jul. 6, 2018, 6 pages.

Hardjono et al; "Anonymous Identities for Permissioned Blockchains" (Draft v06C—Jan. 24, 2016—Please Do Not Distribute) 16 pages, retrieved from the internet on May 31, 2019 hllps://pdfs.semanticscholar.org/2ef6/t1571 f3d0a9927fbe29363a8038b0d 148f881.pdf.

Hardjono et al; "Verifiable Anonymous Identities and Access Control in Permissioned Blockchains" Draft Apr. 17, 2016, retrieved from the internet on May 31, 2019 hllps://arxiv.org/pdf/1903.04584.pdf, 9 pages.

Antonopoulos, Andreas M. "Mastering Bilcoin: Unlocking Digital Cryptocurrencies" Chapter 9, Dec. 20, 2014 O'Reilly Publishing. Tokyo Japan.

International Search Report for related PCT Application PCT/US2017068683 with a completion dale of Jul. 1, 2018 and dated Jul. 7, 2018, 7 pages.

International Search Report for related PCT Application PCT/US2017/068832 with a completion date of Mar. 15, 2018 and dated May 17, 2018, 4 pages.

Fromknecht et al;"A Decentralized Public Key Infrastructure with Identity Retention" Published in IACR Cryptology ePrint Archive Nov. 2014, 16 pages.

Fromknecht et al; "CertCoin:A NameCoin Based Decentralized Authentication System 6.857 Class Project" May 2014, retrieved from the Internet on Jun. 3, 2019 https://courses.csail.mil.edu/6.857/2014/files/19-fromknecht-velicann-yakoubov-certcoin.pdf 19 pages.

United States Patent and Trademark Office, "Non-Final Office Action", issued in connection with U.S. Appl. No. 16/466,992, dated Aug. 21, 2020, (11 pages).

United States Patent and Trademark Office, "Notice of Allowance", issued in connection with U.S. Appl. No. 16/466,992, dated Apr. 19, 2021, (7 pages).

European Patent Office, "Communication under Rule 94(3) EPC", issued in connection with European Patent Application No. 17835980.8, May 4, 2022, (5 pages).

(56) References Cited

OTHER PUBLICATIONS

China Patent Office, "The First Office Action", issued in connection with China Patent Application No. 201780074210.7, dated Apr. 15, 2022, (16 pages).
National Intellectual Property Adminstration, P. R. China, "Second Office Action," issued in connection with Chinese Patent Application No. 201780074210.7, dated Sep. 26, 2022, 15 pages.
National Intellectual Property Adminstration, P. R. China, "Decision of Rejection," issued in connection with Chinese Patent Application No. 201780074210.7, dated Jan. 19, 2023, 10 pages.

* cited by examiner

200

500

700

3500

| Caller | Permission | Target |
|---|---|---|
| -PlatformID<br>-DeviceID<br>> type=ocf.dt.any<br>-Collection_Href<br>> type=ocf.rt.col<br>> interface=ocf.if.b<br>-Resource_Href<br>> type=!ocf.rt.col<br>> interface=!ocf.if.b<br>-Record_index<br>--Property_name_or_ID | CRUDN<br>Or<br>CRUDON | -PlatformID<br>-DeviceID<br>> type=ocf.dt.any<br>-Collection_Href<br>> type=ocf.rt.col<br>> interface=ocf.if.b<br>-Resource_Href<br>> type=!ocf.rt.col<br>> interface=!ocf.if.b<br>-Record_index<br>-Property_name_or_ID |

FIG. 40

OBJECT IDENTIFICATION FOR GROUPS OF IOT DEVICES

CROSS REFERENCE TO RELATED APPLICATIONS

This patent arises from a continuation of U.S. patent application Ser. No. 16/466,992 (now U.S. Pat. No. 11,108,627) which was filed on Jun. 5, 2019, which arises from a national stage application of PCT Application No. PCT/US2017/068828, which was filed on Dec. 28, 2017, which claims the benefit of U.S. Provisional Patent Application No. 62/441,070, which was filed on Dec. 30, 2016. U.S. patent application Ser. No. 16/466,992, PCT Application No. PCT/US2017/068828, and U.S. Provisional Patent Application No. 62/441,070 are hereby incorporated herein by reference in their entireties. Priority to U.S. patent application Ser. No. 16/466,992, PCT Application No. PCT/US2017/068828, and U.S. Provisional Patent Application No. 62/441,070 is hereby claimed.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

FIG. 40 is a schematic diagram of logical division for access control in an IoT object in accordance with some embodiments.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
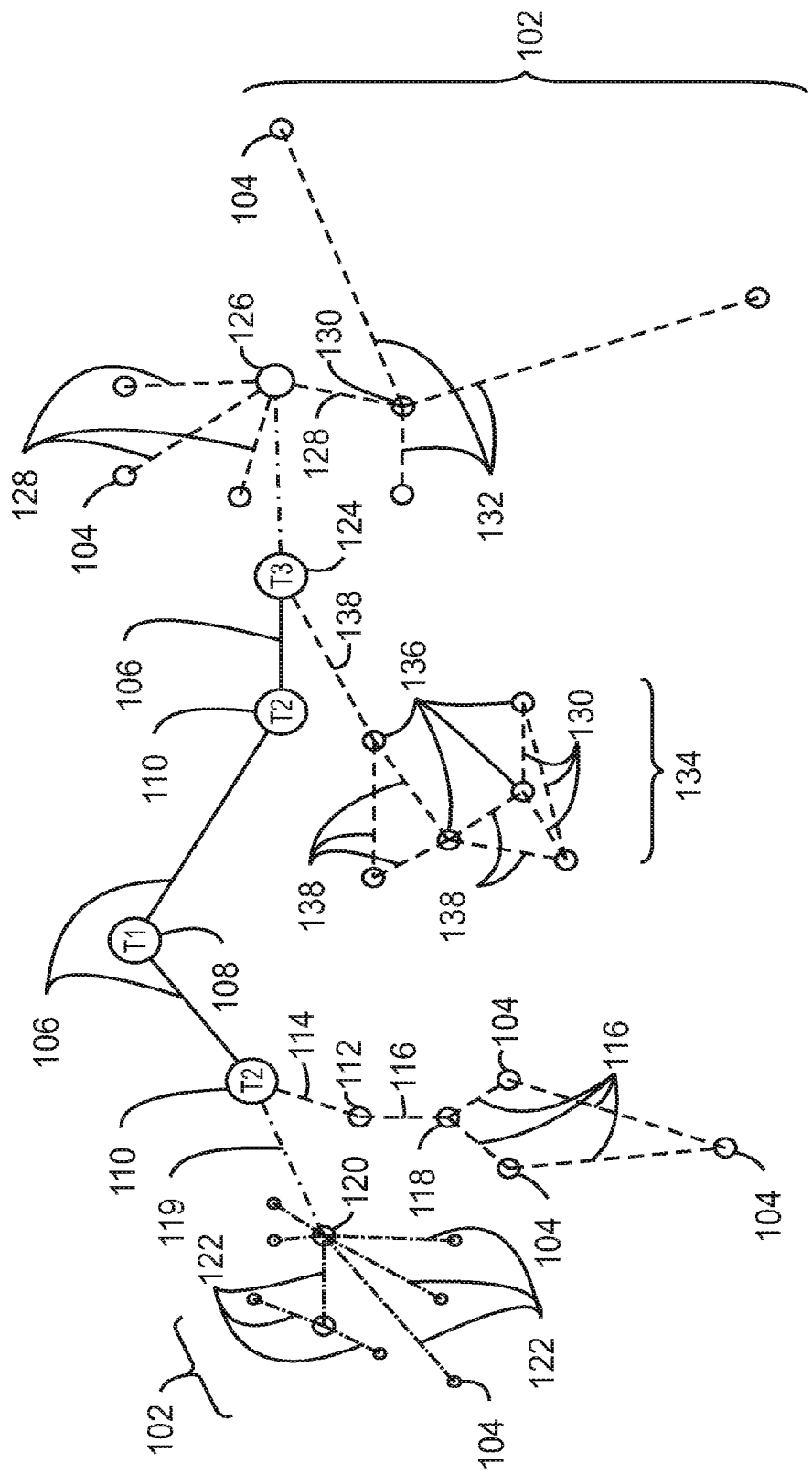
FIG. 1 is a drawing of interconnections that may be present in the Internet in accordance with some embodiments.
Figure 2:
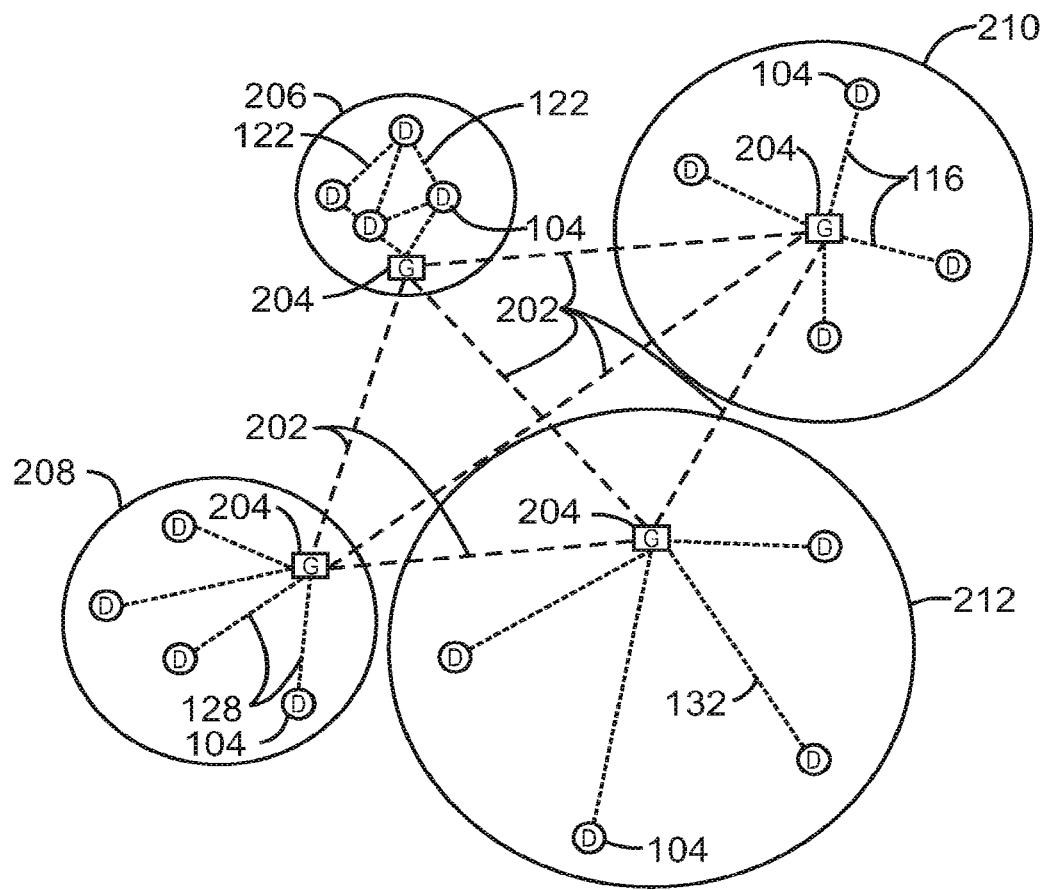
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 8.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
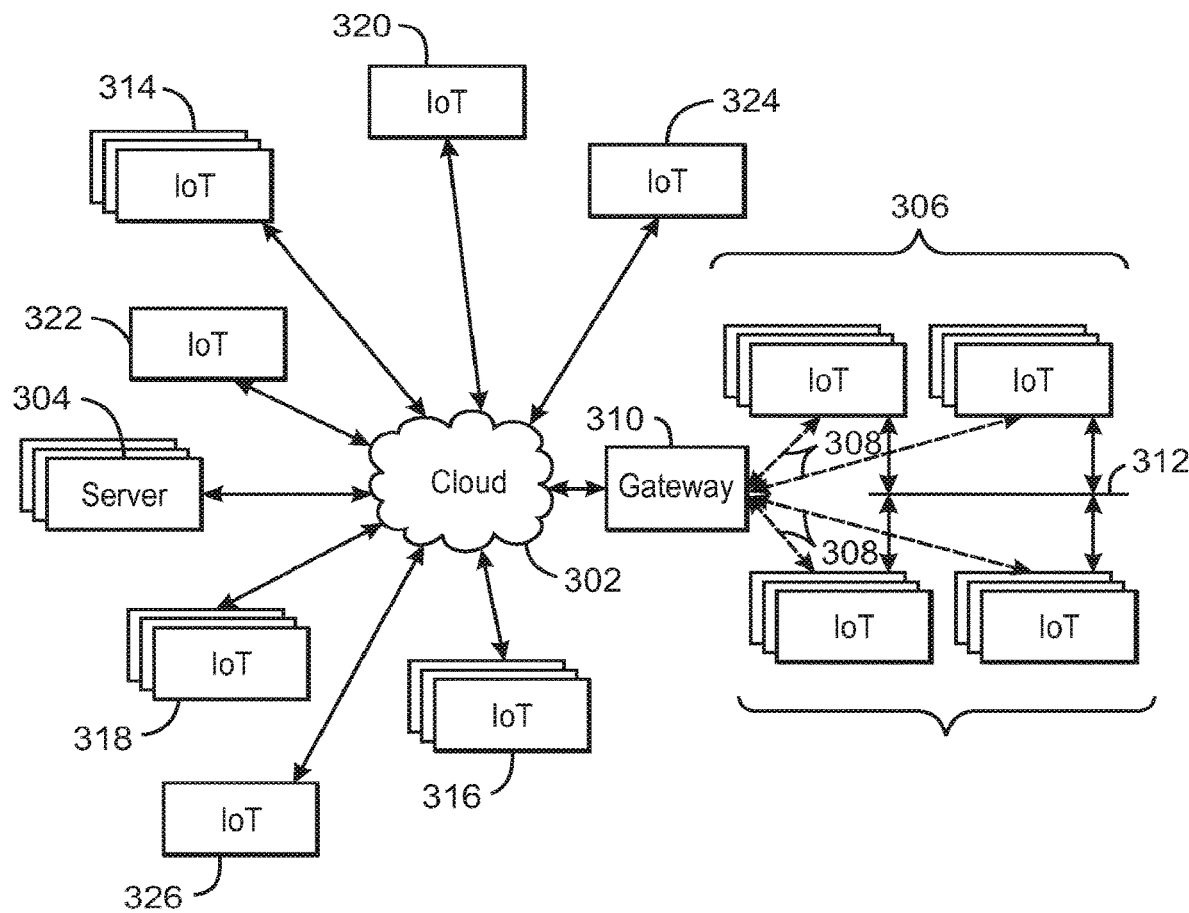
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
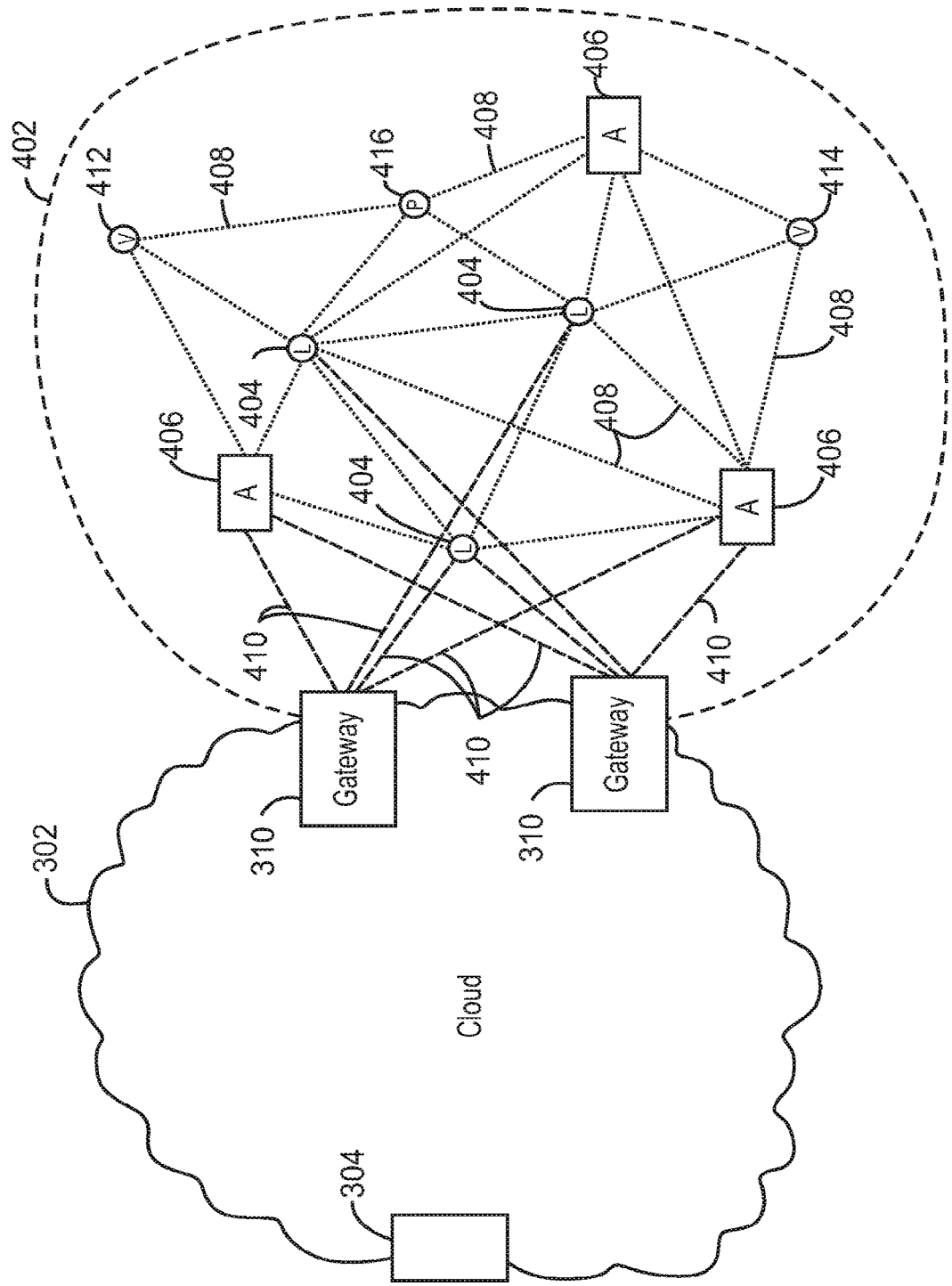
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
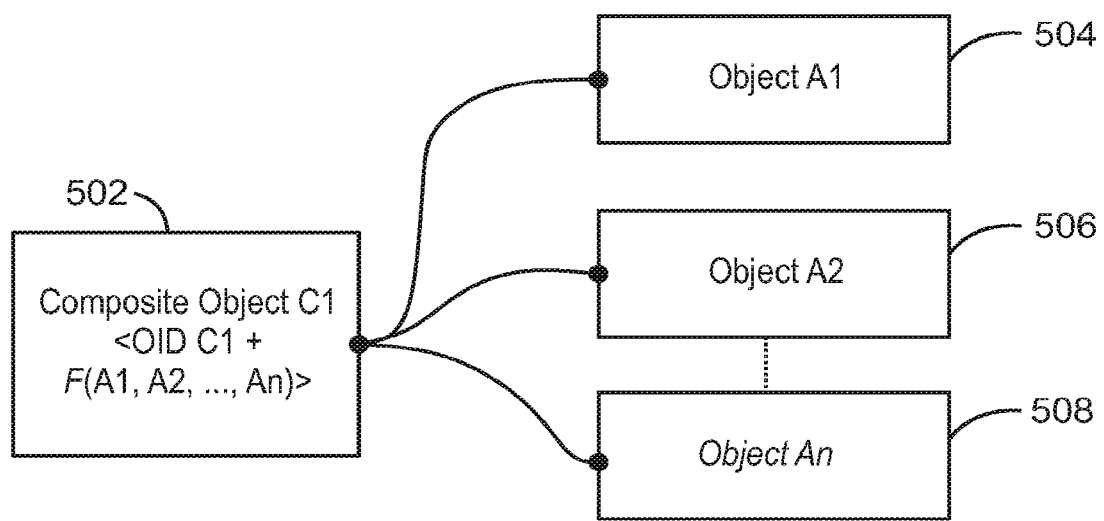
FIG. 5 is a schematic drawing showing the formation of a composite object from a number of atomic objects in accordance with some embodiments.

FIG. 5 is a schematic drawing 500 showing the formation of a composite object 502 from a number of atomic objects 504, 506, and 508 in accordance with some embodiments. An object includes a data model representation of functionality, state and interface semantics that make up a node of a distributed system. As used herein, an object, or IoT object, may be a physical device made up of IoT devices, a virtual device formed from a group of physical or virtual devices, or any number of other configurations.

Objects may interact to accomplish a larger function, goal or workflow. Objects may be identified in terms of their type, e.g., the function performed, and instance, e.g., presence.

Multiple object instances may have the same type identity, but may have unique instance identities. Further, multiple object instances may be organized into groups where an instance of the grouping may have an identity. A group of objects that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The object may last as long as a single device, such as a refrigerator, or only until a current function is completed. For example, a refrigerator may be regarded as a composite object 502 consisting of multiple other objects, such as a light, a compressor, a temperature sensor, a thermostat, a water dispenser, an ice maker, and the like. The other objects may each be atomic objects 504, 506, and 508, or may themselves be composite objects 502. The ice maker may be composite object 502 formed from atomic objects 504, 506, and 508, such as a temperature sensor, a thermostat, a solenoid-operated water valve, a timer, an ice tray, and the like. An example of a virtual composite object 502 made up of a number of physical devices is the intersection and the emergency cluster, described with respect to FIG. 4.

Accordingly, object identity may be understood in context of three abstractions: object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Figure 6:
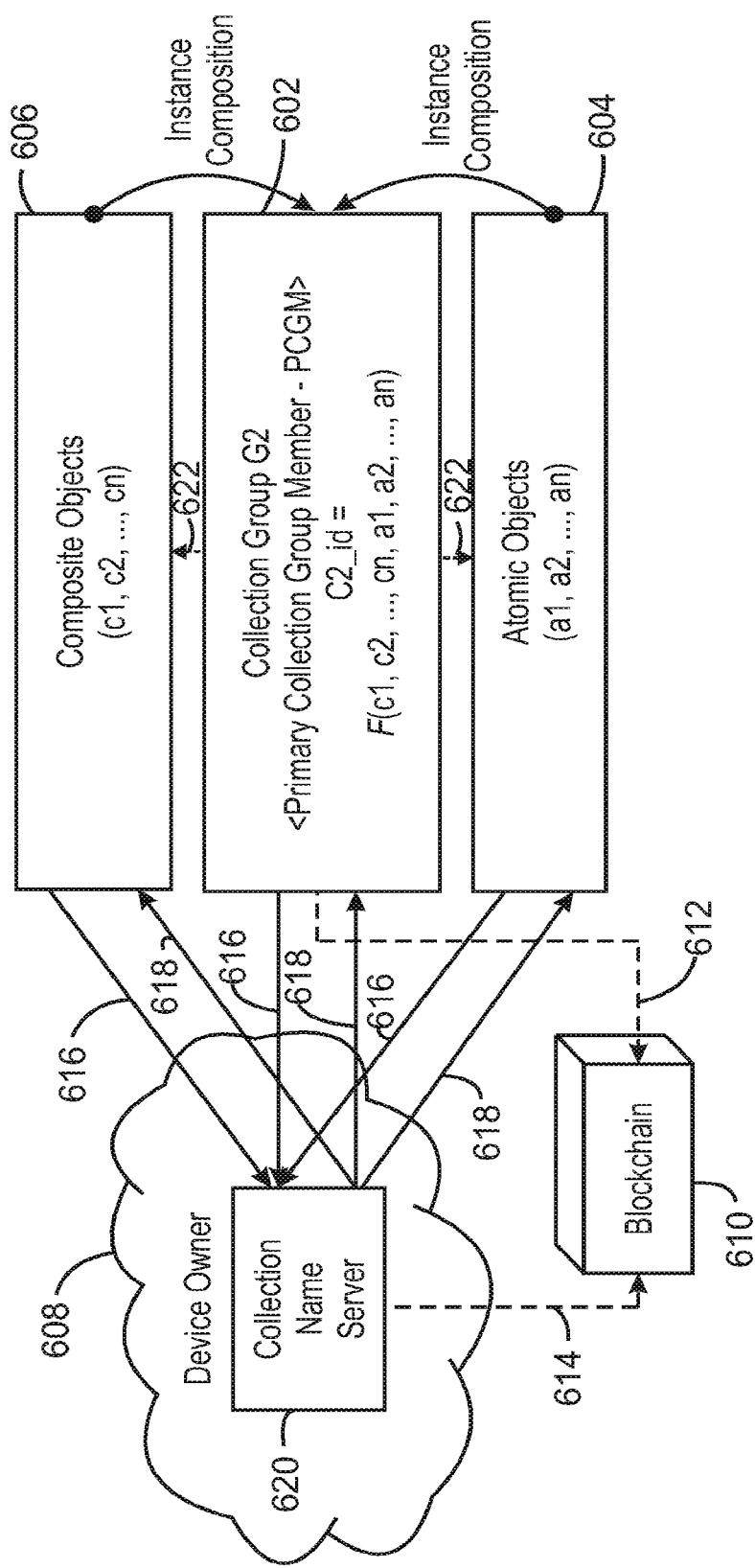
FIG. 6 is a schematic drawing of the formation of a group object from a collection of atomic objects and composite objects in accordance with some embodiments.

FIG. 6 is a schematic drawing 600 of the formation of a group object 602 from a collection of atomic objects 604 and composite objects 606. The group object 602 belongs to an object class, which is a subset of the object type. An object class, for example, might be a heat exchanger, while an object type of the class heat exchanger may be a more specific device, such as a refrigerator, a heat pump, an air-conditioner, an evaporative cooler, and the like.

Authenticating an object class may be facilitated using EPID (Enhanced Privacy ID), which is an asymmetric encryption system involving a single public key matched to multiple private keys. A signature generated by any of the private keys can be verified with the single public key. Thus, the group object 602 may have a single public key, while each of the atomic objects 604 and composite objects 606 are issued a unique private ID. The system is not limited to using EPID, but may use other identification techniques, such as shared access signatures.

If an object class is associated with a number corresponding to an EPID group ID (gid) and object instances of the same type are issued private keys corresponding to the EPID group, object instances may authenticate its class to a verifier. Object class authentication is a form of attestation that allows others to interact with the object based on typed rules. This is also known in the industry as type-enforcement. Construction of a composite object class identifier using the type identifiers of its component objects is an object type extensibility method. For example, a function f( ) that accepts as arguments C=(c1, c2, c3, . . . cn), where cX are the object types for each of its component objects, produces an EPID gid value, C2_id, that represents the type identifier of the composite object. The implementation of f( ) may include using a cryptographic hash of each cx in C. In another example, f( ) may use an OID (Object Identifer) naming hierarchy where each cx is an OID subtree of a parent OID for C. There may be other methods for computing f( ) as well.

Extensible composite object class identifiers allow systems of IoT objects to be combined at any time during the lifetime of the device owner 608 hosting the objects. A blockchain 610 may track the evolution of composed objects such that authoring tools may be informed by pre-existing compositions. A distributed schema library may be formed using the blockchain 610 by supplying a transaction 612 registering the object type identifier, e.g., gid, with the composite object definition, for example, C. Current centralized object repository schemes often depend on a single logical service that authoritatively maintains class definitions on central servers. However, a modification to the central servers could result in unauthorized schema changes. In comparison, the use of a blockchain 610 may ensures a threshold consensus exists across a number of IoT devices, for example, in a fog, before an existing object class definition can be changed.

The blockchain 610 facilitates identification of isomorphic object classifications. When a new object class is proposed, for example, in a message 614, the blockchain 610 can be searched to see if C already exists.

Composing a group object 602 from sub-objects, forming composite objects, is an extensibility mechanism for a IoT object model. Composed objects can be named using a function that relates the sub-objects, such as "intersection XYZ". The collection of object instances may form the group object 602 when each proposed member of the group sends a message 616 to obtain a message 218 including the credential that identifies the collection. When EPID is used as the credentialing mechanism, each object in the collection can interact with each other or other IoT devices as an agent of the collection.

The blockchain 610 is used by the system to remove the need for trust from the Name Server 620. If a group name is reused while a group of the same name is currently in use, the blockchain 610 may police the misfeasance of the Name Server 620. The reuse of a group name may be determined by the IoT devices that are storing and monitoring the blockchain 610. This determination may be made by identifying that a current name request overlaps a previous block that is active and includes the group name.

In some aspects, the primary collection group member (PCGM), or group object 602, is configured to determine the group name based on the particular configuration of the collection. The PCGM communicates 622 the group name to other collection members, for example, the composite objects 606 and the atomic objects 604, or another collection member, performs the same operations as the PCGM to arrive at the same group name. A function F( ) may compute the collection group name, C2_id, using a set membership logic so as to avoid differences in introspection order non-determinism when different members separately compute a group name.

As an example, the EPID group ID (gid) may take a 32-bit or 128-bit value. When a 32-bit value is used, the function F( ) may truncate the high-order 12 bytes. The Name Server 620 may verify if the gid is re-issued regardless of gid length. Shorter gid lengths may be useful in constrained environments, such as using more limited IoT devices. Though name collisions from F( ) may be rare, collision resolution may be achieved by recursive invocation of F( ) again supplying the group membership values (e.g., F'=F (m1, m2, . . . , mn, F(m1, m2, . . . , mn)).

Figure 7:
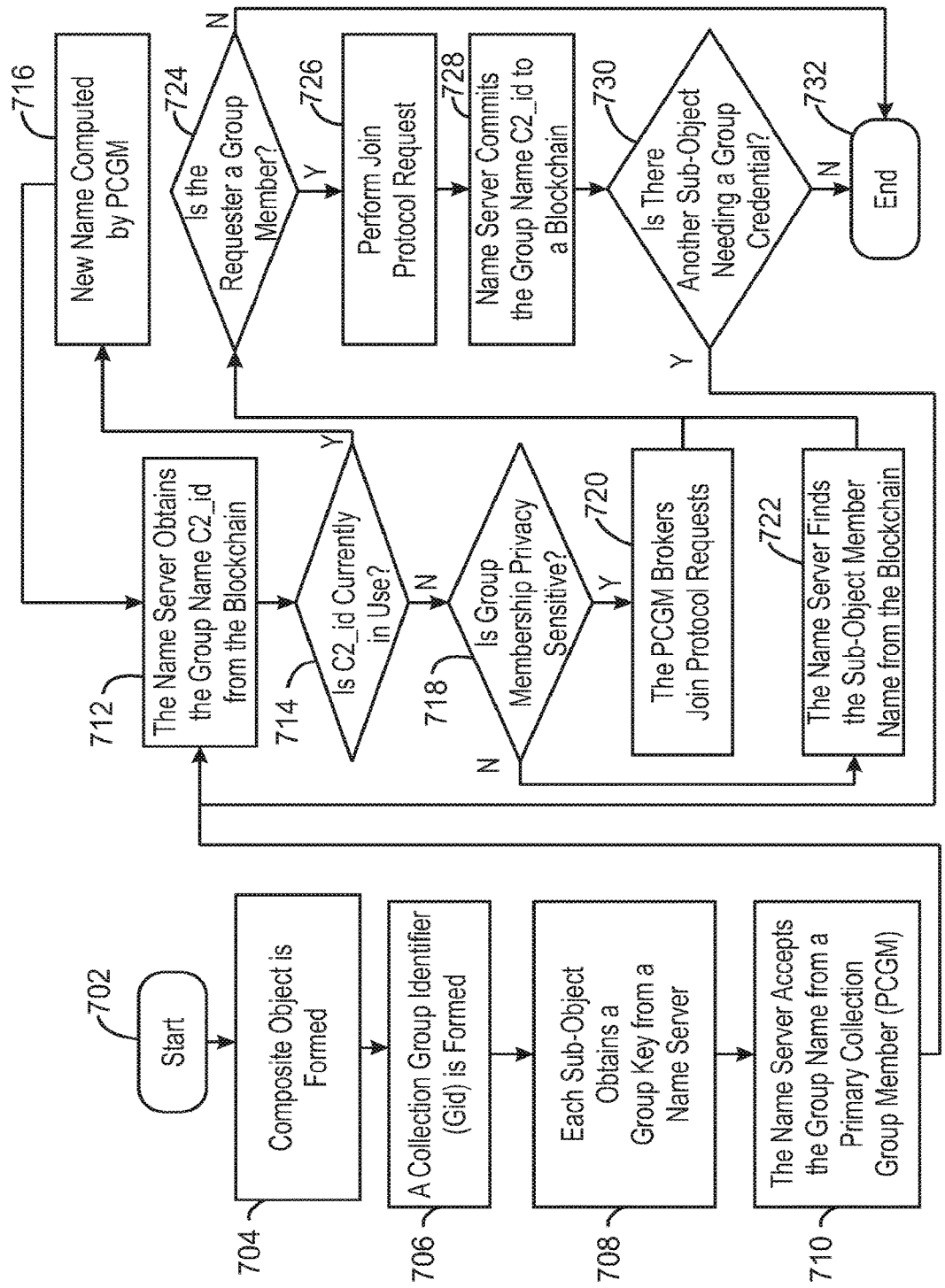
FIG. 7 is a process flow diagram of an example method for group creation using a collection of objects in accordance with some embodiments.

FIG. 7 is a process flow diagram of an example method 700 for group creation using a collection of objects in accordance with some embodiments. The method 700 may be run using the system 802 described with respect to FIG. 8. The block 702 represents, for example, when a new group object is desired. This may occur when a transient object moves proximate to a current group object, as described with respect to the emergency cluster of FIG. 4, which may be formed when an emergency vehicle approaches a street. In another example, the powering of a device, such as the refrigerator described with respect to FIGS. 5 and 6, may initiate the creation of a group object.

At block 704, a composite object is formed by maintaining a reference to the ID of each of the atomic (A) or composite (C) sub-objects that will make up the group object in a list in the primary collection group member (PCGM) of the composite object. The objects making up the composite object may be determined by the objects needed to accomplish the function, as determined by a consensus of the objects, by a previous program in a device owner, or by any number of other techniques, such as constructing an object with a number of IoT devices.

At block 706, a collection group identifier is formed. This may be done by applying a function to the list of object IDs in the PCGM that make up the group object. The function may combine and form a hash code of the object IDs, for example, C2_ID=SHA2(C1, C2, C3, . . . , A1, A2, A3, . . . , An).

At block 708, one or more of the sub-objects (for example, all of the sub-objects) communicates with a name server, for example, in the device owner, to obtain a group key. This may be performed by using an EPID join protocol. In the join protocol, the sub-object sends a join message to the name server, and receives an EPID credential, for example, for the C2_ID group object, in return.

At block 710, the group name server accepts the name calculated for the group from the list in the PCGM. The name server may then commit the name to a blockchain. At block 712, the name server gets the name, e.g., C2_ID, from the blockchain. As used herein, the blockchain is a distributed database of transactions saved at a number of individual IoT devices. The confirmation of the validity of the transactions may be performed by each of the IoT devices, providing multiple confirmations of authenticity and identity.

At block 714, a determination is made as to whether the name is already in use, for example, present in an earlier transaction block with no corresponding expiration of the name for the object. If so, at block 716, a new name may be determined by recursive invocation of FO, again supplying the group membership values, F'=F(m1, m2, . . . , mn, F(m1, m2, . . . , mn)).

If the name is not in current use, at block 718 a determination is made as to whether the group membership is privacy sensitive. This may be performed if the presence of an IoT device at a location should not be public knowledge, such as a vehicle being present at a series of intersections.

If so, at block 720 the PCGM acts as a proxy, brokering join protocol requests from sub-objects. If not, at block 722, the name server finds the sub-object member name from the blockchain.

At block 724, a determination is made as to whether a requester is an authorized group member. If so, at block 726 a join request is performed. At block 728, the name server commits the group name, e.g., C2_ID to a blockchain.

At block 730, a determination is made as to whether another sub-object exists and, thus, needs a group credential. If so, process flow returns to block 712 for the credentialing of the sub-object. If not, or if it was determined that a requester was not an authorized group member, the process ends at block 732.

Figure 8:
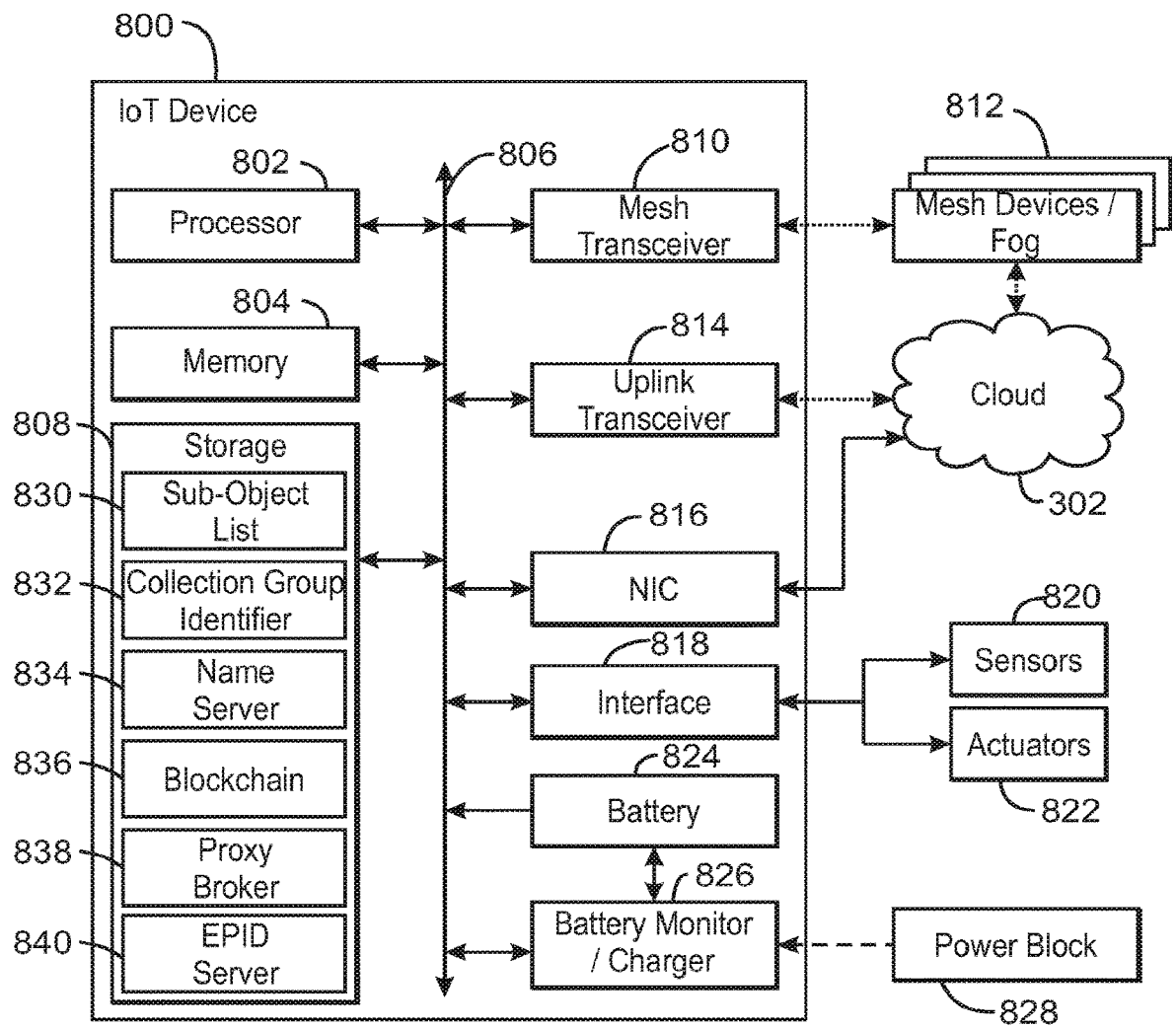
FIG. 8 is a block diagram of an example of components that may be present in an IoT device for offloading data in accordance with some embodiments.

FIG. 8 is a block diagram of an example of components that may be present in an IoT device 800 for offloading data. The IoT device 800 may include any combinations of the components shown in the example. The components may be implemented as ICs, portions thereof, discrete electronic devices, or other modules, logic, hardware, software, firmware, or a combination thereof adapted in the IoT device 800, or as components otherwise incorporated within a chassis of a larger system. The block diagram of FIG. 8 is intended to show a high level view of components of the IoT device 800. However, some of the components shown may be omitted, additional components may be present, and different arrangement of the components shown may occur in other implementations.

The IoT device 800 may include a processor 802, which may be a microprocessor, a multi-core processor, a multi-threaded processor, an ultra-low voltage processor, an embedded processor, or other known processing element. The processor 802 may be a part of a system on a chip (SoC) in which the processor 802 and other components are formed into a single integrated circuit, or a single package, such as the Edison™ or Galileo™ SoC boards from Intel. As an example, the processor 802 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 802 may communicate with a system memory 804 over a bus 806. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 808 may also be coupled to the processor 802 via the bus 806. To enable a thinner and lighter system design, the mass storage 808 may be implemented via a solid state drive (SSD). Other devices that may be used for the mass storage 808 include flash memory cards, such as SD cards, microSD cards, xD picture cards, and the like, and USB flash drives.

In low power implementations, the mass storage 808 may be on-die memory or registers associated with the processor 802. However, in some examples, the mass storage 808 may be implemented using a micro hard disk drive (HDD). Further, any number of new technologies may be used for the mass storage 808 in addition to, or instead of, the technologies described, such resistance change memories, phase change memories, holographic memories, or chemical memories, among others. For example, the IoT device 800 may incorporate the 3D XPOINT memories from Intel® and Micron®.

The components may communicate over the bus 806. The bus 806 may include any number of technologies, including industry standard architecture (ISA), extended ISA (EISA), peripheral component interconnect (PCI), peripheral component interconnect extended (PCIx), PCI express (PCIe), or any number of other technologies. The bus 806 may be a proprietary bus, for example, used in a SoC based system. Other bus systems may be included, such as an $I^2C$ interface, $I^3C$ interface, an SPI interface, point to point interfaces, and a power bus, among others.

The bus 806 may couple the processor 802 to a mesh transceiver 810, for communications with other mesh devices 812. The mesh transceiver 810 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 812. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 810 may communicate using multiple standards or radios for communications at different range. For example, the IoT device 800 may communicate with geographically proximate devices, e.g., within about 10 meters, using a local transceiver based on BLE, or another low power radio, to save power. More distant mesh devices 812, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 810 may be incorporated into an MCU as an address directly accessible by the chip, such as in the Curie® units available from Intel.

An uplink transceiver 814 may be included to communicate with devices in the cloud 302. The uplink transceiver 814 may be LPWA transceiver that follows the IEEE 802.15.4, IEEE 802.15.4g, IEEE 802.15.4e, IEEE 802.15.4k, or NB-IoT standards, among others. The IoT device 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 810 and uplink transceiver 814, as described herein. For example, the radio transceivers 810 and 812 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 810 and 812 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 814, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 816 may be included to provide a wired communication to the cloud 302 or to other devices, such as the mesh devices 812. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 816 may be included to allow connect to a second network, for example, a NIC 816 providing communications to the cloud over Ethernet, and a second NIC 816 providing communications to other devices over another type of network.

The bus 806 may couple the processor 802 to an interface 818 that is used to connect external devices. The external devices may include sensors 820, such as accelerometers, level sensors, flow sensors, temperature sensors, pressure sensors, barometric pressure sensors, and the like. The interface 818 may be used to connect the IoT device 800 to actuators 822, such as power switches, valve actuators, an audible sound generator, a visual warning device, and the like.

While not shown, various input/output (I/O) devices may be present within, or connected to, the IoT device 800. For example, a display may be included to show information, such as sensor readings or actuator position. An input device, such as a touch screen or keypad may be included to accept input.

A battery 824 may power the IoT device 800, although in examples in which the IoT device 800 is mounted in a fixed location, it may have a power supply coupled to an electrical grid. The battery 824 may be a lithium ion battery, a metal-air battery, such as a zinc-air battery, an aluminum-air battery, a lithium-air battery, a hybrid super-capacitor, and the like.

A battery monitor/charger 826 may be included in the IoT device 800 to track the state of charge (SoCh) of the battery 820. The battery monitor/charger 826 may be used to monitor other parameters of the battery 824 to provide failure predictions, such as the state of health (SoH) and the state of function (SoF) of the battery 824. The battery monitor/charger 826 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 826 may communicate the information on the battery 824 to the processor 802 over the bus 806. The battery monitor/charger 826 may also include an analog-to-digital (ADC) convertor that allows the processor 802 to directly monitor the voltage of the battery 826 or the current flow from the battery 824. The battery parameters may be used to determine actions that the IoT device 800 may perform, such as transmission frequency, mesh network operation, sensing frequency, and the like.

A power block 828, or other power supply coupled to a grid, may be coupled with the battery monitor/charger 826 to charge the battery 824. In some examples, the power block 828 may be replaced with a wireless power receiver to obtain the power wirelessly, for example, through a loop antenna in the IoT device 800. A wireless battery charging circuit, such as an LTC4020 chip from Linear Technologies of Milpitas, Calif., among others, may be included in the battery monitor/charger 826. The specific charging circuits chosen depend on the size of the battery 824, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 828 may be augmented or replaced with solar panels, a wind generator, a water generator, or other natural power systems.

The mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a sub-object list 830 of atomic objects and composite objects that may be used to form a group object. A collection group identifier 832 may use the sub-object list 830 to generate a group id, for example, using a hash formula on the sub-object list 830.

A name server 834 may be included to provide name support and commit names to the blockchain 836. The name server 834 may confirm that the name selected is not in current use, and issue credentials to sub-objects to act on behalf of the group object.

The blockchain 836 includes a transactional database that includes blocks of data that have transactions corresponding to names of group objects, the sub-objects forming the group object, and the current status of the group objects, such as formed, evolved, or dissolved. In addition to identification information, the blockchain 836 may include authorization information, such as public encryption keys for group objects and sub-objects. A copy of the blockchain 836 may be kept on a portion or all of the IoT devices in a mesh network. This allows other IoT devices to confirm changes in the blockchain 836 and flag any attempts to change the blockchain 836 without proper authorization. Although used for group identification transactions in this example, the blockchain 836 may be used for any number of other transactions related to security, payments, transactions, and the like, as described herein, A proxy broker 838 may provide credentials from the blockchain 836 to sub-objects for a group object if the composition of the group is to be considered private. This may be used, for example, to increase the security of IoT networks located in public places, such as intersections and streets.

An EPID server 840 may be included to provide encryption services, such as encrypting and decrypting data using a public or private key. Further, the EPID server 840 may provide public keys or other credentials that can be used to authorize sub-objects to act on behalf of a group object, as well as acting as a key verification server. The EPID server 840 may also be used in other applications to form and issue keys, or to generate type identities, as discussed with respect to FIGS. 10 to 15.

Figure 9:
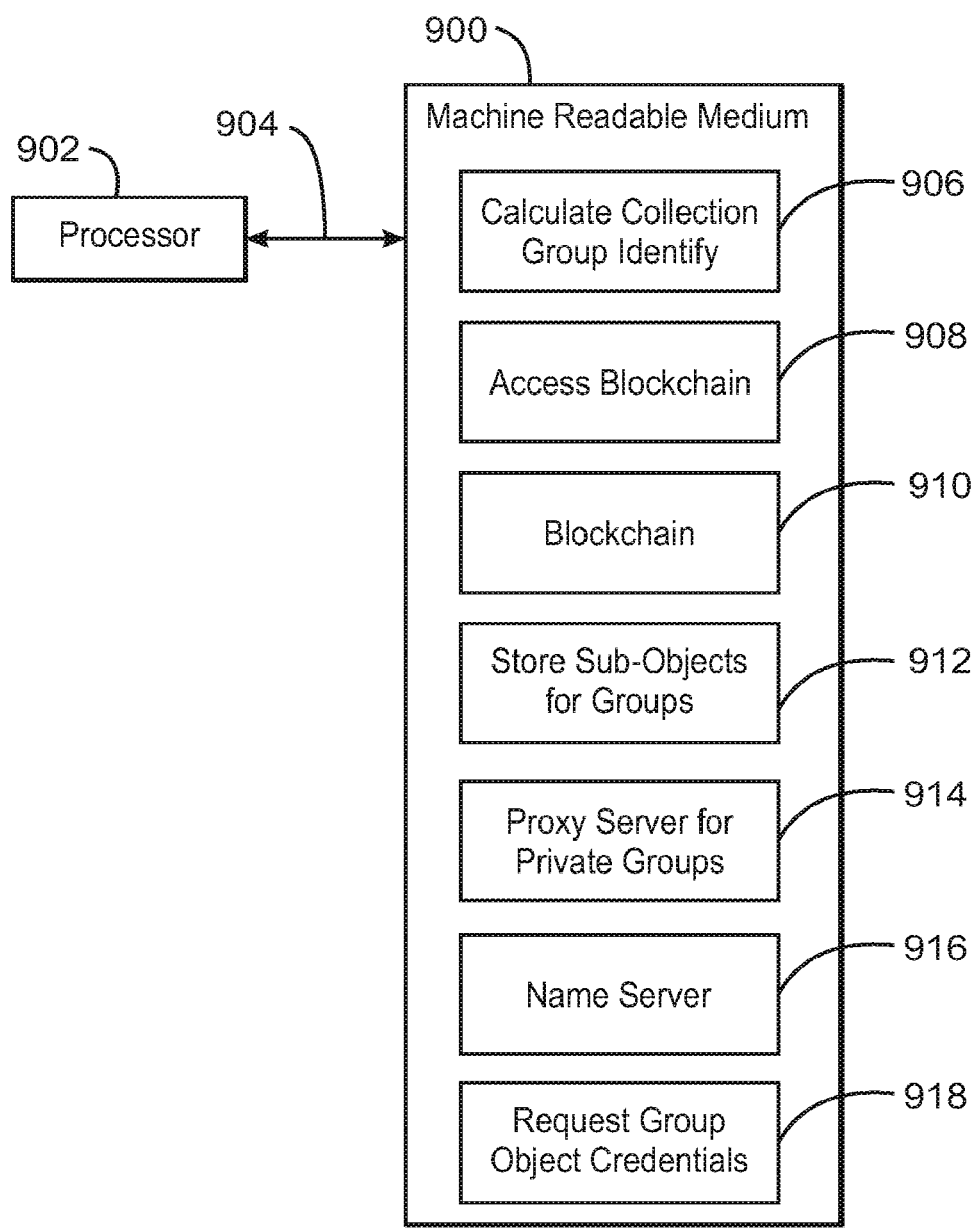
FIG. 9 is a block diagram of a non-transitory, machine readable medium including code to direct a processor to form group objects in accordance with some embodiments.

FIG. 9 is a block diagram of an exemplary non-transitory, machine readable medium 900 including code to direct a processor 902 to form group objects in accordance with some embodiments. The processor 902 may access the non-transitory, machine readable medium 900 over a bus 904. The processor 902 and bus 904 may be selected as described with respect to the processor 802 and bus 806 of FIG. 8. The non-transitory, machine readable medium 900 may include devices described for the mass storage 808 of FIG. 8 or may include optical disks, thumb drives, or any number of other hardware devices.

The non-transitory, machine readable medium 900 may include code 906 to direct the processor 902 to calculate a group name from a list of sub-objects, for example, as described with respect to FIGS. 6 and 7. Code 908 may be included to direct the processor 902 to access a blockchain 910, for example, for determining if a group object name is in the blockchain 910, and, if so, the status of the group object. The code 908 may also direct the processor 902 to commit transactions to the blockchain 910 once the name has been confirmed. The code 908 may also direct the processor 902 to migrate changes to the blockchain 910 to other units in an IoT network.

The machine readable medium 900 may include code 912 to direct the processor 902 to store the identities of sub-objects for the group object in a list. The code 912 may also direct the processor to determine if requests to join the group are from authorized sub-objects. If so, the code 912 may also direct the processor to issue credentials to the requesting sub-objects. The machine readable medium 900 may include code 914 to direct the processor 902 to act as a proxy server for providing credentials to sub-objects for a privacy-protected group object.

The machine readable medium 900 may include code 916 to direct the processor 902 to act as a name server for a group object. The machine readable medium 900 may include code 918 to direct the processor 902 to request credentials to join a group, for example, as a sub-object.

Figure 10:
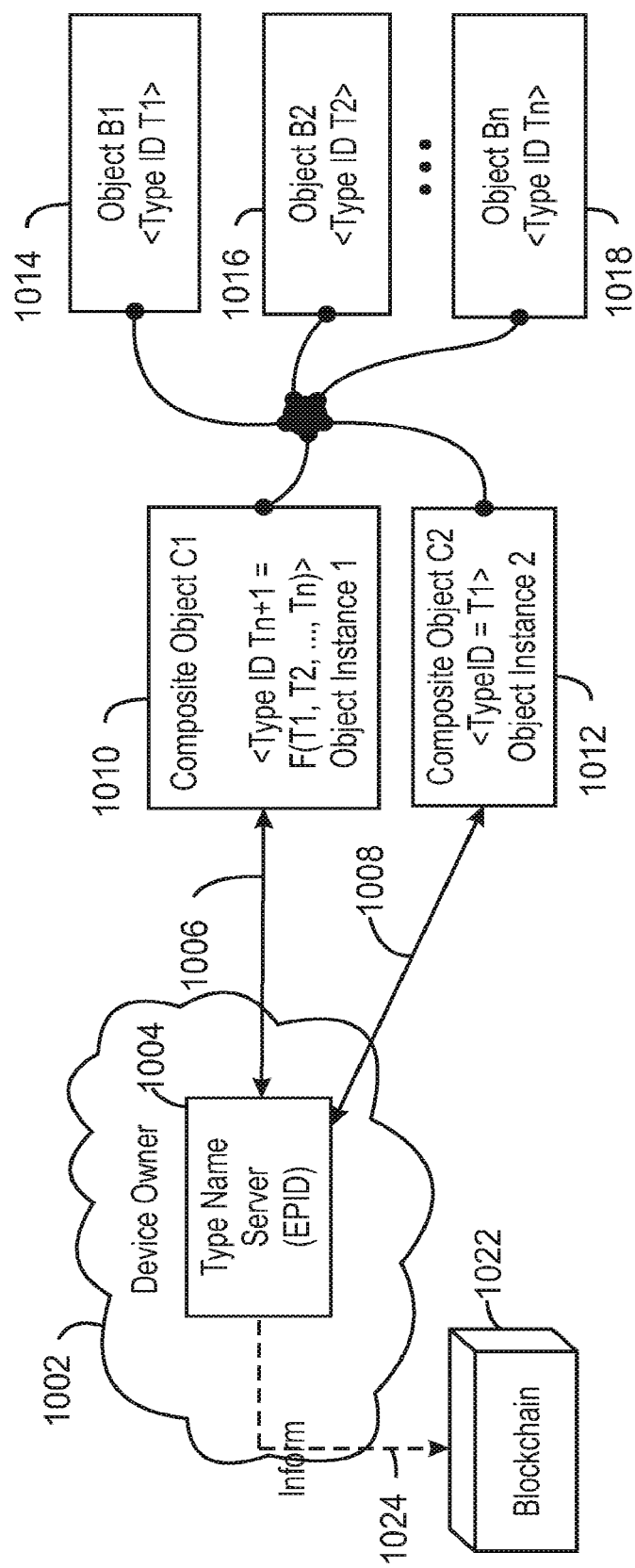
FIG. 10 is a schematic drawing showing the use of Enhanced Privacy Identification (EPID) for object type identity in accordance with some embodiments.

FIG. 10 is a schematic drawing 1000 showing the use of EPID for object type identity in accordance with some embodiments. A device owner 1002 includes a type name server 1004 that enrolls new types based on enrollment requests 1006 or 1008 from composite objects 1010 or 1012. As used herein, enrolling a type or object means registering the type or object in a database or list of types or objects. For example, the enrollment may include sending a transaction to a blockchain to store the type. A new object type, Tn+1, can be derived through composition of a composite group 1010 or 1012 from sub-objects 1014 to 1018 (for example, 1014, 1016 and 1018). The type names for the sub-objects 1014 to 1018 may be used to form a new type name for the composite objects 1010 or 1012.

The composite object 1010 or 1012 may dynamically determine a type name by inspecting the sub-objects 1014 to 1018 with which it interacts. Two methods may be used for inspecting the configuration of a sub-object 1014 to 1018. A first method, as described with respect to the ladder diagram of FIG. 12, uses introspection. In introspection, the IoT object, or other device with a resource model definition, may describe itself when requested. For example, the IoT object can be configured to provide the structures, interfaces and semantics implemented by the object when requested. In some aspects, the IoT object can describe the structures, interfaces and semantics using a data model language (DML) such as XML Schema, JSON Schema, and/or YANG. The actual implementation may not directly interpret the data model as this could imply slow execution. But testing can be used to show the DM produced by introspection matches the behavior implemented.

Figure 13:
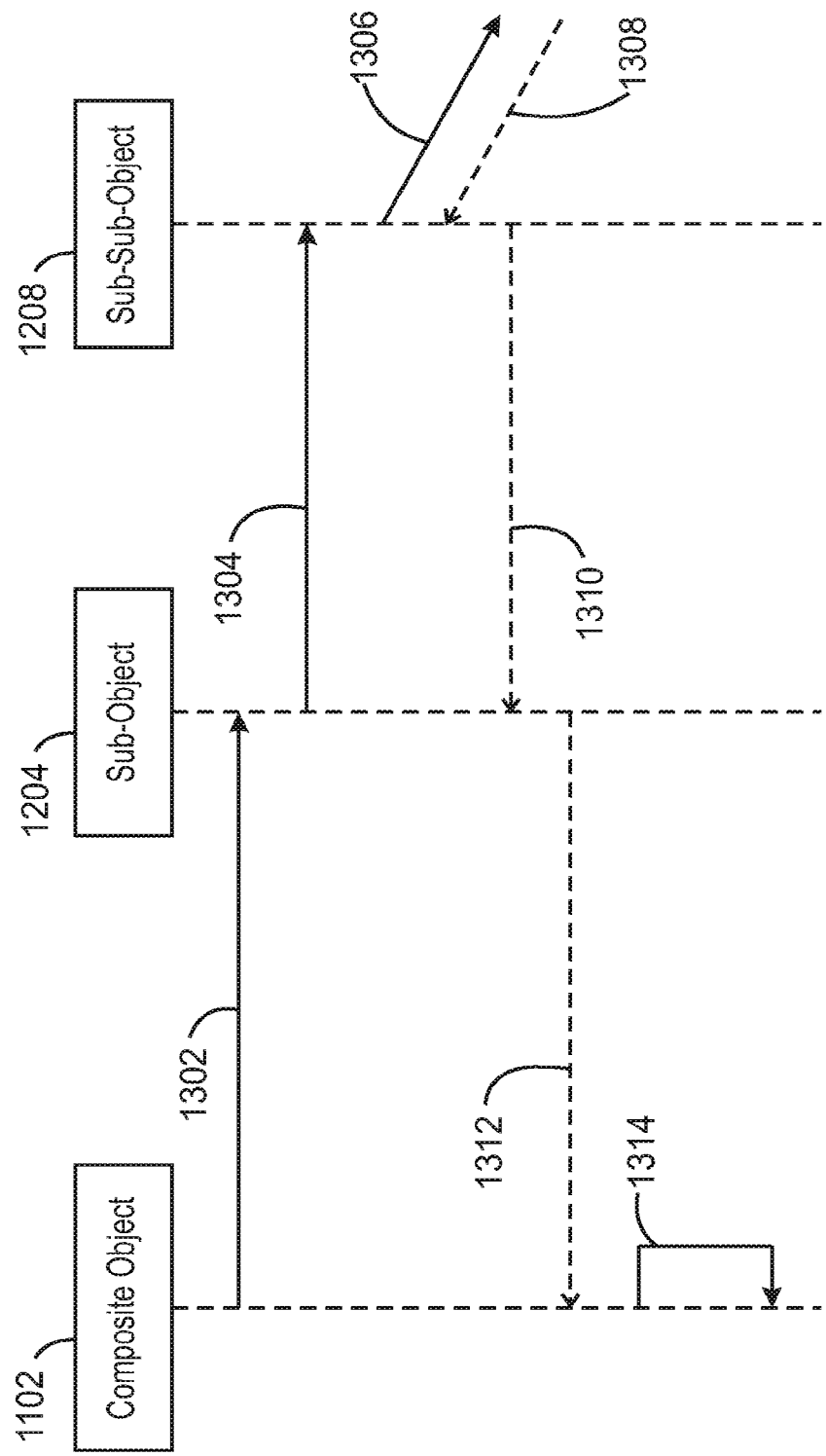
FIG. 13 is a ladder diagram of an example method for recursive type attestation in accordance with some embodiments.

A second method, as described with respect to the ladder diagram of FIG. 13, may use attestation to validate the integrity, credentials, or identity of the device. As used herein, attestation is a secure method for disclosing the trust properties of a device or platform, in which the device or platform self-reports the trust properties. The trust properties may include the platform manufacturer, certifications achieved by the vendor that reflect security hardening, such as FIPS140-2 for crypto module implementation. Further, ISO9000 may be relevant, as well as vendor processes followed to ensure quality. Attestation typically reveals the hardware, firmware and software versions and patch levels. It may reveal information about keys that are protected by the hardened environment, such as a trusted execute environment (TEE), and information about key types. For example, a hardened environment may use a trusted platform module (TPM) to define key types where one type of key cannot be migrated out of the TPM, to a less hardened cryptographic module.

Both introspection and attestation may produce a set containing object membership based on sub-object typing. Further, the two methods may be used together, for example, using the attestation key to confirm that the introspection identity came from a particular unit. All IoT objects are typed, though not all may have a credential that authenticates the type.

Figure 12:
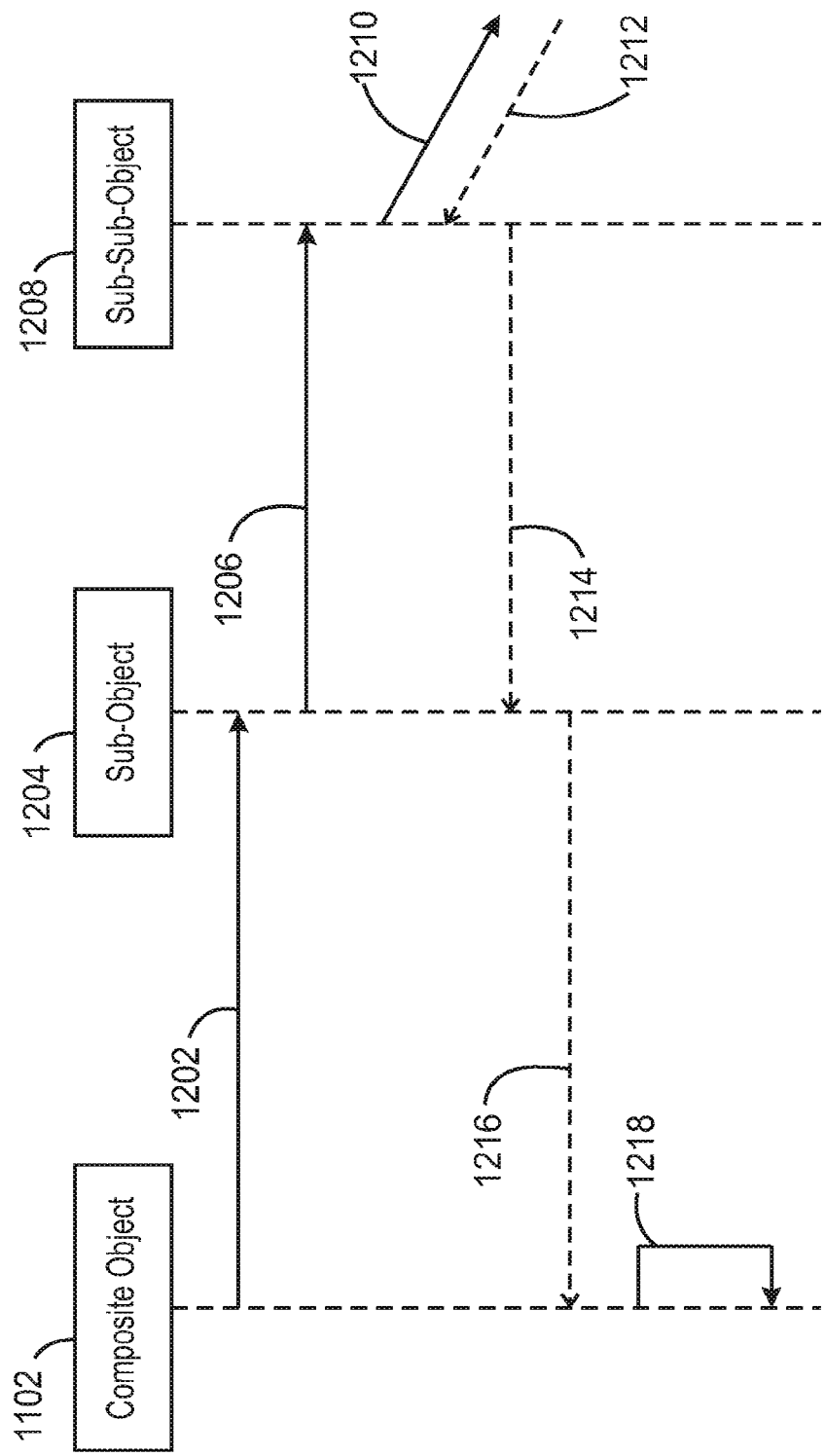
FIG. 12 is a ladder diagram of an example method for type introspection using recursion in accordance with some embodiments.

A method for deriving new object type names, for example, as described with respect to the ladder diagram of FIG. 12, supports the automated generation of object types. Auto-generation allows useful collections of objects to form a pattern for object replication. A useful collection may then be instantiated more easily elsewhere in the network using the type name and pattern as input parameters.

The type name server 1004 may use EPID to authenticate the object type identifier by admitting each instance of the same type object into an EPID group using the type name as the group ID. A blockchain 1022 can be used to record the creation of dynamically derived types, for example, by committing a transaction 1024 from the type name server 1004, so that objects of the same type can be instantiated reliably without isomorphic redundancy.

Figure 11:
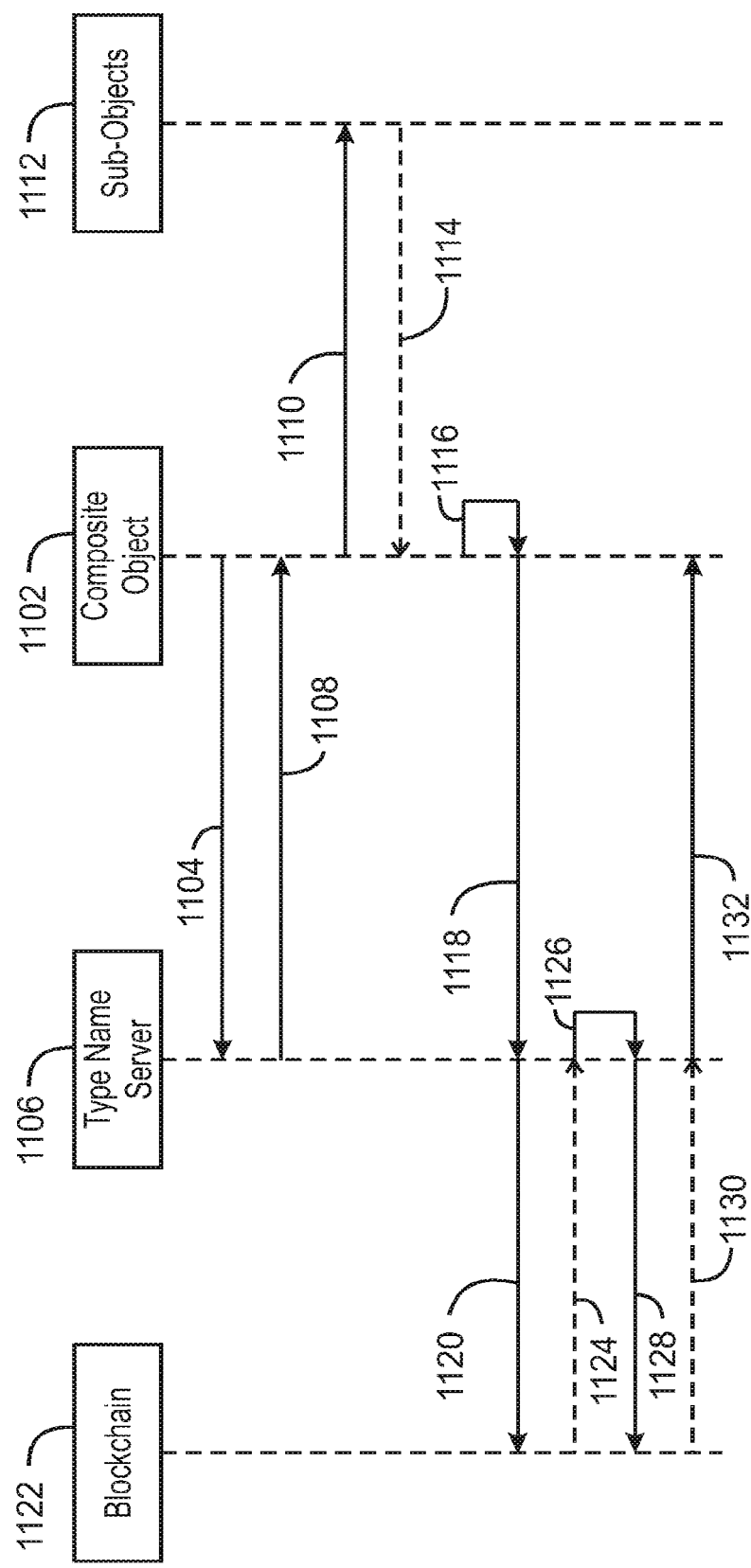
FIG. 11 is a ladder diagram of an example method for dynamic creation of an object type in accordance with some embodiments.

FIG. 11 is a ladder diagram of an example method 1100 for dynamic creation of an object type in accordance with some embodiments. The method 1100 of FIG. 11 may be implemented by the IoT device 1400 described with respect to FIG. 14. In step 1104, a composite object 1102 can send a request 1104 to create a type group, e.g., T1, to a type name server 1106. A type name server 1106 may be included in a device owner 1002, as described with respect to FIG. 10, or may be in a central or separate device, such as an aggregator 406, described with respect to FIG. 4.

In step 1108, the type name server 1106 responds to the composite object 1102 with a request for type introspection. In step 1110, the request triggers a recursive sending of requests to sub-objects 1112 to provide introspection or attestation information. The sub-objects 1112 respond 1114 with the requested information. Once the recursion is completed, the composite object 1102 may calculate a type name 1116 from the types of all of the sub-objects 1112, for example, as T1=F(t1, t2, t3, . . . , tn). The composite object 1102 may then attest the type using the object instance key in an EPID join request 1118 to the type name server 1106.

The type name server 1106 sends a request 1120 to the administrator of the blockchain 1122 for a previous instantiation of the creation event. A message 1124 may be received from the administrator of the blockchain 1122 indicating that the type already exists. This may also be performed by a determination by the type name server 1106 that a previous type has already been created with that name and is present in the blockchain 1122.

If the type is not created, the type name server issues 1126 a request 1128 to create the type in the blockchain 1122. This may be done by committing the creation transaction to the instantiation of the blockchain 1122 residing in the IoT device that hosts the type name server 1106.

In some examples, other IoT devices storing the blockchain 1122 may fail to validate the new creation, for example, locating another instantiation of the type in the blockchain 1122 they have stored. If a majority fail to validate the creation, it is rejected, and the blockchain 1122 reverts to the previous chain. The type name server 1106 may then rename 1126 the type and retry the creation 1128.

If the creation is successful, for example, as indicated by a message 1130 received from the administrator of the blockchain 1122 or by confirmation of the new blockchain 1122 by a majority of IoT devices, the type name server 1106 may then issue an EPID join request 1132 to the composite object 1102. The EPID join request 1132 includes the EPID credentials for the type. These may be shared with the sub-objects 1112 directly by the composite object 1102, or the sub-objects 1112 may send a join request with the new type name to have the type name server 1106 provide the credentials.

FIG. 12 is a ladder diagram of an example method 1200 for type introspection using recursion in accordance with some embodiments. Like numbered items are as discussed with respect to FIG. 11. The method 1200 of FIG. 12 may be implemented by the IoT device 1400 described with respect to FIG. 14. The introspection provides a connection graph stemming from a composite object to leaf objects. Leaf objects are otherwise known as atomic objects because they do not have sub-objects.

In step 1202, the composite object 1102 can send a command 1202 to a sub-object 1204 to instruct the sub-object 1204 to perform an introspection. If the sub-object 1204 is an atomic object, it returns a signature as identification of type. If the sub-object 1204 is, itself, a composite object, it sends a command 1206 to each sub-sub-object 1208 forming the sub-object 1204 to perform an introspection. This occurs recursively from the composite object 1102 to each sub-object 1204 and from each sub-object 1204 to each sub-sub-object 1208, as indicated by a command 1210 sent to a lower layer, and a type graph 1212 or 1214 returned from the lower layer.

Introspection uses recursion as a method for walking a sub-object graph. The recursion halts given one of two possible conditions, first if an atomic object is encountered and second if an already encountered object is encountered again. Recursive walking of the sub-object graph produces a tree (directed acyclic graph) consisting of at least and at most one way to reach every node in the graph. The type graph may have the format G=(gn), $[G]K_{n\_instance}$, in which gn is the group number, [G] is the group name, and $K_{n\_instance}$ is the key for the specific group. Upon return from the recursive walk of the tree, the current node populates an entry in a manifest forming a tree structure containing the object's type information. If the object possesses an instance key, the type information is signed. Thus the sub-sub-object 1208 may return a type graph of the format G'=(gn+1|gn), $[G]K_{n\_instance}$ to the sub-object 1204. Once all sub-sub-objects 1208 have returned their types, or type graphs to the sub-object 1204, it may return its own type graph 1216 to the composite object 1102, for example, G"=(gn+2|gn+1|gn), $[G"]K_{n\_instance}$.

The resultant manifest is used by the composite object 1102, as the root object, to generate 1218 its own type name. This may also include a locally scoped property name as input to the function F( ) used to generate a type name. The manifest may be supplied to a Type Name Server 1106, as discussed with respect to FIG. 11, which may verify the signatures and construction of the type name. The Type Name Server 1106 may check for a prior type name reservation in a blockchain. If an original type name is found and a credential is issued, a blockchain may be updated enabling independent verification of type name reservation status.

FIG. 13 is a ladder diagram of an example method 1300 for recursive type attestation in accordance with some embodiments. The method 1300 of FIG. 13 may be implemented by the IoT device 1400 described with respect to FIG. 14 Recursive object attestation is similar to recursive object introspection with the distinction that type information may be signed using a type name credential, for example, programmed into the device, or formed from a credential programmed into the device. When the object type credential is used, the type name may identify a previously enrolled type, hence a blockchain may contain a historical record of its type hierarchy. Accordingly, use of a type credential may halt recursion. In an embodiment of recursive object attestation, authenticated type termination may be ignored as a method for re-verifying a type hierarchy.

In step 1302, the composite object 1102 sends a command 1302 to a sub-object 1204 to instruct the sub-object 1204 to send an attestation credential. If the sub-object 1204 is an atomic object, it returns an object credential as identification of type. If the sub-object 1204 is, itself, a composite object, it sends a command 1304 to each sub-sub-object 1208 forming the sub-object 1204 to send an attestation credential. This occurs recursively from the composite object 1102 to each sub-object 1204 and from each sub-object 1204 to each sub-sub-object 1208, as indicated by a command 1306 sent to a lower layer, and a type graph 1308 returned from the lower layer. A similar type graph 1310 is returned from each sub-sub-object 1208 to the sub-object 1204. A type graph 1312 may then be returned from each sub-object 1204 to the composite object 1102. As for introspection, the composite object 1102 may then verify 1314 each signature.

Figure 14:
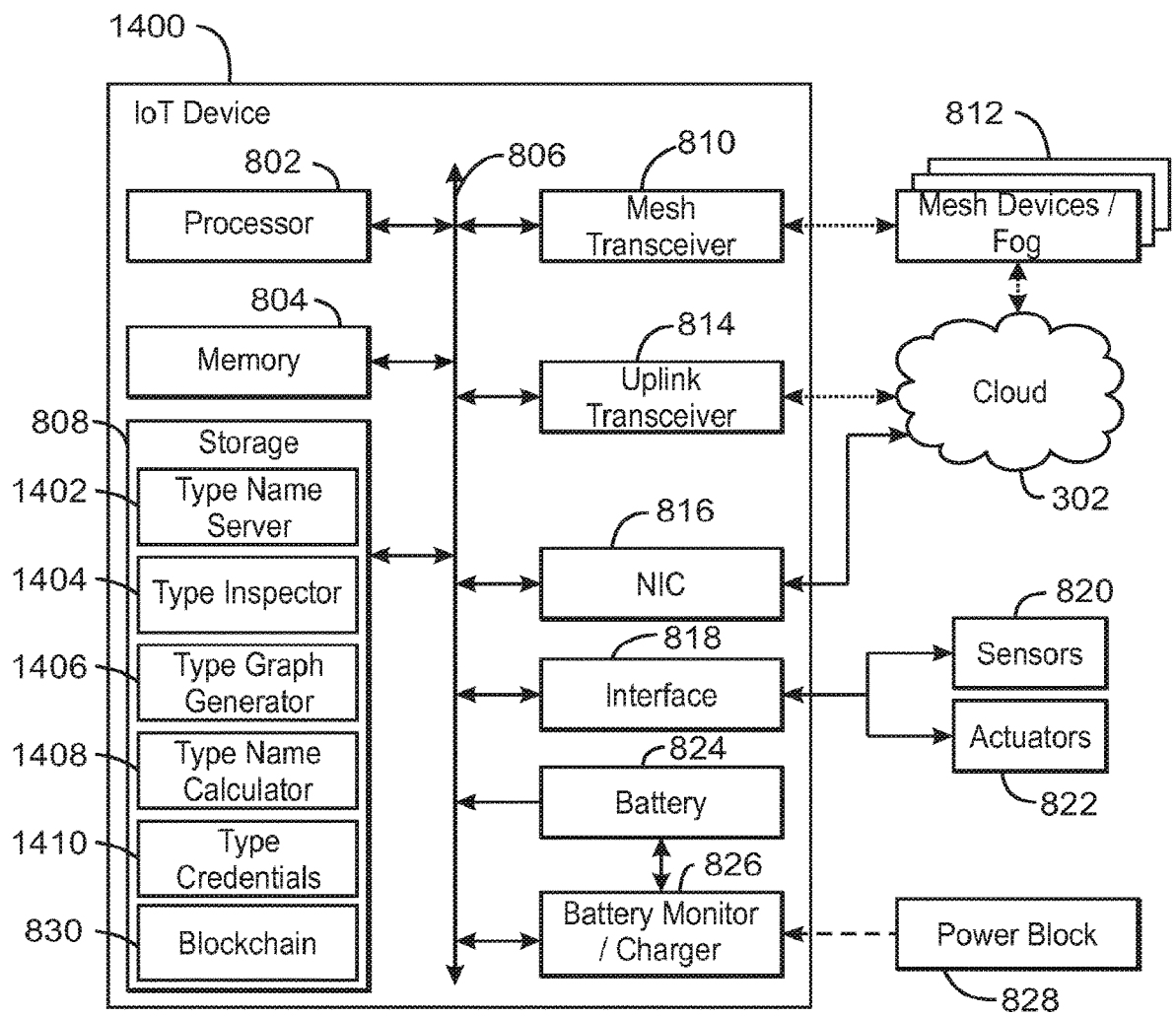
FIG. 14 is a block diagram of an example of components that may be present in an IoT device for assigning types to composite objects as they are formed in accordance with some embodiments.

FIG. 14 is a block diagram of an example of components that may be present in an IoT device 1400 for assigning types to composite objects as they are formed in accordance with some embodiments. Like numbered items are as described with respect to FIGS. 3 and 8. It can be noted that different components may be selected and used for the IoT device 800 discussed with respect to FIG. 8, and the IoT Device 1400 discussed with respect to FIG. 14.

The mass storage 808 may include a number of modules to implement the type creation functions described herein. Although shown as code blocks in the mass storage 808, it may be understood that any of the modules may be fully or partially replaced with hardwired circuits, for example, built into an application specific integrated circuit (ASIC). The mass storage 808 may include a type name server 1402 that lists atomic object types and composite objects types that may be used to form a group object. The type name server 1402 may issue a command to a type inspector 1404 to determine the types of sub-objects and sub-sub-objects forming a composite object. The type inspector 1404 may perform a recursive inspection of mesh devices 812 using introspection or attestation. A type graph generator 1406 may generate a type graph using the responses from the sub-objects and sub-sub-objects, including type graphs generated by lower level objects. A type name calculator 1408 may be used to generate a type name from the type graph generated, for example, by calculating a hash function of the entries in the type graph. Type credentials 1410 may be included to identify the type of the IoT device 1400. The type credentials 1410 may include credentials programmed into the device by the manufacturer, for example, for attestation, or credentials provided to the IoT device 1400 by another device, for example, for attestation. A combined type credential may be created, using a credential manufactured into the device to validate or encrypt a credential provided to the device.

A blockchain 836 may be included in the IoT device 1400 to record type name transactions, in addition to other information, such as group name transactions. As described herein, the blockchain 836 transactions may be validated by a majority vote of mesh devices 812 that are also storing copies of the blockchain 836.

Figure 15:
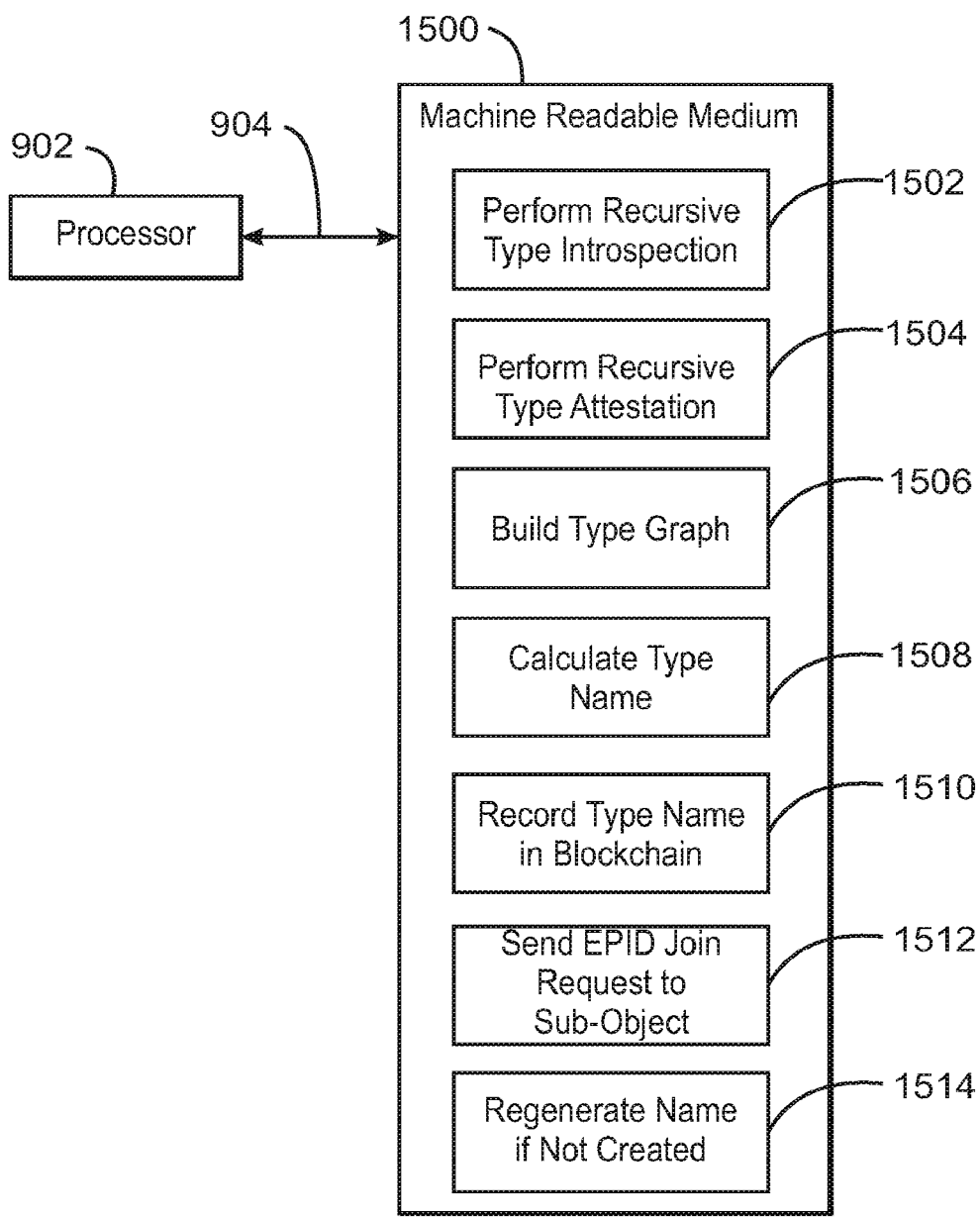
FIG. 15 is a block diagram of a non-transitory, machine readable medium including code to direct a processor to form group objects in accordance with some embodiments.

FIG. 15 is a block diagram of an exemplary non-transitory, machine readable medium 1500 including code to direct a processor 902 to form group objects in accordance with some embodiments. The processor 902 may access the non-transitory, machine readable medium 1500 over a bus 904. The processor 902 and bus 904 may be selected as described with respect to the processor 802 and bus 806 of FIG. 8. The non-transitory, machine readable medium 1500 may include devices described for the mass storage 808 of FIG. 8 or may include optical disks, thumb drives, or any number of other hardware devices.

The non-transitory, machine readable medium 1500 may include code 1502 to direct the processor 902 to perform a recursive type introspection to determine the types of devices in a composite object. Code 1504 may be included to direct the processor 902 to perform a sequential attestation to determine the types of devices in a composite object. Code 1506 may be included to direct the processor 902 to build a type graph with information returned from sub-objects and sub-sub-objects. Code 1508 may be included to direct the processor 902 to calculate a type name for the type, for example, calculating a hash function from the type graph. Code 1510 may be included to direct the processor 902 to determine if the type name is already in the blockchain and, if not, to commit the type name to the block chain. The code 910 may also direct the processor 902 to migrate changes to the blockchain stored in other devices in the mesh network. Code 1512 may be included to direct the processor 902 to send out EPID join requests to sub-objects create the type group. If the name is not created, for example, due to a redundancy or other fault in the blockchain records, code 1514 may be included to direct the processor 902 to regenerate the type name and repeat the commit process.

Figure 16:
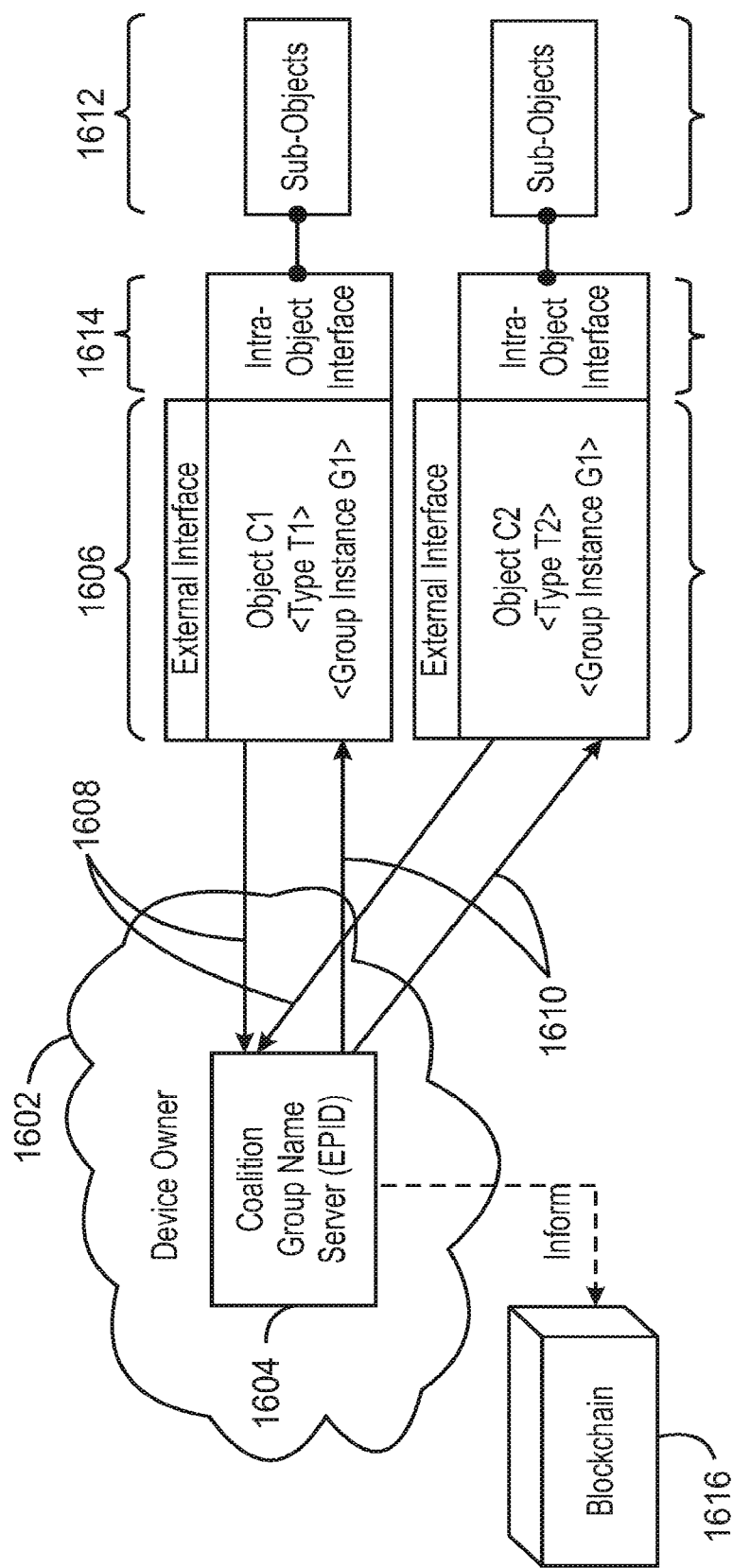
FIG. 16 is a schematic drawing of the formation of a coalition group in accordance with some embodiments.

FIG. 16 is a schematic drawing of the formation of a coalition group 1600 in accordance with some embodiments. IoT networks may form a loose coalition of objects that may not regularly interact, termed a coalition group 1600. However, labeling the objects as part of a group abstraction may provide semantic value. Coalition groups 1600 can be formed by administrative decisions, for example, to indicate a region, location, or general purpose, such as devices located on a floor or in an apartment in a single building. An administrative authority, such as a device owner 1602, may choose the group identifier that the grouped devices use, for example, through a coalition group name server 1604. Coalition group members 1606 may enroll in a coalition group 1600 by sending a join request 1608 to the device owner 1602. From the coalition group name server 1604, credentials 1610 may be provided to the group members, including EPID credentials. The credentials 1610 may be further provided to sub-objects 1612 by the coalition group members 1606, for example, through intra object interfaces 1614. The coalition group name may be accessed from a blockchain 1616, or committed to the blockchain 1616 upon creation.

A credential for a coalition group 1600 allows the coalition group member 1606 to authenticate without revealing a value that may be used for tracking privacy. Hence, criteria for membership may be esoteric where the size of the group is used to determine the degree of privacy risk associated with use of the credential.

Enrollment in a coalition group 1600 by an IoT device, or object, allows the object to inherit properties and attributes of the coalition group 1600. These properties and attributes for the coalition group members 1606 may not incorporate code, state or interfaces that process group properties and attributes. Nevertheless, other entities may name properties and attributes to sort, categorize, route, manage or perform analysis. In this sense, coalition grouping is a strategy for dynamic application of object meta-data.

Figure 17:
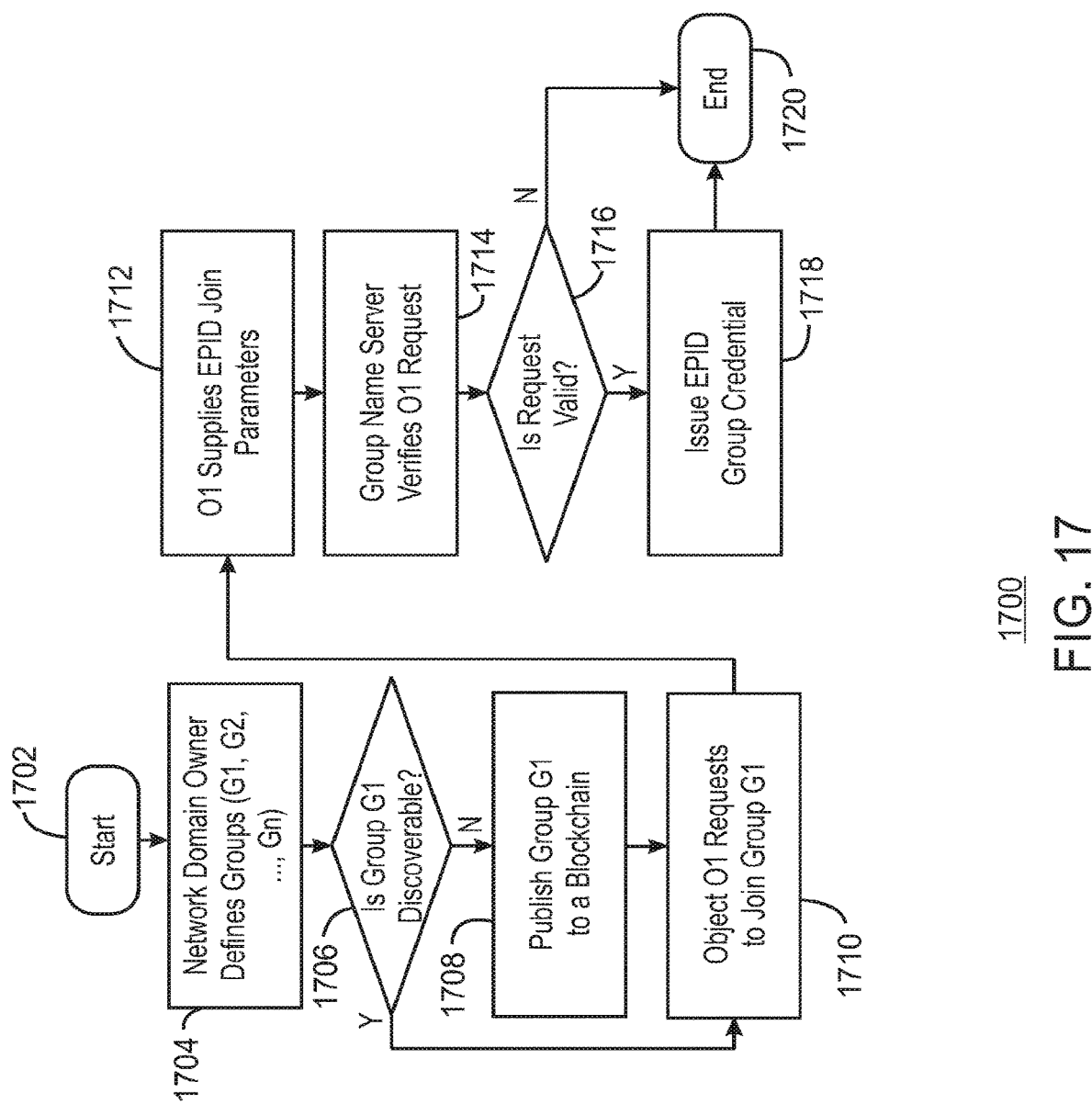
FIG. 17 is a process flow diagram of an example method for enrolling members in a coalition group in accordance with some embodiments.

FIG. 17 is a process flow diagram of an example method 1700 for enrolling members in a coalition group in accordance with some embodiments. The method 1700 of FIG. 17 may be implemented by the IoT device 1800 described with respect to FIG. 18. The block 1702 represents, for example, when a group of IoT devices are powered or otherwise activated, for example, when a virtual device is started. At block 1704, the network domain owner defines groups (G1, G2, . . . , Gn). A group may include a locality designation, such as upstairs, downstairs, and the like, or a functional designation, such as admin, climate control, and the like, and may include combinations of locality and function, such as evacuation, entry routes at a stadium, and the like. Any number of other designations may be used. Generally, the coalition group name is selected to provide useful metadata to a system.

At block 1706, a determination is made as to whether a group, for example, G1, is discoverable. If not, at block 1708, the group is published to a blockchain. At block 1710, a request may be received from an object, for example, O1, to join the group, G1. At block 1712, EPID join parameters may be received from the object, O1. These may be sent in response to a request from the group device owner.

At block 1714, a coalition group name server verifies the join request from O1. The request may be authenticated using any variety of credentials or techniques. For example, the coalition group name server may check the instance, authority, or type name credentials to determine if the values are in the blockchain. In higher security applications, all of the credentials may be required to be correct before allowing the device to join the coalition group. Similarly, in lower security applications, the coalition group name server may not require credentials in enroll a device in a coalition group. If the request is determined to be valid at block 1716, at block 1718, a coalition group credential, such as an EPID, may be issued to the object O1. If the request is not determined to be valid, the process ends at block 1720 without the issuance of the credentials.

Figure 18:
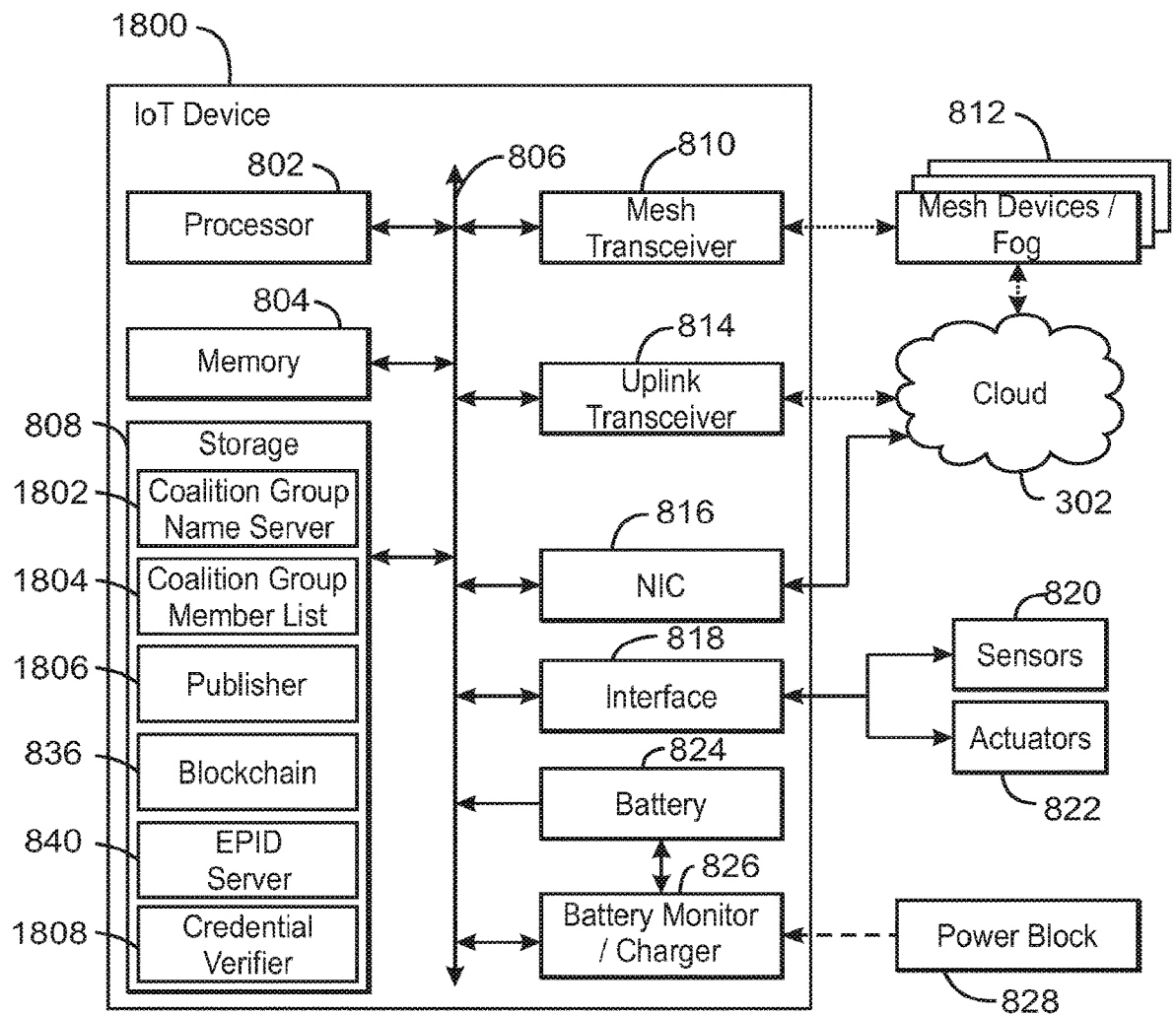
FIG. 18 is a block diagram of an example of components that may be present in an IoT device for creating coalition groups in accordance with some embodiments.

FIG. 18 is a block diagram of an example of components that may be present in an IoT device 1800 for creating coalition groups in accordance with some embodiments. Like numbered items are as described with respect to FIGS. 3 and 8. It can be noted that different components may be selected and used for the IoT device 800 discussed with respect to FIG. 8, and the IoT Device 1800 discussed with respect to FIG. 18.

The mass storage 808 may include a number of modules to implement the creation of coalition groups as described herein. Although shown as code blocks in the mass storage 808, it may be understood that any of the modules may be fully or partially replaced with hardwired circuits, for example, built into an application specific integrated circuit (ASIC). The mass storage 808 may include a coalition group name server 1802 including convenient groupings for objects. As discussed herein, the groups may be formed based on location, functionality, or a combination. A user may define the parameters to be used for the grouping. The type name server 1802 may build and maintain a coalition group member list 1804 to generate a name for the coalition group. If the group is not discoverable, a publisher 1806 may make the characteristics of the group, including types, locations, and other metadata, available to other IoT devices, so that those IoT devices may determine if they should join the group. This may be performed, for example, by publishing the group name and composition to a blockchain 836.

The blockchain 836 may be included in the IoT device 1800 to record coalition group name transactions, in addition to other information, such as type name transactions and composite object transactions. As described herein, the blockchain 836 transactions may be validated by a majority vote of mesh devices 812 that are also storing copies of the blockchain 836.

A credential verifier 1808 may be included to receive credentials from IoT devices and composite objects that wish to join the coalition. The credential verifier 1808 may be checked against transactions in the blockchain 836 to determine if the credentials are valid. If so, the credential verifier 1808 may obtain credentials from the EPID server 840 and issue them to the IoT device or composite object that sent the join request. The credential verifier 1808 may then commit the transaction to the block chain 836 to record that the IoT device or composite object has joined the coalition group.

Figure 19:
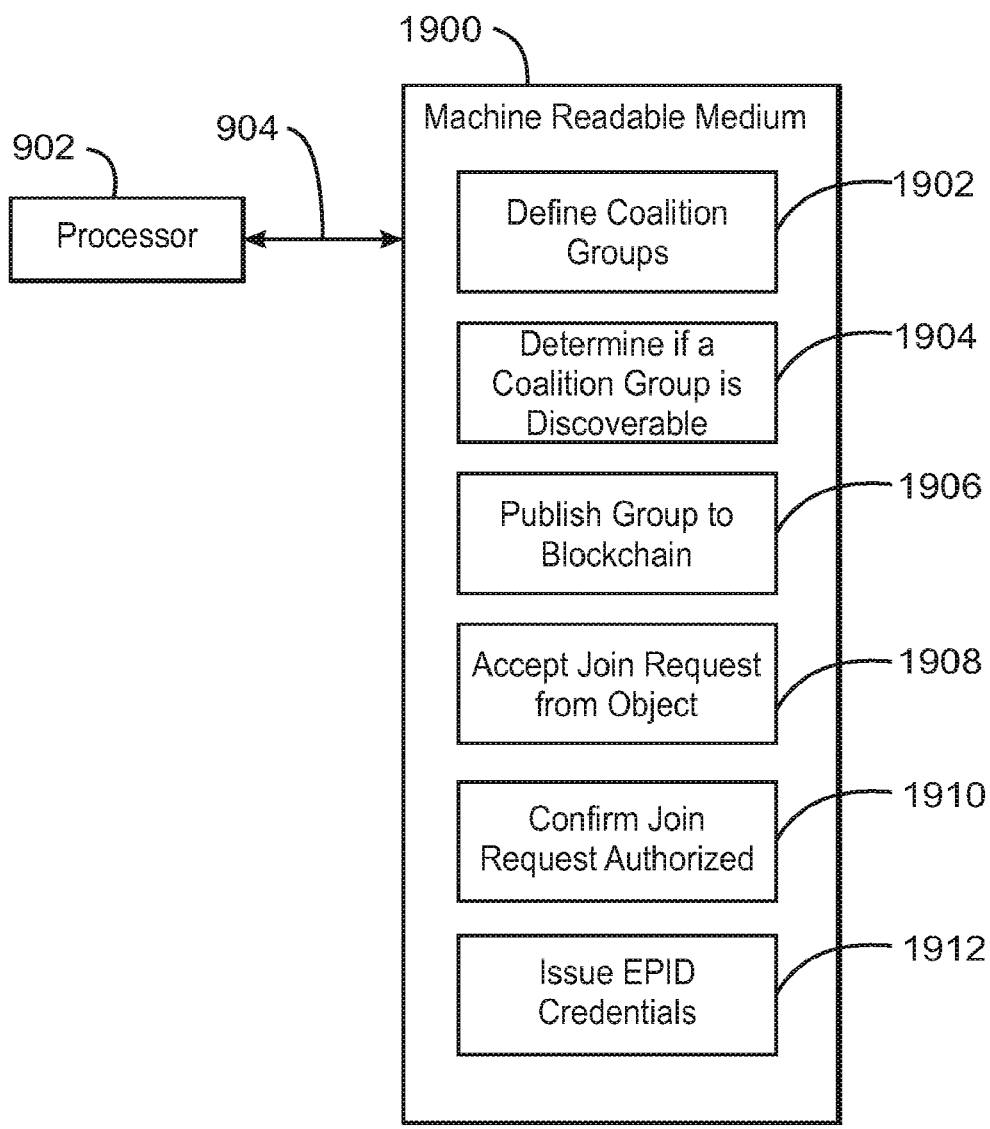
FIG. 19 is a block diagram of a non-transitory, machine readable medium including code to direct a processor to create coalition groups in accordance with some embodiments.

FIG. 19 is a block diagram of a non-transitory, machine readable medium 1900 including code to direct a processor 902 to create coalition groups in accordance with some embodiments. The processor 902 may access the non-transitory, machine readable medium 1900 over a bus 904. The processor 902 and bus 904 may be selected as described with respect to the processor 802 and bus 806 of FIG. 8. The non-transitory, machine readable medium 1900 may include devices described for the mass storage 808 of FIG. 8 or may include optical disks, thumb drives, or any number of other hardware devices.

The non-transitory, machine readable medium 1900 may include code 1902 to direct the processor 902 to define coalition groups, for example, by locations, function, or both. Code 1904 may be included to direct the processor 902 to determine if a coalition group is discoverable, for example, set up to respond to a discovery request with meta-data identifying the coalition group. Code 1906 may be included to direct the processor 902 to publish the coalition group to a blockchain, or directly to surrounding devices. This may make the presence of the coalition group known, discoverable, or both.

Code 1908 may be included to direct the processor 902 to accept a join request for the coalition group from IoT devices, including atomic objects, composite objects, or both. The join request may identify the coalition group, and include verification information, such as location, type, and other credentials or metadata. Code 1910 may be included to direct the processor 902 to validate the credentials, for example, determining if they are present in the blockchain. Code 1912 may be included to issue credentials to the requestor, such as an EPID key.

Communications among IoT devices, for example, in a coalition group, a mesh network, a fog device, or other arrangement, may need to be secured, but this may be problematic for devices that are of limited functionality. Further, the IoT devices may be distributed across different networks, making securing the communications more challenging. A distributed ledger system may enhance security in communications by IoT devices.

Figure 20:
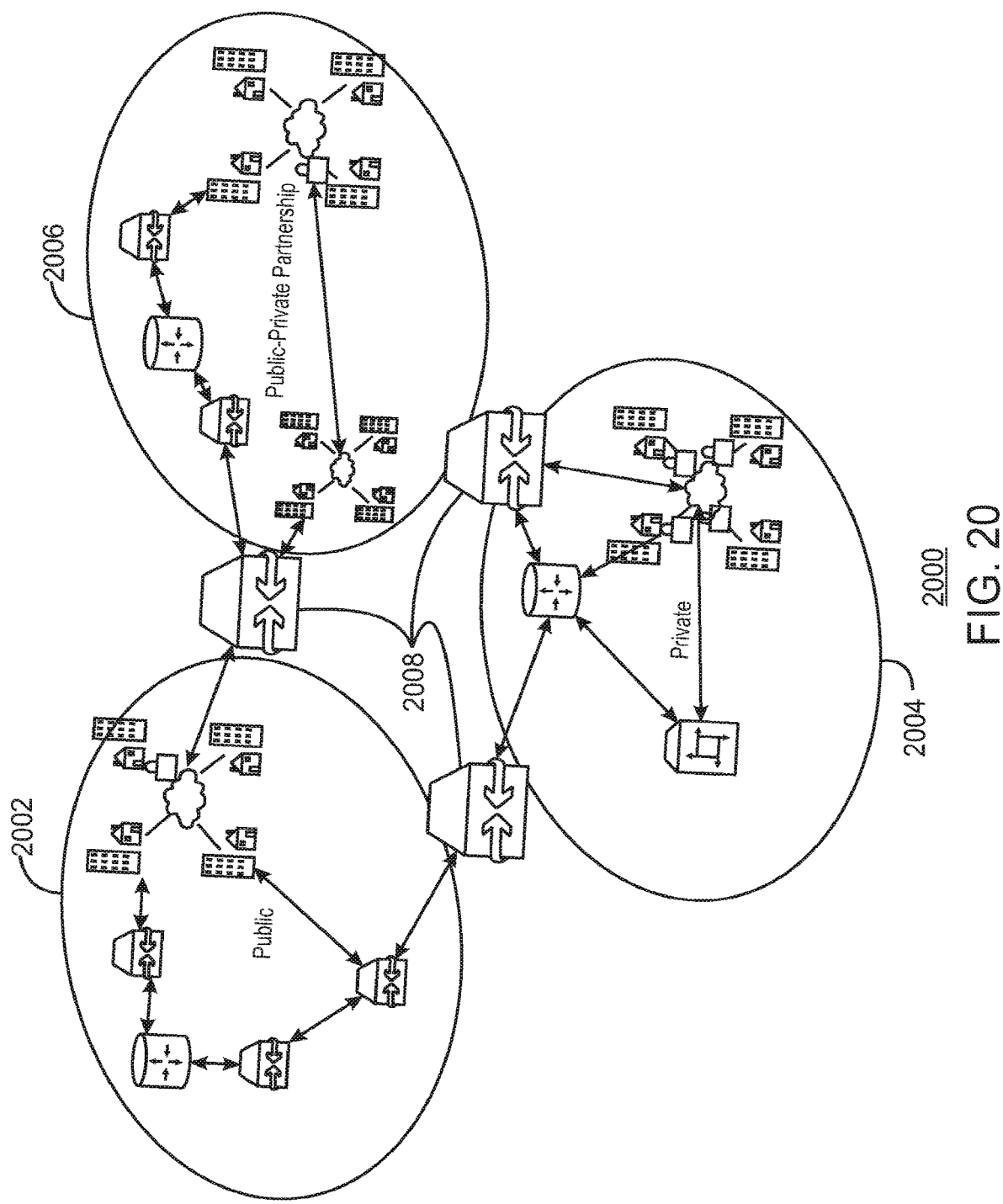
FIG. 20 is a schematic drawing illustrating interoperability across public domains, private domains, and public-private domains in accordance with some embodiments.

FIG. 20 is a schematic drawing 2002 illustrating interoperability across public domains 2002, private domains 2004, and public-private domains 2006 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 2002, 2004, and 2006 through the Internet backbone, shown as routers 2008.

In some aspects, the routers 2008 provide the edge connections that couple the domains to one another. As described herein, any number of services may be provided at the edges of the domains 2002, 2004, and 2006 to enhance the interconnectivity. For example, interconnections between the public domain 2002 and the private domains 2004 may provide opportunities for micropayments for domain access, explicit permission and tracking for domain access, and the separation of public and private traffic, among others. Similarly, interconnections between the public domain 2002 and the public-private domain 2006 may provide opportunities for services such as time-based leases, resource marketplaces, and distributed identity servers, among others. Interconnections between the private domains 2004 and the public-private domains 2006 may provide opportunities for inline service interconnects, behavior based threat analysis, and proof-of-provenance, among others.

Figure 21:
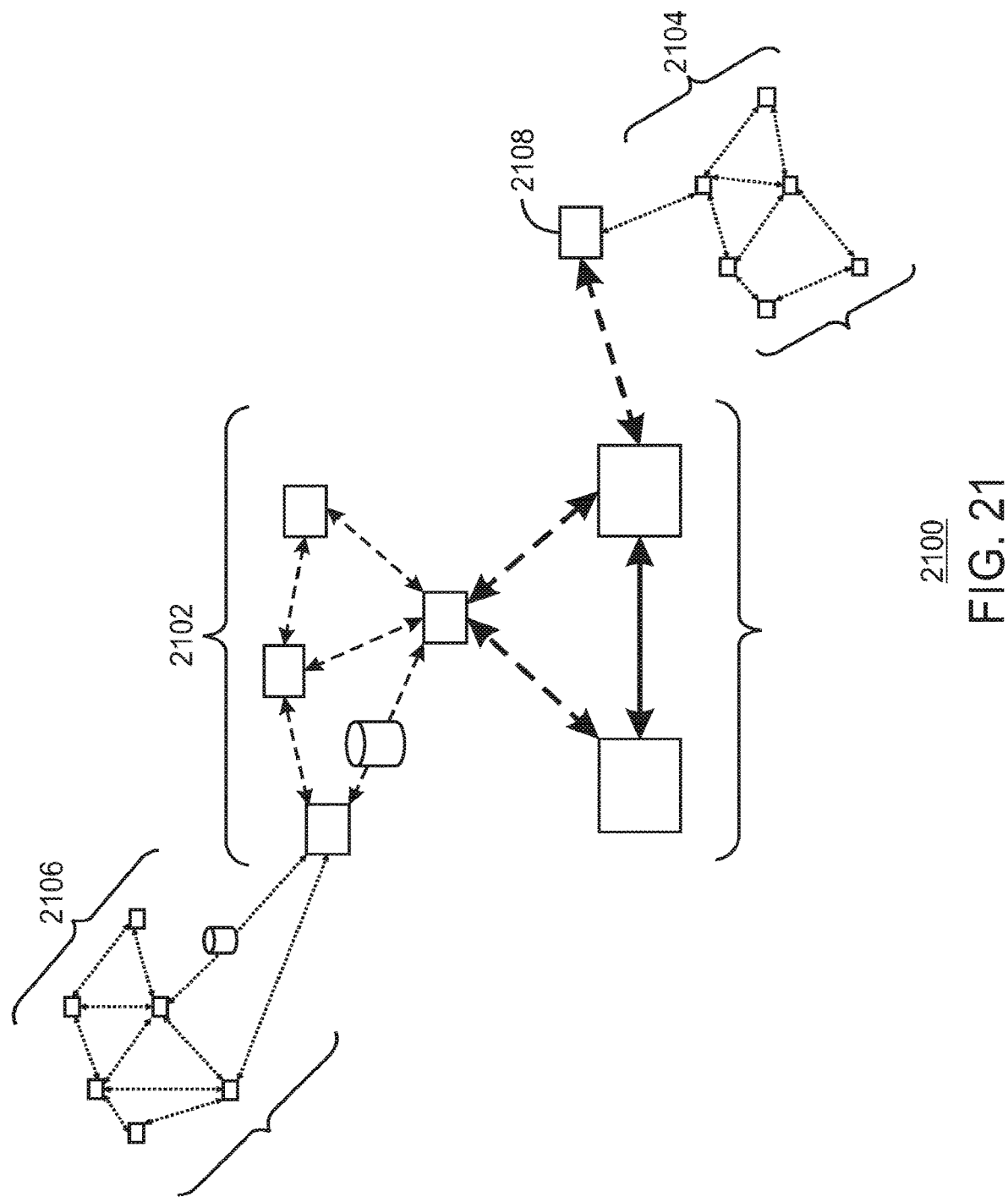
FIG. 21 is a schematic drawing of interoperability across a heterogeneous network of wired networks and wireless networks in accordance with some embodiments.

FIG. 21 is a schematic drawing of interoperability across a heterogeneous 2100 network of wired networks 2102 and wireless networks 2104 and 2106 in accordance with some embodiments. The wireless networks 2104 and 2106 may be communicatively coupled by devices in the wired network 2102. This provides opportunities for efficiency improvements in communications between devices in the wireless networks 2104 and 2106, as well as improvements in communications between devices in a wireless network 2104 or 2106 and a device in the wired network 2102. For example, edge device 2108 coupling a first wireless network 2104 to the wired network 2102 may provide a data to information transform to reduce the size of the payload. Further, the edge device 2108 may have a permissioning system that allows packets from the first wireless network 2104 to pass, while blocking unpermitted packets from transferring. The permissioning system may include systems to make micropayments to allow the information to move across the wired network 2102. As an example, the first wireless network 2104 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

Figure 22:
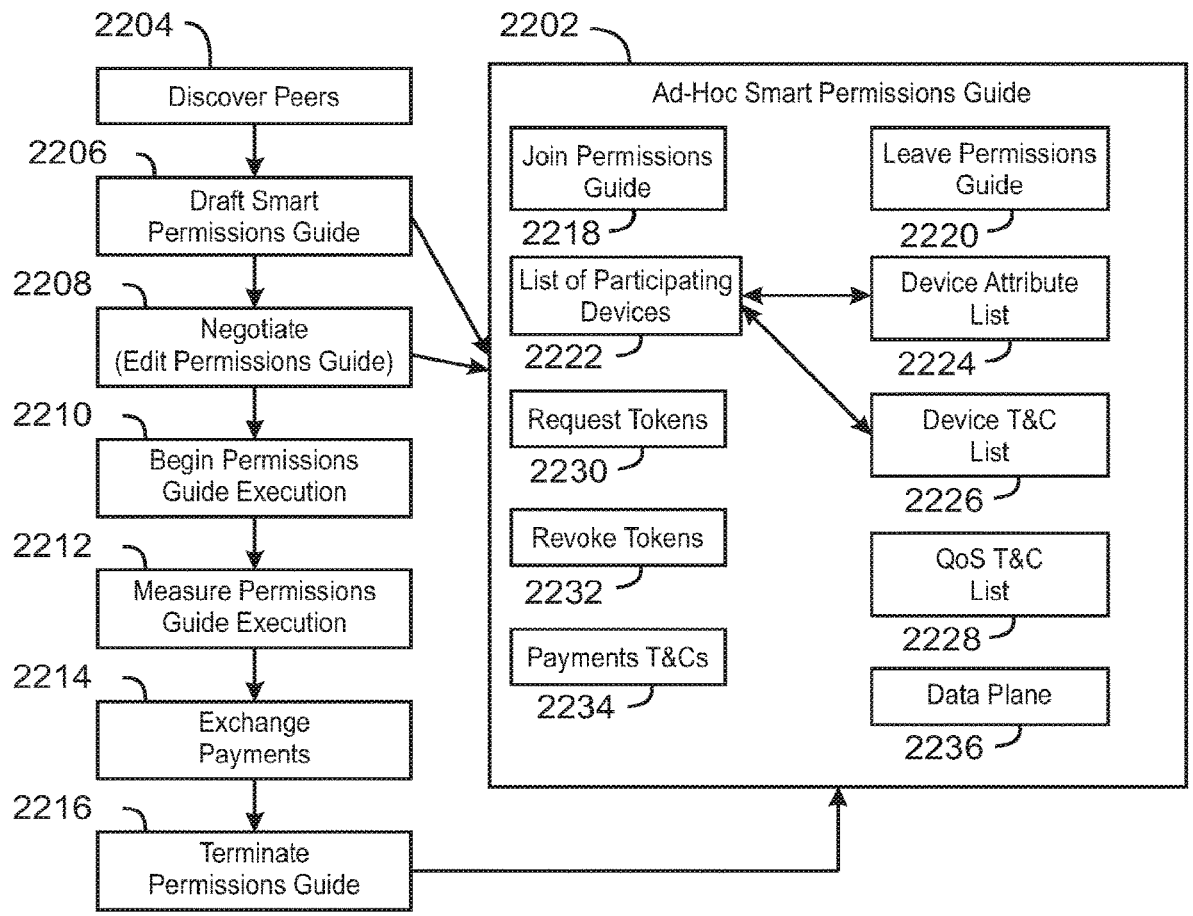
FIG. 22 is a schematic diagram of an example method for a task definition and commissioning in accordance with some embodiments.

FIG. 22 is a schematic diagram of an example method 2200 for task definition and commissioning in accordance with some embodiments. The method 2200 of FIG. 22 may be implemented by the IoT device 2400 described with respect to FIG. 24. The schematic shown can represent task definition and commissioning for ad-hoc permissions guide and permissions guide functions 2202. A process of interaction however can begin at 2204.

At block 2204, a device can identify the peers it uses to carry out a task. While devices can perform this discovery, the term device in this context can also refer to agents or services acting through a single device or a number of devices. The discovery of peers and their capabilities at block 2204 can be through a discovery procedure of the device, the system of request, a defined protocol or through a bloom filter hop method of resource discovery as described above.

At block 2206, a device may generate a permissions guide and permissions guide functions 2202. The permissions guide and functions may be machine readable. The permissions guide can be stored on a block-chain, off a block-chain. In an example, the permissions guide can be discoverable and can advertised to the peers discovered by the device. At block 2206, the device can compose a function to be performed into discrete functions to be written into a permissions guide. In an example, the function can be fixed function, general purpose, or specialized code segments. The functions can be authored by human developers, Artificial Intelligence (AI) methods for generating code, or any combination. In an example, the functions may be generated through genetic algorithms.

At block 2208, a permissions guide may be negotiated or edited by the device, peers, or any other party in an ad-hoc network of the devices and peers. Many different aspects of the permissions guide can be edited. For example, the permissions guide may have a format described above that contains methods for joining and leaving the permissions guide. As part of negotiating the permissions guide, edits may be made after the permissions guide advertises attributes and functions of the permissions guide. In response to the advertisement of attributes or functions, the peers of the device may agree to supply these attributes or functions by agreeing to the permissions guide or inserting or editing it. In an example, the device can, through the permissions guide, request the generation of tokens if an authorization by the device or a peer is provided in an attempt to access any services among the peers resources and other functions. In an example, the permissions guide can include functions with limits that have additional information including time constraints, quality of service, or a quality of data. In an example, the permissions guide can include other conditions that a permissions guide owner may request from participating peers. The permissions guide may outline a limited use of source peers. In an example, the permissions guide may move to permit multi tenancy.

As discussed above, terms can be negotiated by peers. For example, a data consumer and a data providers can have a mechanism to negotiate on terms before entering into the permissions guide. In an example, the parties may advertise terms and rates. In an example, the terms and rate can be negotiable. In this way, the entities partaking in the permissions guide can retain a position to ensure that they do not get bound into an unprofitable permissions guide. Examples of these conditions may include minimum subscription rates and periods which data suppliers may want to impose.

At block 2210, the permissions guide can execute. The execution of a permissions guide can be run indefinitely. In an example, the execution of the permissions guide can be for a fixed and specified time. In response to the failure of communications with service providers or data providing peers with permissions guide, the permissions guide may terminate. Similarly, new peers can take over functions of the permissions guide if they improve on function performance from the device or service. Improvement of permissions guide function can include the performance of services used in the permissions guide at lower rates, higher data quality, or other measurable metrics. In an example, a listing of mechanisms for execution during permissions guide execution can be recorded to a permissions guide before the permissions guide commences.

At block 2212, the execution of the permissions guide can be monitored. Monitoring execution of the permissions guide can include searching for new peers and new nodes. At block 2214, a payment can occur between participating parties in response to an agreed upon condition of the permissions guide being met. In an example, the payment can be specified in the permissions guide. At block 2216, the permissions guide can be terminated once the period of the permissions guide expires. In an example, the permissions guide can be terminated in response to a determination that any of the participating parties leave the permissions guide and no replacement parties can be located. In an example, the permissions guide can be terminated in response to a detection that the purpose for which the permissions guide was created has been fulfilled.

Within the ad-hoc permissions guide 2202, the permissions guide functions may be described. For example, a function within the ad-hoc permissions guide 2202 can include join permissions guide function 2218. The join permissions guide function can implement as it has been described above. The ad-hoc permissions guide 2202 can also include a leave permissions guide function 2220 as described above. The ad-hoc permissions guide 2202 may include a function to list of participating devices 2222 which may be similar to other listing device functions described above. The ad-hoc permissions guide 2202 may include a device attribution list function 2224 as described above.

In an example, the ad-hoc permissions guide 2202 may include a function to account for terms and conditions of devices added to the ad-hoc permissions guide 2202. The device terms and conditions listing function 2226 may allow devices joining the permissions guide to have conditions on their terms of service included as parameters or functions within the ad-hoc permissions guide 2202. In an example, the device terms and conditions listing function can also include a function for enforcing penalties that can be agreed upon as part of the permissions guide to be imposed on or agreed to by participating parties of the permissions guide.

In an example, the ad-hoc permissions guide 2202 may include a function to account for the quality of service (QoS) terms and conditions (T&C) list 2228. In the QoS T&C list 2228 may include allowing a consumer of service data from a permissions guide to stipulate QoS rules about the supply of the service and data. These rules can include, for example, specification of data availability, service availability, frequency of supplied data, accuracy of supplied data, and the granularity of the data. The QoS T&C list 2228 may also include a rule if the data is from a trusted sensor, where the data may be from a trusted sensor when the providence of the data can be shown to have come from, for example, a measurement by a sensor as opposed to being a value generated by a piece of code in a processor. The ad-hoc permissions guide 2202 may include a request token function 2230 and the revoke token function 2232 as described above.

In an example, the ad-hoc permissions guide 2202 may include a function to account for the payment terms and conditions. Accordingly, the ad-hoc permissions guide 2202 may include a payment T&C function 2234 to show events that trigger payments between the parties. In an example, these events that trigger payment between parties may include the fulfilment of supply of service of a subscription, the fulfillment of supply of data on a subscription. The T&C functions 2234 can be written to function within the framework of a pay-per-use model, or other model where there can also be a function for the imposition of a penalty on a party to the permissions guide for failure to comply with a previously agreed condition.

In an example, the ad-hoc permissions guide 2202 may include a data plane function 2236. The data plane function 2236 may allow parties to the permissions guide to agree how the data or service will be supplied and consumed. The data plane function 2236 may specify that data may be shared in an off-chain mechanism, and the data plane function 2236 may specify specific endpoints and endpoint technologies to which data can be made available. In one example, the data can be made available through a function subscribing the endpoint to a source or through a function that publishes data for consumption. In an example, the means of data consumption and service consumption by parties participating in the permissions guide 2202 may include authentication and authorization information. Parties to the ad-hoc permissions guide 2202 may supply a service or data and may specify how the parties may make consumption preferences available. Parties consuming data and services may also specify preferences on how the consuming parties may consume authentication and authorization.

The overlap shown for supply and consumption technologies may allow the parties to agree on methods of sharing for services and data without a human getting involved. In an example, a protocol conversion broker may be introduced as a party who may join the permissions guide 2202 to offer automated conversion or automated proxying of the service and of the data to the endpoint type or data format desired by the consumers and consuming parties.

Figure 23:
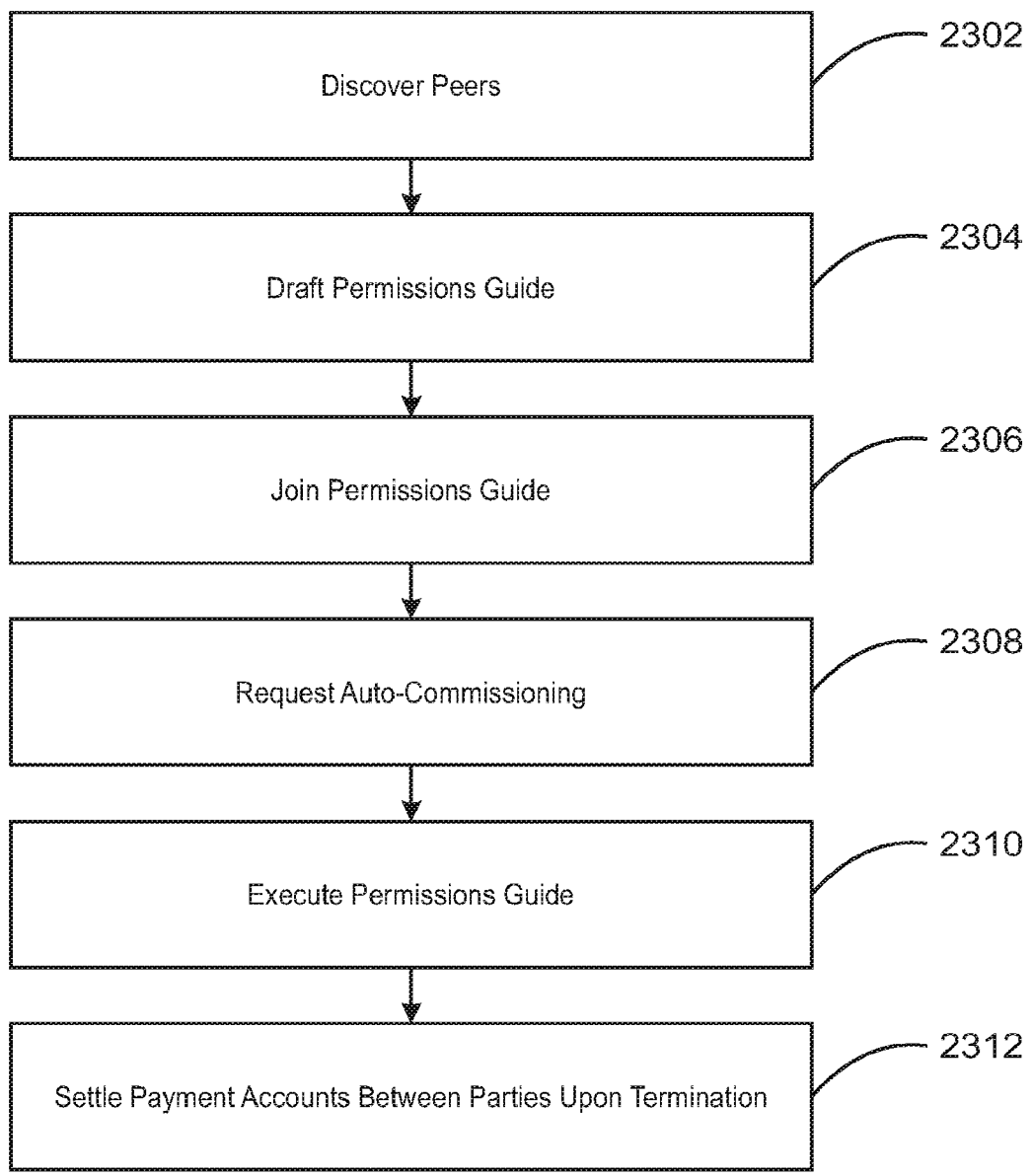
FIG. 23 is a process flow diagram of an example method for protocol conversion brokering by a protocol conversion broker in accordance with some embodiments.

FIG. 23 is a process flow diagram of an example method 2300 for protocol conversion brokering by a protocol conversion broker in accordance with some embodiments. The method 2300 of FIG. 23 may be implemented by the IoT device 2400 described with respect to FIG. 24. The concept of a protocol conversion broker may be, for example, a party who can join the permissions guide to offer automated conversion or automated proxying of the service/data to the endpoint type or data format desired by the consumers. Process flow may begin at block 2302.

At block 2302, peers can be discovered. This can be done by the protocol conversion broker, by party, or by a permissions guide 2202 computation. In an example, the discovery of peers may be an initial phase or may be repeated throughout the process to ensure peers are known.

At block 2304, a permissions guide 2202 may be drafted between potential participants. The drafting of an ad-hoc permissions guide 2202 can include the definition of a task or tasks to be undertaken during drafting of the ad-hoc permissions guide 2202 phase. In an example, a task may refer to the supply of a service. In an example, supplying a service can make use of information provided by suppliers regarding the service. Suppliers of services may advertise their services through a lookup service. A lookup service may be centralized or decentralized. One method of looking up services is described herein. In an example, this drafting of the ad-hoc permissions guide 2202 can include a phase of exchanges where peers in the permissions guide 2202 may have specified ranges for particular parameters. Parameters may be marked by a party as preferred. Parameters may provide an ordered weighting of the preference compared to other party preferences.

At block 2306, the permissions guide 2202 can be joined. The protocol conversion broker may join the permissions guide 2202. The protocol conversion broker may oversee the joining of the permissions guide 2202 by a party or several parties. In an example, the permissions guide 2202 may include a time-to-live (TTL) parameter which may be used later to determine if the permissions guide 2202 ends or if the consumers of the service wish to continue and try to find alternative suppliers. Devices exposed to the permissions guide 2202 may also have a minimum number of parties to meet parameters of the permissions guide 2202. In an example, these listed parameters can be outlined in terms of services, attributes of the participating devices, T&C's, and QoS parameters. During a joining permissions guide phase, parties may join, leave, or be ejected from the process in response to the identification of a lower cost entity for execution of a task of protocol. Similarly, parties may join, leave, or be ejected in response to identification of an entity for execution of a task or protocol with a higher net value entity.

In an example, if there are three particular features and attributes that are favored to be present by the task consumers, these features and attributes might be initially supplied by three different parities at varying costs. During this phase, in this example, in response to identification of a single party that may supply the service at a better price point, then use of this found single party may be a more optimal solution.

At block 2308, a protocol conversion broker can request an auto-commissioning of the service providing nodes. The service providing nodes may refer to nodes that provide services outlined in the ad-hoc permissions guide 2202. Auto-commissioning may include deployment of microservices out to IoT devices in the field which contain functionality to process data and services in a way specified by task consumers. In an example, auto-commissioning may involve tasks that are possible to do automatically, or remotely in a reasonable period of time without manual intervention. Auto-commissioning may also, if specified, use manual deployment of devices in the field. The manual deployment may include deployment by humans, trained animals, drones, or robots. In an example, manual deployment may be used in a version of this process if the QoS settings including the time of deployment by suppliers meet the requests of the permissions guide 2202 by the parties.

In an example, tokens or objects to describe functions including constants, identifiers, operators, reserved words, and separators, and preambles can be provided to the parties within the permissions guide 2202. A preamble, as previously described, may involve a configuration, initialization, and exchange of any information between peers which may be used to proceed further. A preamble may include the location of services, machine readable application protocol interface (API) descriptors, access credentials, access to keys. In an example, an unsuccessful preamble can include loss of a critical mass of suppliers, loss of the consumer, a drop out of the process. If a party drops out, the process can return to a drafting of the ad-hoc permissions guide 2202.

At block 2310, execution of the permissions guide 2202 begins, if a preamble and proceeding steps are present and successful. Based on the conditions and parameters of the preamble and the permissions guide 2202 and agreed to terms of the parties, payments can be unlocked if terms are met. In an example, the terms have been exchanged and agreed to in the drafting of the permissions guide 2202.

At block, 2312, final payments can be made through the protocol conversion broker in response to a detection that a peer is terminating their participation in the permissions guide 2202. If the permissions guide 2202 can continue to function with the existing members, the permissions guide 2202 may continue to function if there is a determination that the TTL has not expired. However, if the TTL expires prior to the process completing, then the permissions guide 2202 may end. In an example, if the permissions guide 2202 may not be able to continue without finding alternative suppliers or consumers, then the process may return to the discover peers phase 2302.

Figure 24:
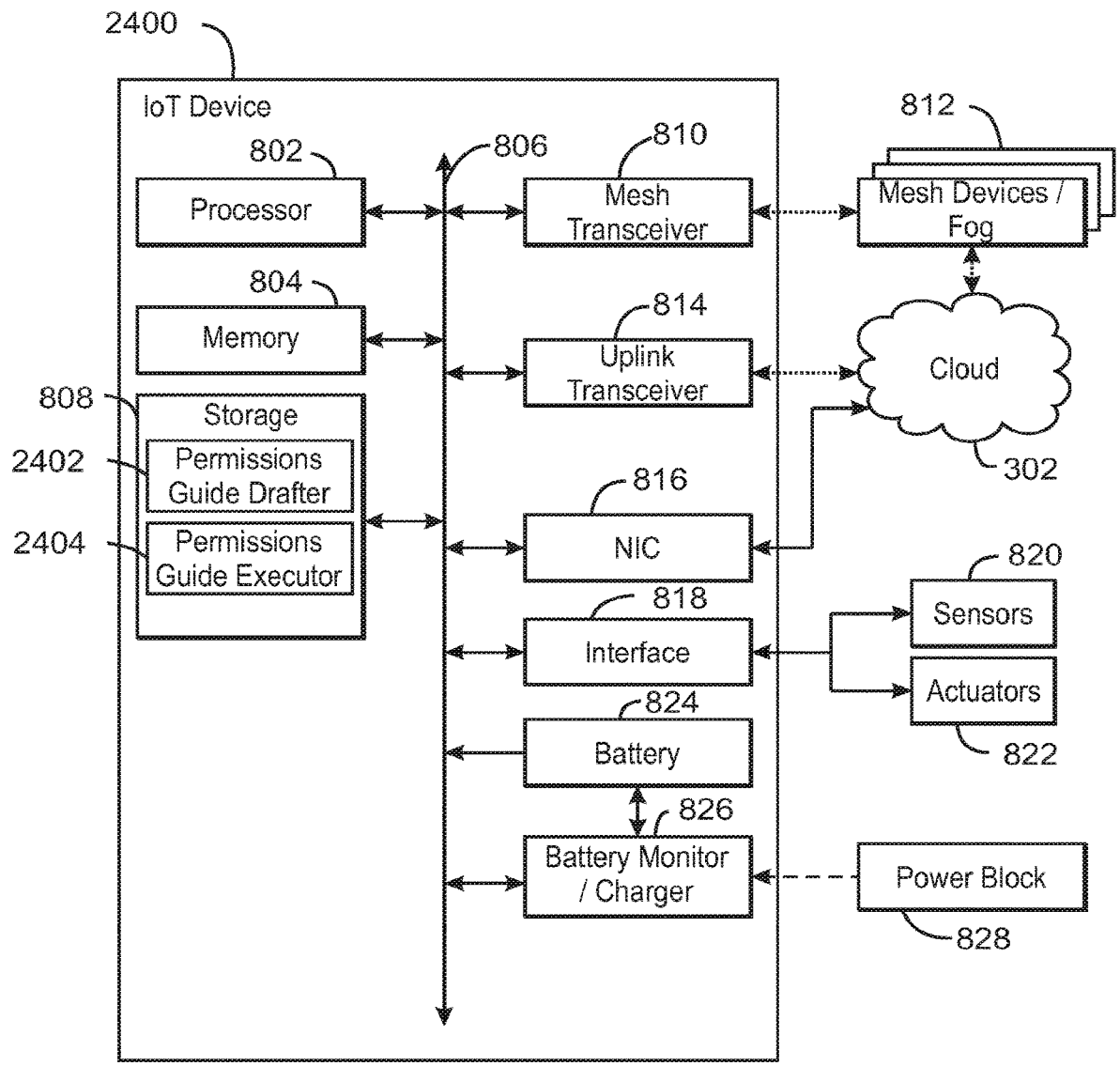
FIG. 24 is a block diagram of an example of components that may be present in an IoT device to define tasks and commission nodes in accordance with some embodiments.

FIG. 24 is a block diagram of an example of components that may be present in an IoT device 2400 to define tasks and commission nodes in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a permissions guide drafter 2402 to draft a permissions guide 2202 for a number of discovered peers, where the number of discovered peers each have a parameter, and where a term of the permissions guide 2202 may be generated in response to the term being allowable by at least two of the number of discovered peers. The parameter of each discoverable peer of the number of discovered peers may include a range of an allowable term range for an associated peer. The permissions guide drafter 2402 may include a function for listing of the terms and conditions of the number of discovered peers. The permissions guide drafter 2402 may include a listing of the quality of service terms and conditions for the number of discovered peers, for example. The permissions guide drafter 2402 includes a listing of data plane terms and conditions for the number of the discovered peers. In an example, the data plane may indicate a process for how the data is to be supplied and consumed by the peers. The permissions guide 2202 may also include a time-to-live as described above. In an example, the permissions guide 2202 may include a protocol conversion broker to manage the joining and leaving of the permissions guide 2202 by a peer. The permissions guide 2202 may include a preamble to manage the exchange of a configuration between the number of discovered peers.

The mass storage 808 may include an action executor 2404 to execute an action of the permissions guide 2202 in response to detecting that a condition of the term is satisfied. The action executor 2404 may include a function for auto-commissioning of a service to a peer instructing the peer to process data. In an example, the term refers to a rate of payment to be paid between the number of discovered peers, and a final payment may be made between peers upon a detection that a peer of the number of discovered peers is terminating participation in the permissions guide 2202.

Figure 25:
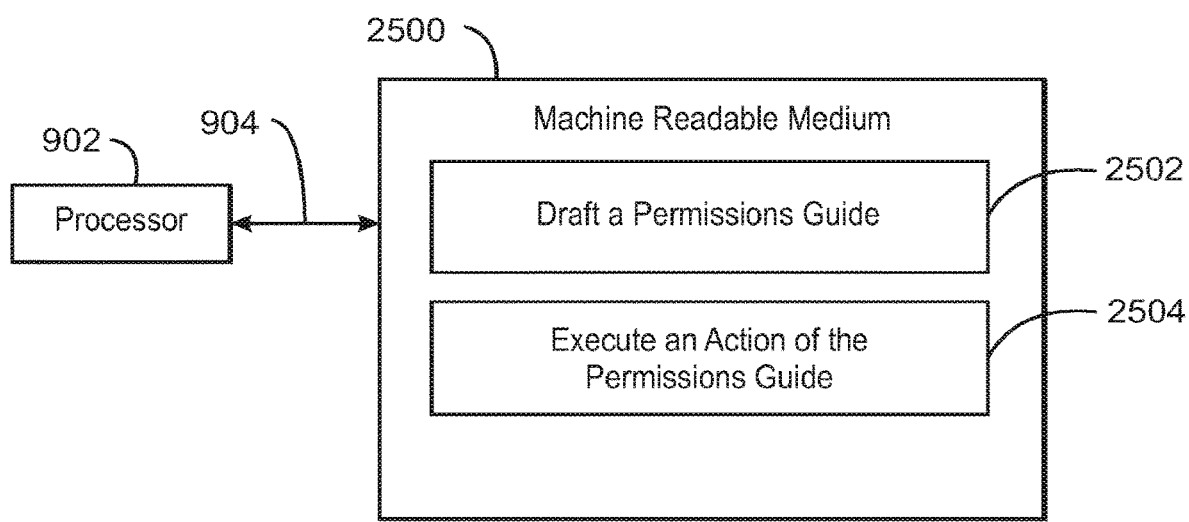
FIG. 25 is a block diagram of a non-transitory, machine readable medium including code to define tasks and commission nodes in accordance with some embodiments.

FIG. 25 is a block diagram of a non-transitory, machine readable medium 2500 including code to define tasks and commission nodes in accordance with some embodiments. Like numbered items are as they are described with regards to FIG. 9.

The non-transitory, machine readable medium 2500 may include code 2502 to direct the processor 902 to draft a permissions guide 2202 for a number of discovered peers, where the number of discovered peers may each have a parameter, and where a term of the permissions guide 2202 is generated in response to the term being allowable by at least two of the number of discovered peers. The drafting of the permissions guide 2202 may include a function for listing of the terms and conditions of the number of discovered peers. The drafting of the permissions guide 2202 may include a listing of the quality of service terms and conditions for the number of discovered peers. The drafting of the permissions guide 2202 may include a listing of data plane terms and conditions for the number of the discovered peers. The data plane may indicate a process for how the data is to be supplied and consumed by the peers. The permissions guide 2202 may include a time-to-live. The permissions guide 2202 may include a protocol conversion broker to manage the joining and leaving of the permissions guide 2202 by a peer. The permissions guide 2202 may include a preamble to manage the exchange of a configuration between the number of discovered peers.

The non-transitory, machine readable medium 2500 may include code 2504 to direct the processor 902 to execute an action of the permissions guide 2202 in response to detecting that a condition of the term is satisfied. Executing an action of the permissions guide 2202 may include, for example, auto-commissioning of a service to a peer instructing the peer to process data. As used herein, term refers to a rate of payment to be paid between the number of discovered peers. In an example, a final payment may be made between peers upon a detection that a peer of the number of discovered peers is terminating participation in the permissions guide 2202.

Message flows across an IOT network may establish a recognizable pattern over time but if an unauthorized agent gains access to the network, the unauthorized agent may be able to alter operations for their own purposes. As such, if transactions are visible in a block-chain it may be possible to detect such illicit activity on the network and take actions to resolve, or even to prevent what are effectively unauthorized transactions from occurring.

In an example, a block-chain may be used to keep a record of transactions on a network as well as a pre-authorization for a network agent to perform an operation. This pre-authorisation function may be referred to as a decentralized network access proxy (DNAP) protocol.

Figure 26:
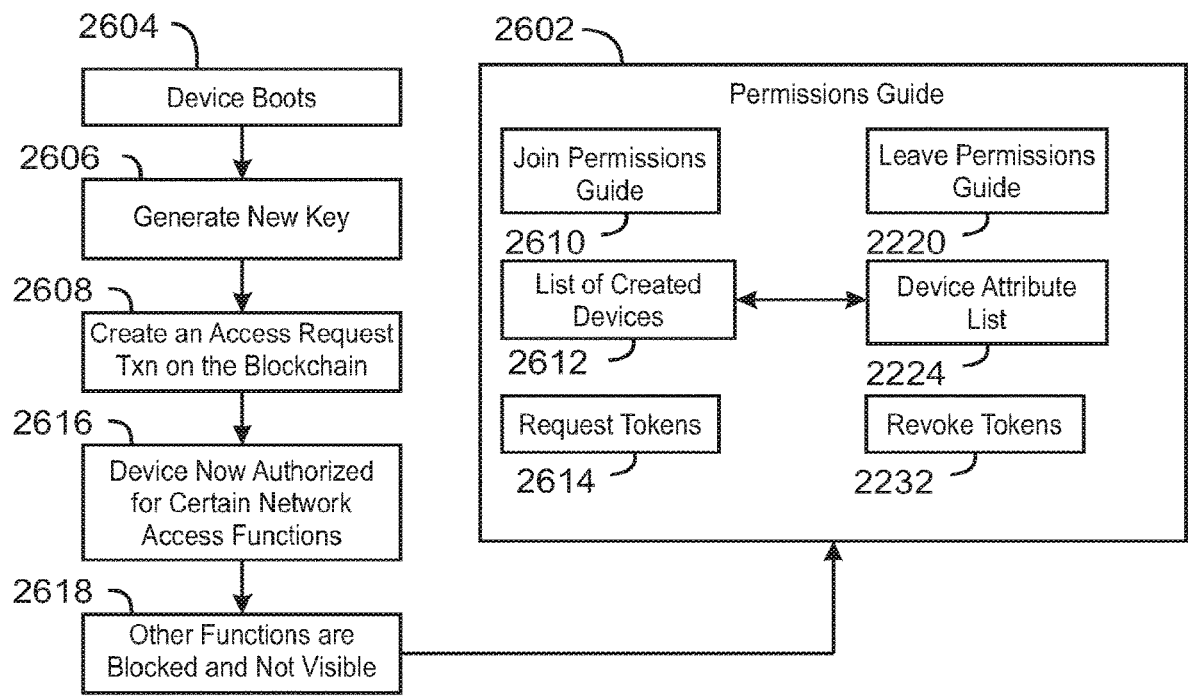
FIG. 26 is a schematic diagram of an example organization for the decentralized network access proxy to use functions in accordance with some embodiments.

FIG. 26 is a schematic diagram of an example organization 2600 for the decentralized network access proxy to use functions in accordance with some embodiments. Like numbered items are as disclosed in reference to FIG. 22. A process for the function of a DNPA protocol and its interactions with a permissions guide 2602 may begin at 2604.

At block 2604, a device may boot. The booting process may be the initialization of a network stack on a network interface device in a pre-execution environment (PXE) and may not imply the presence of a higher level software stack or operating system.

At block 2606, a network interface adapter may generate keys for use in operating as a block-chain aware device. The device using the generated keys may also be using or operating from a hardware enabled secure enclave. The generated keys may be used to sign traffic leaving the device so that the origin of the traffic for every packet and the content of every packet can be determined. In an example, the key based encryption for this device may be hardware enabled on the device and may assist in preventing man-in-the-middle attacks. A network may drop traffic arriving to the device if the traffic is not signed with the private key from a valid agent. In an example, in order to use network switches and routers a modification may be made to the network switches so that the hardware encryption and decryption of traffic may occur.

At block 2608, a network interface adapter may create an access request transaction on the block-chain. In an example, a packet being run on the network may be forcibly routed to a DNAP. In this context, the DNAP may be considered a function of the layer 2 data link layer as it may be running as a service on the physical switches and routers of the network. Once a network device attempts to use core network infrastructure then the network device may not be able to avoid having the network device traffic routed to the decentralized network access proxy if it attempts to use the core network infrastructure or a connection that is more than a private peer-to-peer connection over a dedicated medium. In an example, a peer-to-peer connection over a dedicated medium may include communication through Bluetooth or an Ethernet crossover cable.

At block 2610, the DNAP protocol may grant a device certain network access functions. In an example, the DNAP protocol may make use of previously discussed functions of the permissions guide. Nodes like switches and routers on a network running a DNAP protocol may become miners of a block-chain. In an example, the nodes of a network may run a consensus algorithm that does not use a large compute overhead or be based on direct participation in a transaction. A proof of elapsed time algorithm may be one example of a technology used in this protocol. The use of the DNAP protocol may also protect from the introduction of rogue switches and routers as a malicious actor would have to be able to deploy, or compromise 51% of the network infrastructure, for example, to execute a successful attack. An attempt by a DNAP device to use the access request transaction function may result in a network interface adapter identifying itself to the network through the mechanism of a permissions guide. The network interface adapter may run a hardware enabled secure enclave to assist in this process.

At block 2612, a DNAP using device may be added to a permissions guide list of created, or authorized, devices on the network, if the DNAP using device is accepted by the join function in the permissions guide. At block 2610, an initialization process may occur and the device may describe its attributes and features to the permissions guide. In an example, the DNAP described attributes may be attested through a hardware enabled secure enclave on the DNAP device to establish a level of trust. In an example, the description of attributes of the DNAP device may be defined in an extension to a human interface device (HID). The description of attributes or the data stored in the permissions guide may be stored off-chain. In an example, a switch or a router enabled with the DNAP protocol, storage of data off-chain may involve the integration of some storage within the switch. The switches and routers in a DNAP network may be edge or fog nodes. Storage may become a DHT type distributed storage mechanism on top of the routers and switches on the network.

At block 2614, tokens may be issued to devices to permit the devices to execute actions in an orchestrated manner. Use of tokens into a device may allow individual device firewalls for the entities on the DNAP network. In an example, if a device holds an interne control message protocol (IMCP) token, then the device may send and receive ping traffic. The use of tokens may allow the formation of virtual local area networks (VLAN) by allowing devices with the same tokens to talk to each other without going through a router. Tokens may also be used to create private networks which are not connected to larger enterprise ones.

Token assignments may have rules for assigning default token types to devices meeting certain criteria. These rules may govern the type of device and if the device complies with minimum security standards. In an example, the type of device may be a corporate owned and supported device or an employee owned device in a "bring your own" style plan. In some environments, such as an individual accessing a financial database from a personal device, the token assignments described herein may apply outside of a corporate environment. In an example, DNAP devices that are not authorized or which do not possess the tokens for certain actions may receive a notification that a device requested function has failed because the device is not authorized by the network. Using a token based approval approach can decentralize the enforcement of security on a network. In an example, network administrators may manually create tokens to represent actions that the network administrators permit or deny on the network. In an example, a pre-populated set of tokens may be provided by the network equipment manufacturers.

At block 2616, a DNAP device may be authorized on the network to perform certain functions. The DNAP device may be granted additional tokens or have tokens revoked. The control plane of this operation may be block-chain-backed. Block-chain-backed may refer to rules being enforced on a port or access point a device is connected to after the device is issued tokens, where the provided rules for the connected device do not generally change and the rules are enforced based on the confirmed identity of the device. In an example, switches and routers in the network may be miners and may synchronize transactions to a commonly shared ledger.

At block 2618, functions that a device may attempt to carry out may be blocked and the device may receive a message indicating that the network has blocked the communication.

Figure 27:
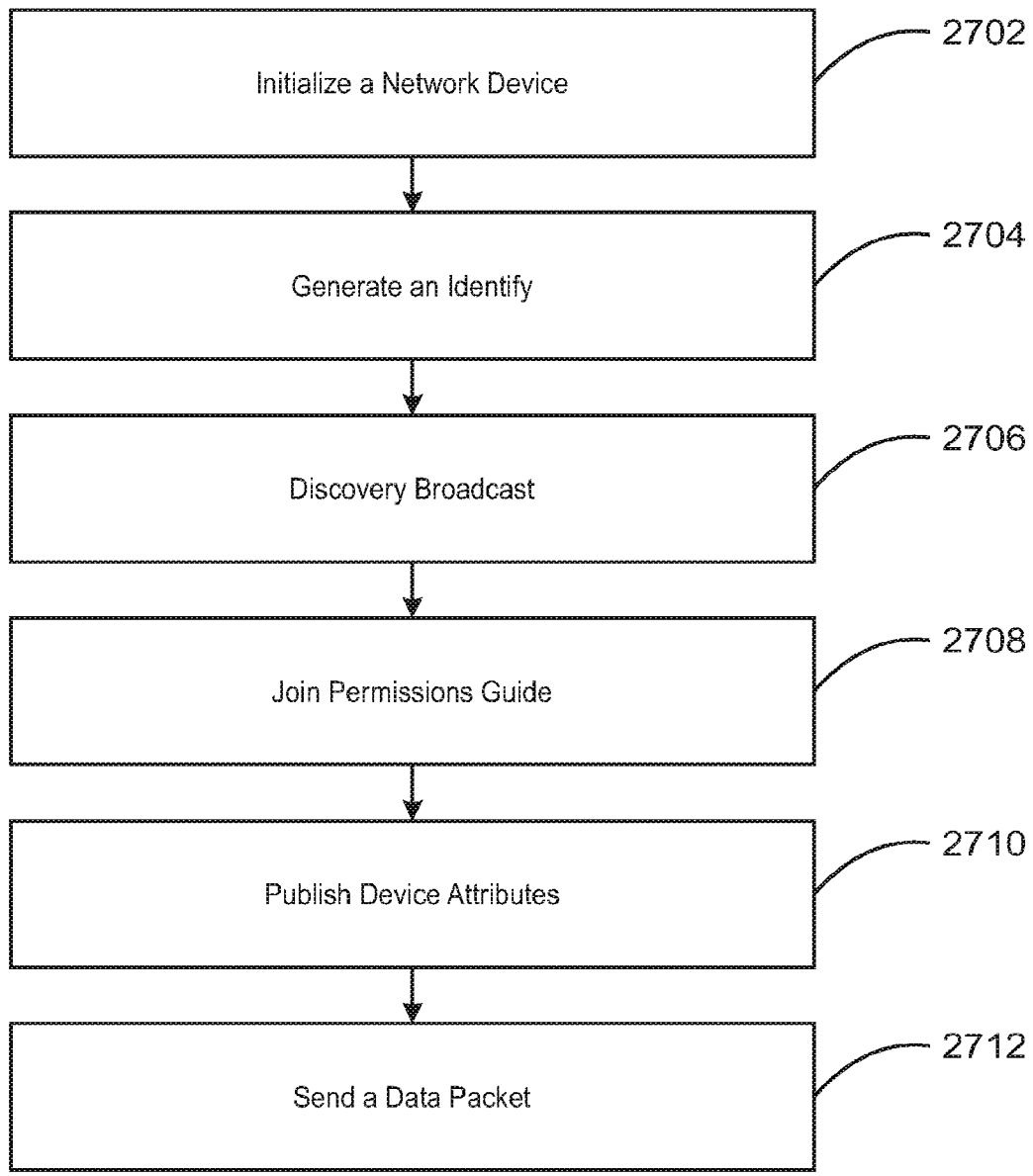
FIG. 27 is a process flow diagram of an example method for a decentralized network access proxy to use functions in accordance with some embodiments.

FIG. 27 is a process flow diagram of an example method 2700 for a decentralized network access proxy to use functions in accordance with some embodiments. The method 2700 of FIG. 27 may be implemented by the IoT device 2800 described with respect to FIG. 28. Process flow may begin at block 2702.

At block 2702, a network device may be initialized. In an example, the network device may be a client, a server, a piece of the network infrastructure, or a network interface. At block 2704, the firmware and hardware on the device generate an identity and allow the device to act in the capacity of a block-chain client. In an example, a node may have a network switch role or a router role and the device may act in the capacity of a validator for the DNAP block-chain. The DNAP block-chain may be distributed across all the network infrastructure nodes.

At block 2706, the device may publish a discovery broadcast message, similar to a preboot execution environment (PXE) or dynamic host configuration protocol (DHCP). In an example, the device and DNAP protocol could be implemented using PXE and DHCP protocols. In an example, if the discovery broadcast does not return the location of any DNAP-aware systems, then the network device may delay and retry. If the discovery broadcast does not return the location of any DNAP-aware systems, the device may perform a legacy operation allowing the device to operate on non-DNAP networks. The process of delay and retry, or the process of switching to another network may be controlled by a preset policy, BIOS settings, firmware settings, physical jumper settings on the device, or otherwise manually adjusted.

At block 2708, the DNAP device applies to join the DNAP network in response to discovering a DNAP network in operation. As discussed above, joining the DNAP network may include joining a permissions guide that is followed in the network.

At block 2710, a DNAP device may publish its attributes and features and request tokens that may be assigned to the DNAP device based on the attributes or identity of the device. A decision to assign tokens may be controlled by a network administrator through the use of policies or based on, for example, the device's network, address, identity, device type, device capabilities, device features, or based on an effectiveness measure of the policy on the device and the permissions guide. As discussed above, constructing a permission guide may be accomplished by network engineers who may use a user interface or application program interface. The implementation of the permissions guide and tokens, may enable detailed control of network traffic on a per device basis. In an example, enterprise systems may allow Hypertext Transfer Protocol (HTTP) traffic or other specific types of traffic as a default for devices. Enterprise systems using the DNAP protocol may also provide devices with designated business function additional tokens to permit other traffic types when those devices may wish to use other network services.

At block 2712, the device may send a packet on the network. The operating system and the higher layers of the open system interconnection (OSI) stack may be unaware of this process. In an example, the sending of the device packet may be running at the network layer. The network may authenticate the packets in several ways. For example, the tokens may appended to the header of the packet, or the packets can be signed with the private key of the identity sending the packet. Packets arriving at the network may be permitted if the identity sending them can be verified and they possess the token to send that type of traffic. If the traffic is not permitted, the network operators may decide to send a negative acknowledgement (NACK) back to the client, otherwise the packet is routed across the network to its destination.

In DNAP, the network infrastructure itself may be acting as the validator nodes in a block-chain as the place where the consensus about the state of the system is stored. For a malicious entity to compromise this approach, the malicious entity would need to compromise 51% of the network infrastructure, for example. Compromising a majority of network infrastructure may result in more burden to malicious entities as there are many locations that would need to be compromised rather than a single centralized firewall service. The consensus of the network infrastructure may be an access control list (ACL) command list (C-List). In an example, once a consensus of network infrastructure is established with a decentralized protocol, the methods described above could be re-written or mapped on the management of ACL or C-LIST stored in the block-chain. In an example, the DNAP protocol could update status change based on triggering by transactions signed by agents with a valid address in the protocol.

As used herein with regard to security and communications with DNAP, the creator of a resource may issue tokens, tokens themselves may be transferable or not, and tokens can, based on instruction from a network operator, be used like disposable credentials. Using DNAP functional tokens, once a token is used, the token may not be used again, and thus tokens used in DNAP and similar systems may be used like a quota to control how much access a device gets to the network. A token may be set to function for X number of packets, or X volume of data, or X period of time, or it may have an infinite lease for some types of traffic and quotas for others.

Figure 28:
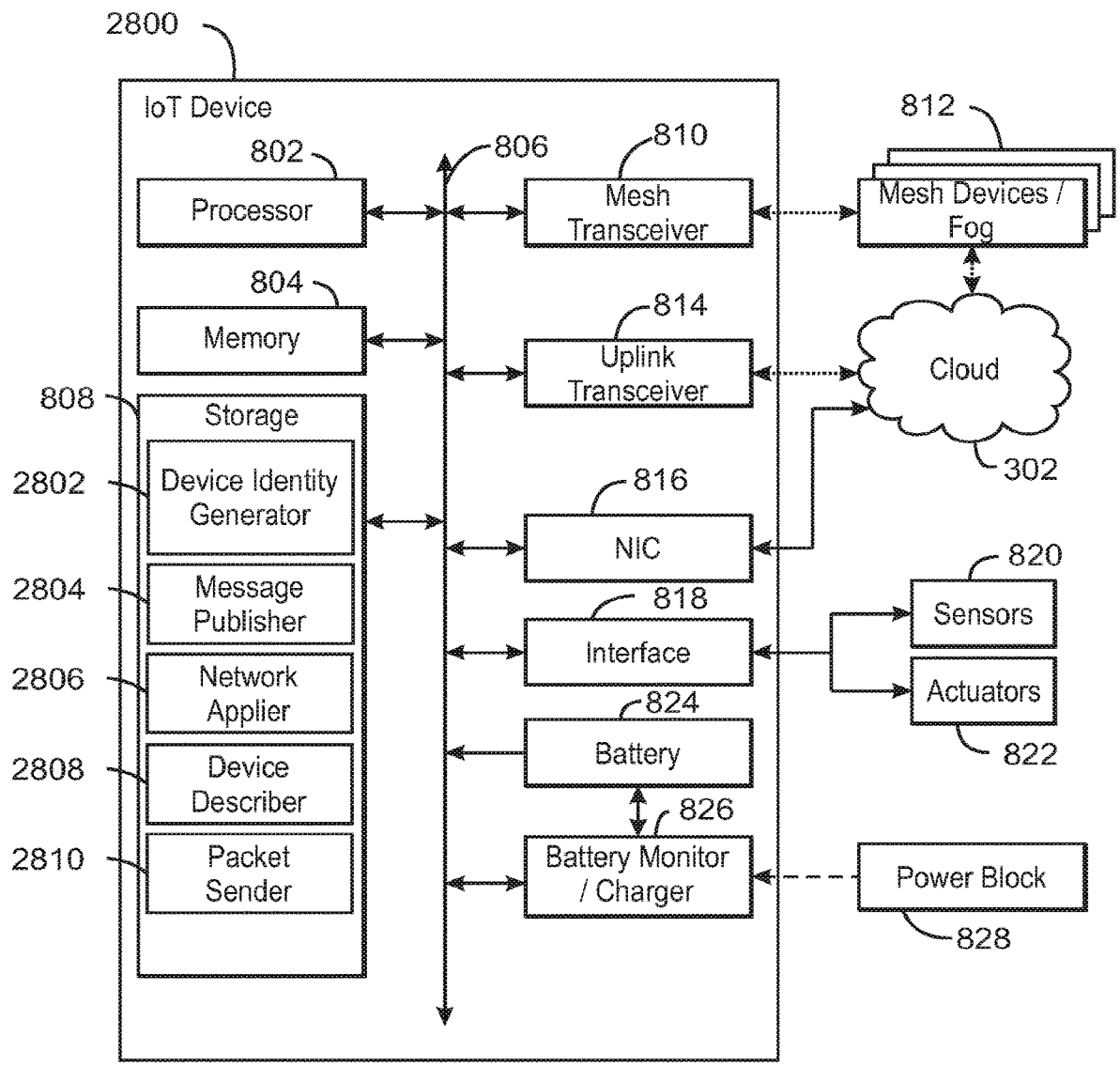
FIG. 28 is a block diagram of an example of components that may be present in an IoT device for negotiation with valued data units in accordance with some embodiments.

FIG. 28 is a block diagram of an example of components that may be present in an IoT device 2800 for negotiation with valued data units in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a device identity generator 2802 to generate a device identity for a device as a block-chain client. The device may request tokens from the DNAP. The tokens may grant the device the ability to send and receive network data other than peer to peer. In an example, the tokens may grant the device the ability to send and receive data on a layer of an open system interconnection layer of a network. In an example, the device may store a transaction record of transactions received and sent by the device, the transaction record to be shared with the DNAP. The device may generate keys to indicate an origin of a packet sent from the device. The device may be a block-chain enabled device and the device may store transactions sent by the device and received by the device on the block-chain. The descriptions of the device attributes may be stored off of a block-chain.

The mass storage 808 may include a message publisher 2804 to publish a discovery broadcast message from the device. The mass storage 808 may include a network applier

2806 to apply, from the device, to join a decentralized network access proxy (DNAP) network in response to the device receiving a response from a DNAP based on the published discovery broadcast message. The mass storage 808 may include a device describer 2808 to describe the identity and attributes of the device to the DNAP.

The mass storage 808 may include a packet sender 2810 to send a packet from the device through the network in response to access being granted to the device by the network based on the identity and attributes of the device. In an example, the packet may append a token and the combination of the packet and the token may be sent to be DNAP for verification, where the DNAP rejects both the packet and the token in response to a detection that the token is not accepted by the DNAP. In an example, the token may be valid for use with at least one of a threshold number of packets, a threshold volume of data, or a threshold period of time.

Figure 29:
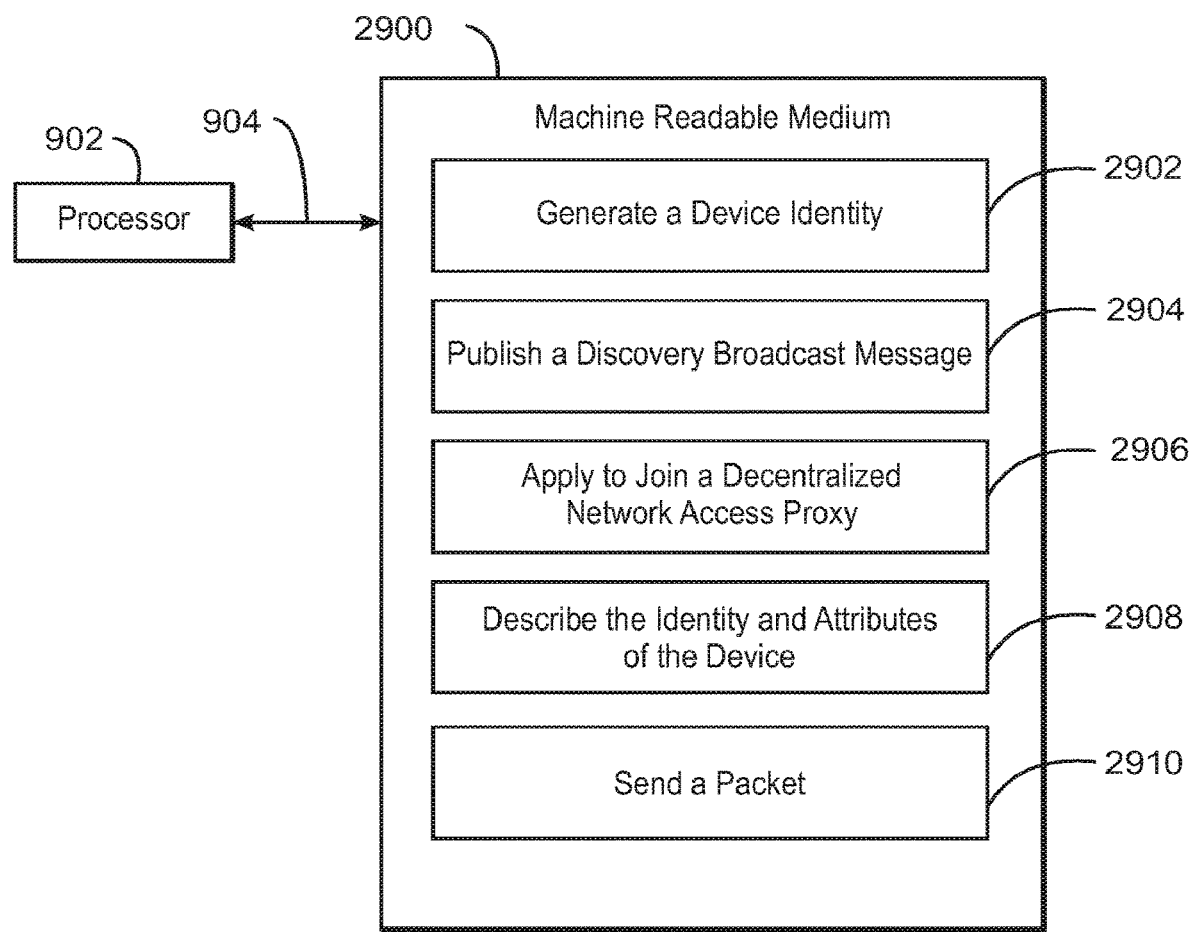
FIG. 29 is a block diagram of a non-transitory, machine readable medium including code to define tasks and commission nodes in accordance with some embodiments.

FIG. 29 is a block diagram of a non-transitory, machine readable medium 2900 including code to define tasks and commission nodes in accordance with some embodiments. Like numbered items are as they are described with regards to FIG. 9.

The non-transitory, machine readable medium 2900 may include code 2902 to direct the processor 902 to generate a device identity for a device as a block-chain client. The device may request tokens from the DNAP. The tokens may grant the device the ability to send and receive network data other than peer to peer. In an example, the tokens may grant the device the ability to send and receive data on a layer of an open system interconnection layer of a network. In an example, the device may store a transaction record of transactions received and sent by the device, the transaction record to be shared with the DNAP. The device may generate keys to indicate an origin of a packet sent from the device. The device may be a block-chain enabled device and the device stores transactions sent by the device and received by the device on the block-chain. The descriptions of the device attributes may be stored off of a block-chain.

The non-transitory, machine readable medium 2900 may include code 2904 to direct the processor 902 to publish a discovery broadcast message from the device. The non-transitory, machine readable medium 2900 may include code 2906 to direct the processor 902 to apply, from the device, to join a decentralized network access proxy (DNAP) network in response to the device receiving a response from a DNAP based on the published discovery broadcast message. The non-transitory, machine readable medium 2900 may include code 2908 to direct the processor 902 to describe the identity and attributes of the device to the DNAP.

The non-transitory, machine readable medium 2900 may include code 2910 to direct the processor 902 to send a packet from the device through the network in response to access being granted to the device by the network based on the identity and attributes of the device. In an example, the packet may append a token and the combination of the packet and the token may be sent to be DNAP for verification, where the DNAP rejects both the packet and the token in response to a detection that the token is not accepted by the DNAP. In an example, the token may be valid for use with at least one of a threshold number of packets, a threshold volume of data, or a threshold period of time.

The permissions guide may be used to provide decentralized authorization, authentication, and accounting for devices. The present disclosure discloses building blocks for an extension to Remote Authentication Dial-In User Service (RADIUS) and the related DIAMETER protocols. In an example, the disclosed techniques address scalability issues caused by centrally governed systems. These techniques may be applied to larger, distributed radius networks. In an example, members of large networks may run their own RADIUS servers at their campus, maintaining their own user accounts. In an example, authentication may proceed through RADIUS proxies routing a member's network access request back to the network of the member regardless of the location of the request. If a request to join a network is accepted at a member network, then the rest of the large network accepts the traffic from that origin as authenticated. This technique allows a network to avoid syncing user accounts across such a large, distributed and dynamic network. This technique can be added to in order to provide a vetting process when a new entity joins the network. This technique can be added to in order to provide confirmation that an entity operates their RADIUS servers securely and conforms to the criteria set by a set policy.

Figure 30:
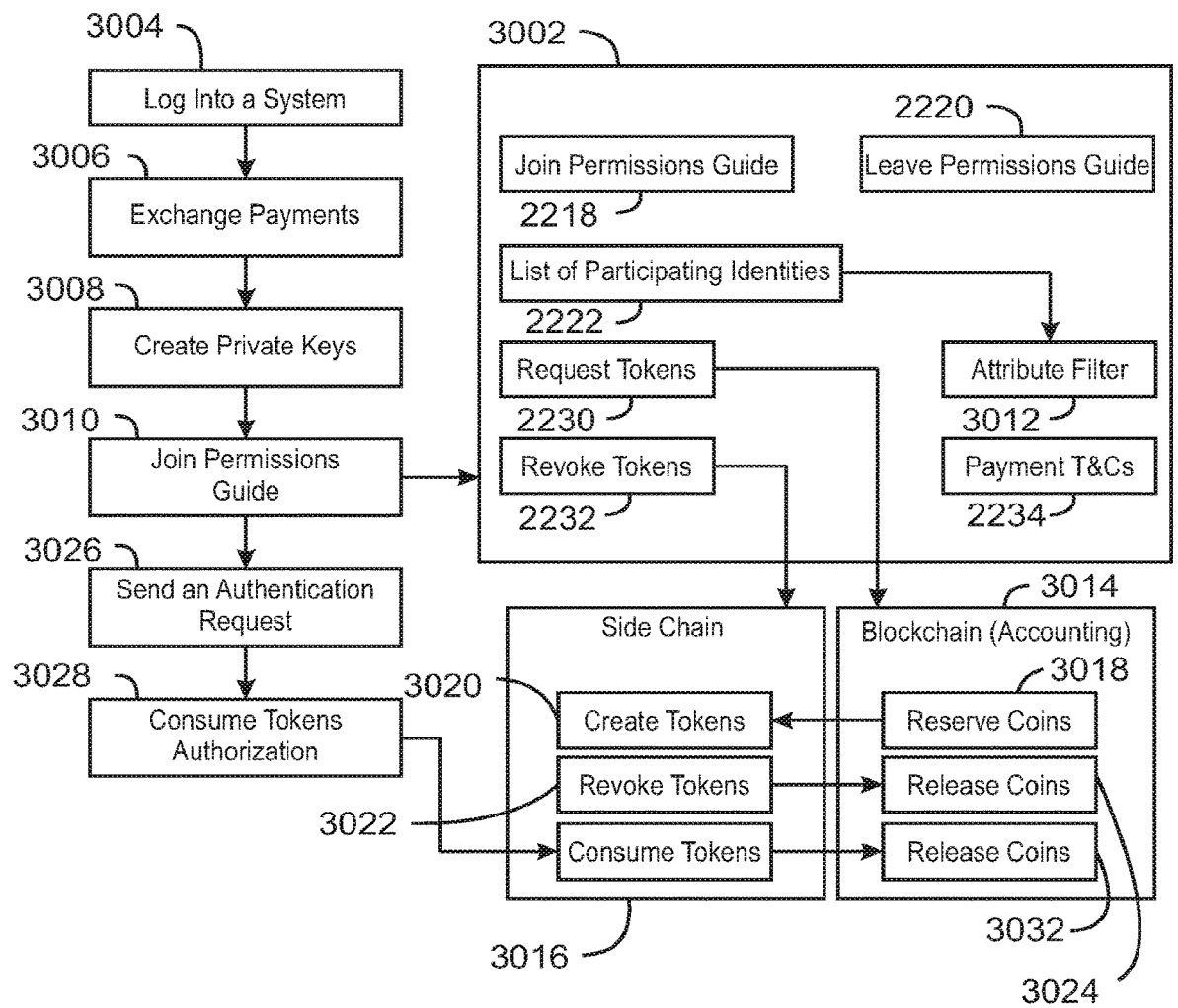
FIG. 30 is a schematic diagram of an example organization for a decentralized version of providing authentication, authorization, and accounting with a permissions guide in accordance with some embodiments.

FIG. 30 is a schematic diagram of an example organization 3000 for a decentralized version of providing authentication, authorization, and accounting with a permissions guide 3002 in accordance with some embodiments. Like numbered items are as disclosed in reference to FIG. 22. A process for the function may begin at 3004.

The organization 3000 and the method may be a complete system and may also be an extension to existing authorization, authentication, and accounting protocols. At block 3004, a user may log onto a centralized authority where they are already users. In an example, the user may be a student or faculty member of a university and the centralized authority may be a university network. While logged in, a user may create their profile. The use of the user profile, a password, or the network may be used together to validate a user identity to the system at this point. If the user is a device, rather than logging in to user account, the device may boot and commission device authentication by modules of the system.

At block 3006, a device of a user may exchange payments at the instruction of a use. In an example, a device of a user may be accessing a pay-per-use network and payment may be needed to access the network. A user through a user device may negotiate a payment with the network operator through the network. This kind of payment may be optional, for example, the network provider may provide free access. A network provider may choose to charge and in charging the network provider may specify forms of payment the network provider may accept. In an example, the network may accept cryptocurrencies or infocoin. Exchanging payments as described with regard to 3006 may be performed as listed or at the end of the process when the joining entity has accepted terms and the provider allows the joining entity the joining entry access.

At block 3008, private keys may be created for the user, and may be associated with an address. At block 3010, a user device may request to join a permissions guide. As described above at block 2218, joining the permissions guide may be an occurrence that happens once where the user device may become a permanent member of a network. In an example, joining a permissions guide may be time bound, or bound by other conditions. As described above, a join permissions guide function could ensure that certain conditions are met before accepting applicants. In an example, if a payment were made, the payment may or may not be finalized until the entire process of joining the permissions guide was completed.

As described above, at block 2222, the list of participating identities may be stored. Storage of participating identities may be done off chain. Storage may also occur in a hash. Further, with regard to storage of participating identities, a pointer may be used to identify a location where the identity information could be stored. The data stored may also be encrypted and limiting for authorized entities to view.

At block 3012, an attribute filter may be used to validate attributes. In an example, the validation may be done with a zero knowledge proof mechanism. Validation of attributes may use attestation. In an example, the attribute filter may validate conditions to operate on the network, for instance identifying whether or not an individual is over 18 years old. The attribute filter may allow the attestation of an attribute for an individual without the individual having to disclose their full identity.

At block 2230, like above, an applicant device may request tokens. As before, tokens may be unlimited or tokens may be limited. Tokens may or may not be backed by cryptocurrency coins. The use of tokens may allow a mix where some tokens may use payment to acquire and others are free as decided by a network operator. The request for tokens may involve additional steps that pass through a block-chain 3014 that performs accounting functions and a sidechain 3016 of the block-chain 3014. At block 3018, within the block-chain 3014, a payment or a function call from the permissions guide 3002 reserves coins on the block-chain. At block 3020, within the sidechain 3016, reserved tokens may be associated with sidechain 3016 in which tokens are created. The action of reserving coins or creating tokens in a sidechain 3016, where the tokens may be added block-chain constitutes a form of accounting where it may be possible to identify and construct which identities have requested which sorts of tokens.

At block 2232, like above, tokens may be revoked by an enactment of a policy of the permissions guide 3002. In an example, tokens may be requested to be refunded by an entity if the entity wishes to leave the permissions guide 3002. In response to a request from the permissions guide 3002, at block 3022, the tokens may be deleted from the side chain 3016. At block 3024, within the block-chain 3014, any coins associated with the deleted tokens in the sidechain 3016 may be released to a network provider or refunded to the entity depending on the reason for the transaction.

At block 2234, like above, payment T&Cs which the network provider asserts may be encoded into the permissions guide 3002. At block 3026 an authentication request may be sent. In an example, authentication works by the device sending a request to the network. A device may present a public key to the verifier party. In an example, the party sent the public key may check in the block-chain 3014 to determine if tokens are credited to such pubkey. Accessing different services on the network may request the holder to own different types of tokens.

At block 3028, tokens may be consumed. In an example, tokens may be consumed on a per use basis. Use of tokens on a per use basis may be a form of authorization that gives the network provider a method to allocate budgets to entities on their network on a per service basis. The provider may instead indicate that tokens are not per use and may be used without restriction by use. At block 3030, the consumption or presentation of tokens through the sidechain 3016 may be recorded as transactions on the sidechains. This recording may be seen as another accounting service. At block 3016, the sidechain may indicate if tokens are consumed. If tokens are consumed and if there may be a record of this consumption on the sidechain 3016. In an example, tokens consumed on the sidechain 3016 may be backed by coins on the main block-chain 3014. At block 3032, on the block-chain 3014, coins may be released back or paid back to a network operator and to the wallet of a provider.

Figure 31:
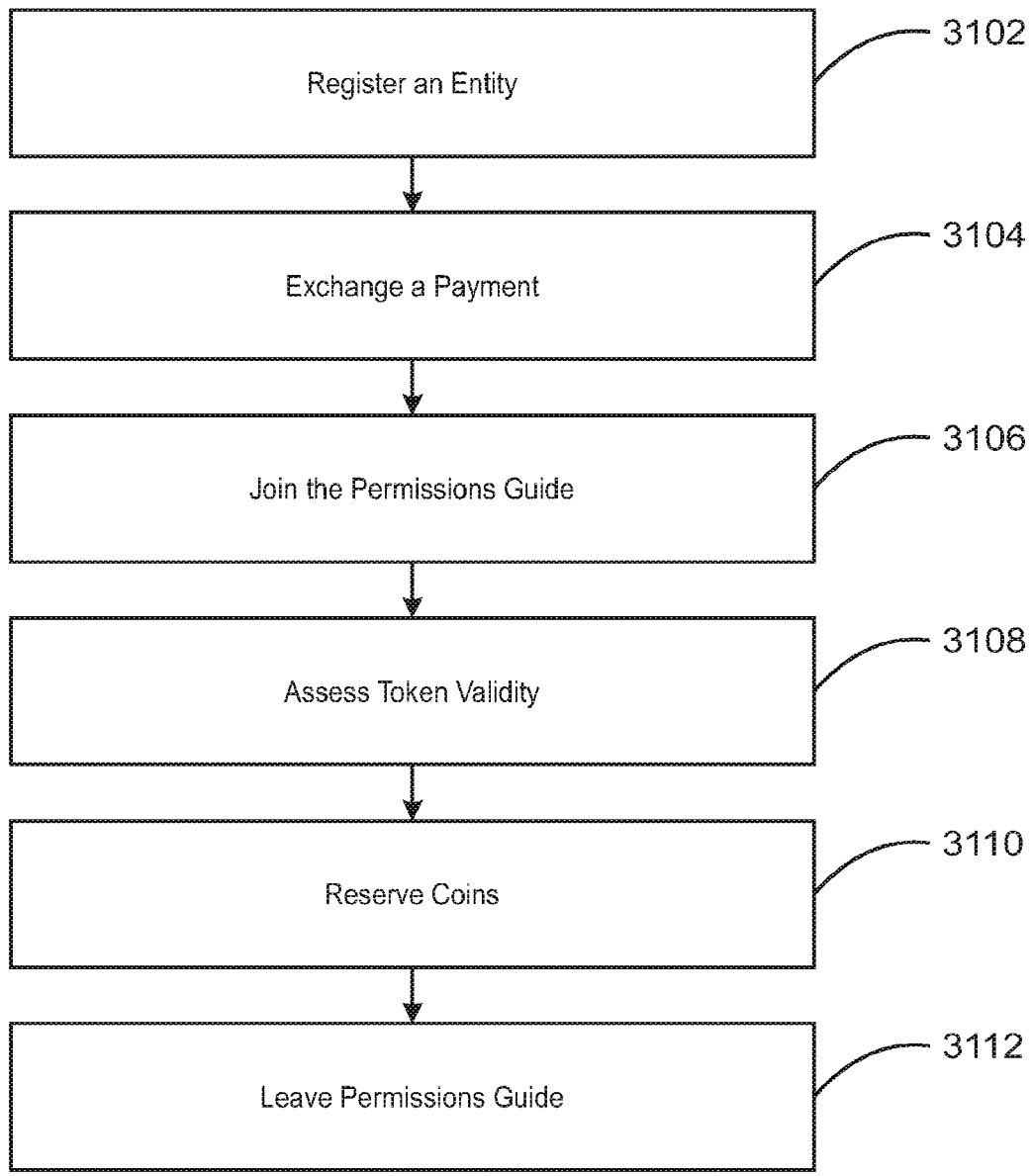
FIG. 31 is a process flow diagram of an example method for a decentralized version of providing authentication, authorization, and accounting with a permissions guide in accordance with some embodiments.

FIG. 31 is a process flow diagram of an example method 3100 for a decentralized version of providing authentication, authorization, and accounting with a permissions guide in accordance with some embodiments. The method 3100 of FIG. 31 may be implemented by the IoT device 3200 described with respect to FIG. 32. Process flow may begin at block 3102.

At block 3102, entities requesting to use the network may register, for example, through a portal or API. In an example, a portal may be provided by individual universities for attending students to register and pay fees. In an example, for entities seeking to join a machine-oriented network, such entities could join automatically using funds from any wallet or credit card provider.

At block 3104, a payment exchange may be used if the joining entity has no credit on the network they wish to join. At block 3106, joining entities may be entered into a smart contract by partaking in an exchange of payments. In an example, the attributes of the joining entities may be registered. In an example, attributes for a use may include date of birth and other personal data. In an example, attributes for machines may include type of device or type and version of software. Attribute data may be attested to if the attribute data is reported with supporting documentation. In the case of attributes for machines, these machine attributes may be attested by technical methods, including trusted sensing or hardware root of trust (HWROT). In response to this attestation, a list of the participating entities may be maintained in the permissions guide and the entities may now request tokens from the permissions guide.

At block 3108, tokens may be issue to an entity in response to confirmation of a valid identity request as determined by a consensus network. Tokens may be issued to an entity in response to an identity's balance on the network being greater than zero. In an example, a TTL may be set for the attestation for the entity. In an example, the attestation for the entity may be limited through time, usage, and geographically. In an example the limits may be enforced by tokens as tokens may work in some regions and not in others if the entity is mobile.

At block 3110, coins may be reserved against tokens. In an example, coins may be reserved in a sidechain. The process of reserving coins may be retried in response to unsuccessful attempts. In an example, the process may also include backing out of the transaction thereby refunding exchanged credit in the process. If an attempt to reserve coins is successful, tokens may be created and issued to the entity which can then send authentication requests. Authentication requests may attribute filtered as previously described. As tokens are consumed, the coins associated with them in the sidechain may be unlocked or released and these tokens may pass to a network provider.

At block 3112, an entity may leave a permissions guide. To avoid leaving a permissions guide, an entity may request additional tokens if the tokens of the entity are already consumed. In an example, if the entities identity is no longer valid on the network, the permissions guide may end. In an example, the network entity or the network provider may also initiate this process to evict the entity. Unspent tokens may be revoked or destroyed and remaining balance of funds for an entity may be refunded in accordance with the terms of the permissions guide.

Figure 32:
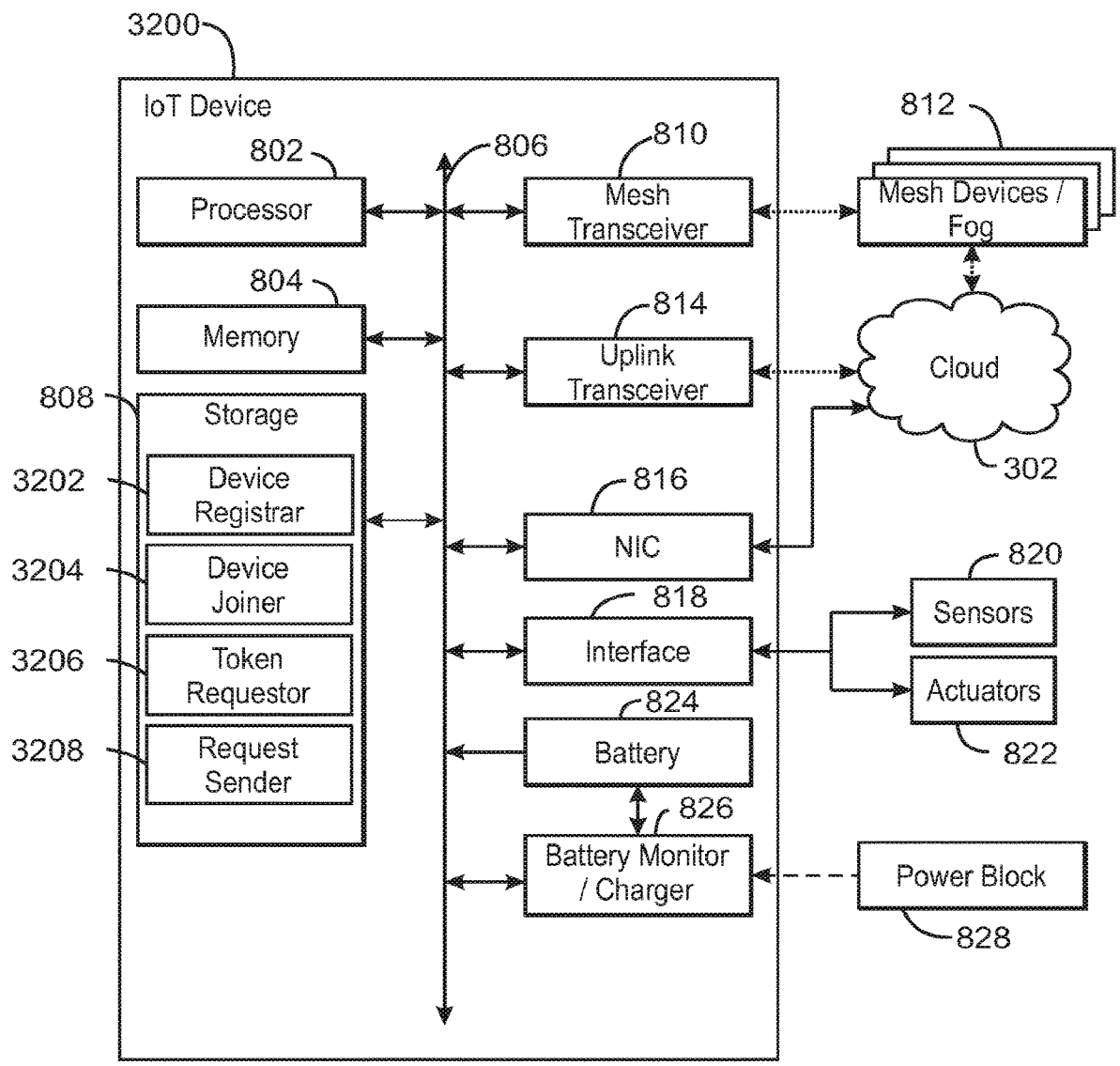
FIG. 32 is a block diagram of an example of components that may be present in an IoT device for decentralized authorization, authentication, and accounting with an IoT device in accordance with some embodiments.

FIG. 32 is a block diagram of an example of components that may be present in an IoT device 3200 for decentralized authorization, authentication, and accounting with an IoT device in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a device registrar 3202 to register a device to a first network through a portal to a second network, where the second network is authorized to access the first network. The device may execute a payment exchange to a wallet in the second network.

The mass storage 808 may include a device joiner 3204 to join a device to a permissions guide through agreement to obligations of the permissions guide. The mass storage 808 may include a token requestor 3206 to request a token using a function of the permissions guide, the token identifying the device as authenticated to access the second network. In an example, the request for the token may result in a reservation of a coin on an accounting block-chain to correspond to a token generated on a sidechain. A coin of the block-chain may be released in response to detecting a token being at least one of revoked and consumed by a sidechain. In an example, joining the permissions guide may include providing, from the device, attributes of the device to the permissions guide for an attribute filter to validate that the attributes of the device are allowed in the first network. The attributes may include an attribute of a user profile active while the device is joining the permissions guide. The token may destroy itself in response to being used as a form of authorization for the device.

The mass storage 808 may include a request sender 3208 to send an authentication request from the device to the first network, wherein the first network confirms the authentication in response to detecting the token. The token may be consumed on a sidechain in response to authentication of the device by presentation by the device of the token to the first network. The device may be authorized to access the first network based on authentication to the first network that the device has credentials to access to second network. In an example, authorization of the device to use the first network may expire based on at least one of number of accesses, volume of data accessed through the first network, and time of granted access.

Figure 33:
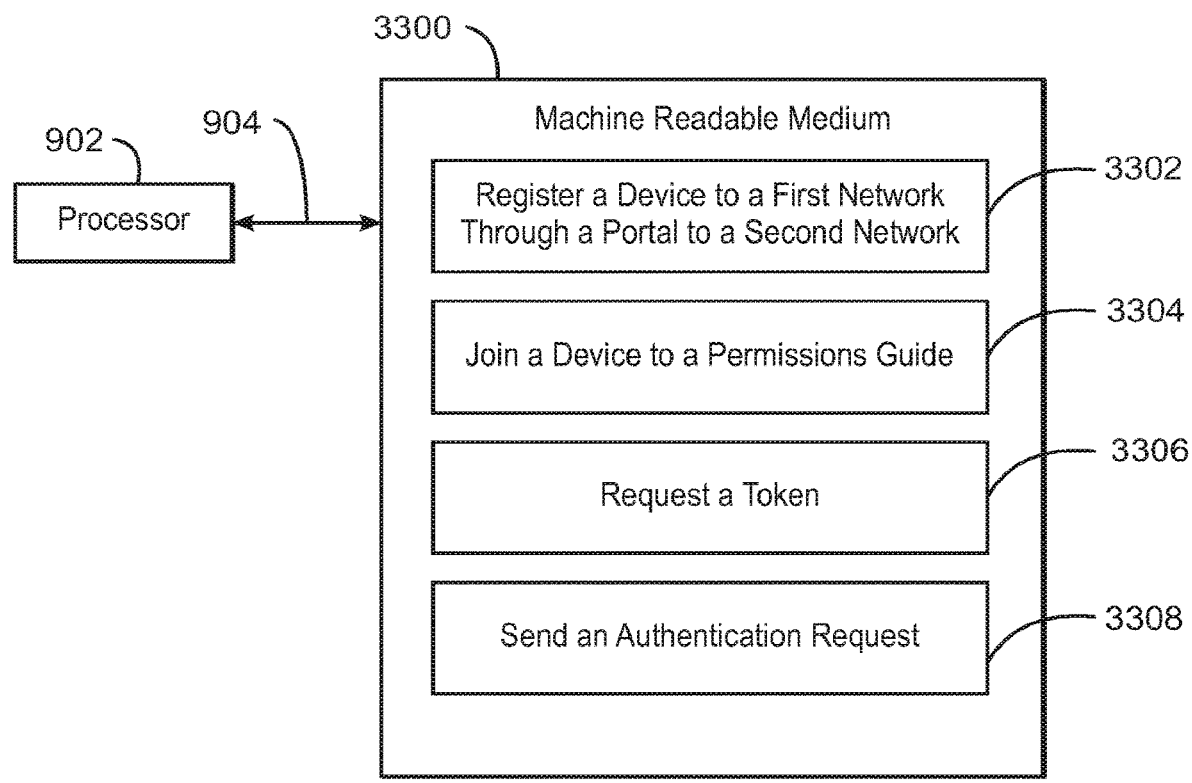
FIG. 33 is a block diagram of a non-transitory, machine readable medium including code for decentralized authorization, authentication, and accounting with an IoT device in accordance with some embodiments.

FIG. 33 is a block diagram of a non-transitory, machine readable medium 3300 including code for decentralized authorization, authentication, and accounting with an IoT device in accordance with some embodiments. Like numbered items are as they are described with regards to FIG. 9.

The non-transitory, machine readable medium 3300 may include code 3302 to direct the processor 902 to register a device to a first network through a portal to a second network, where the second network is authorized to access the first network. The device may execute a payment exchange to a wallet in the second network.

The non-transitory, machine readable medium 3300 may include code 3304 to direct the processor 902 to join a device to a permissions guide through agreement to obligations of the permissions guide. The non-transitory, machine readable medium 3300 may include code 3306 to direct the processor 902 to request a token using a function of the permissions guide, the token identifying the device as authenticated to access the second network. In an example, the request for the token may result in a reservation of a coin on an accounting block-chain to correspond to a token generated on a sidechain. A coin of the block-chain may be released in response to detecting a token being at least one of revoked and consumed by a sidechain. In an example, joining the permissions guide may include providing, from the device, attributes of the device to the permissions guide for an attribute filter to validate that the attributes of the device are allowed in the first network. The attributes may include an attribute of a user profile active while the device is joining the permissions guide. The token may destroy itself in response to being used as a form of authorization for the device.

The non-transitory, machine readable medium 3300 may include code 3308 to direct the processor 902 to send an authentication request from the device to the first network, wherein the first network confirms the authentication in response to detecting the token. The token may be consumed on a sidechain in response to authentication of the device by presentation by the device of the token to the first network. The device may be authorized to access the first network based on authentication to the first network that the device has credentials to access to second network. In an example, authorization of the device to use the first network may expire based on at least one of number of accesses, volume of data accessed through the first network, and time of granted access.

Some embodiments of the present techniques disclose decentralized authorization, authentication, and accounting on an IoT device using, for example, a Remote Authentication Dial-In User Service (RADIUS) and/or a DIAMETER protocol, among others. A decentralized proxy may sit in front of a RADIUS server, a DIAMETER server, or a RADIUS server running a DIAMETER protocol. A decentralized API may be built into a RADIUS service and/or a DIAMETER service. Existing calls may be wrapped to a RADIUS service and/or a DIAMETER service in a block-chain-type encryption mechanism. The block-chain-type encryption mechanism may be used as a layer of proof of the source of a request to, for example, enable the request to pass through for processing by the RADIUS sever and/or DIAMETER server.

Figure 34:
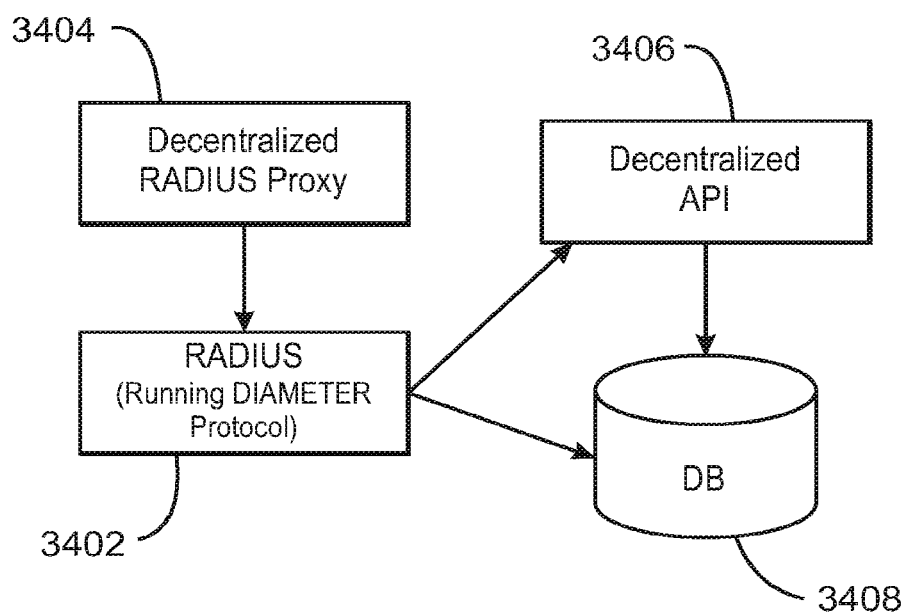
FIG. 34 is a schematic diagram of a technique for decentralized authorization, authentication, and accounting on an IoT device using Remote Authentication Dial-In User Service (RADIUS) or a DIAMETER protocol in accordance with some embodiments.

FIG. 34 is a schematic diagram of a technique 3400 for decentralized authorization, authentication, and accounting on an IoT device using a Remote Authentication Dial-In User Service (RADIUS) and/or a DIAMETER protocol in accordance with some embodiments. The RADIUS server 3402 may be locked from modifications, while the decentralized RADIUS proxy 3404 may be augmented functionality. The decentralized RADIUS proxy 3404 may take action before a message would arrive to a traditional RADIUS server. A decentralized API 3406 may be inserted between the RADIUS server 3402 and back-end database 3408 and may include modifications to the operation of the RADIUS service.

The decentralized RADIUS proxy 3404 may function when the RADIUS server 3402 implements a back end database 3408. In an example, the database 3408 may be a file or it may use any of a number of supported data stores. In the decentralized RADIUS proxy 3404, a service may sit in front of the RADIUS server 3402 and act as a decentralized filter. The decentralized RADIUS proxy 3404 may provide a security check by confirming the identity of a requester using decentralized mechanisms.

The calls that the RADIUS server 3402 uses may be modified to route them through a decentralized API 3406.

The decentralized API 3406 may be incorporated into the RADIUS servers code base as a set of classes which support the routing of RADIUS functions to a block-chain. The RADIUS server 3406 may become a block-chain client and perform identity and transaction validity checks. Alternatively, or in addition, identity and validity checks could be implemented as an external service which the RADIUS server is modified to support. With the decentralized API, the RADIUS server code may be modified such that the operation may enable identity and validity checking functionality. Exemplary mechanisms for performing the validity checks are described below.

Figure 35:
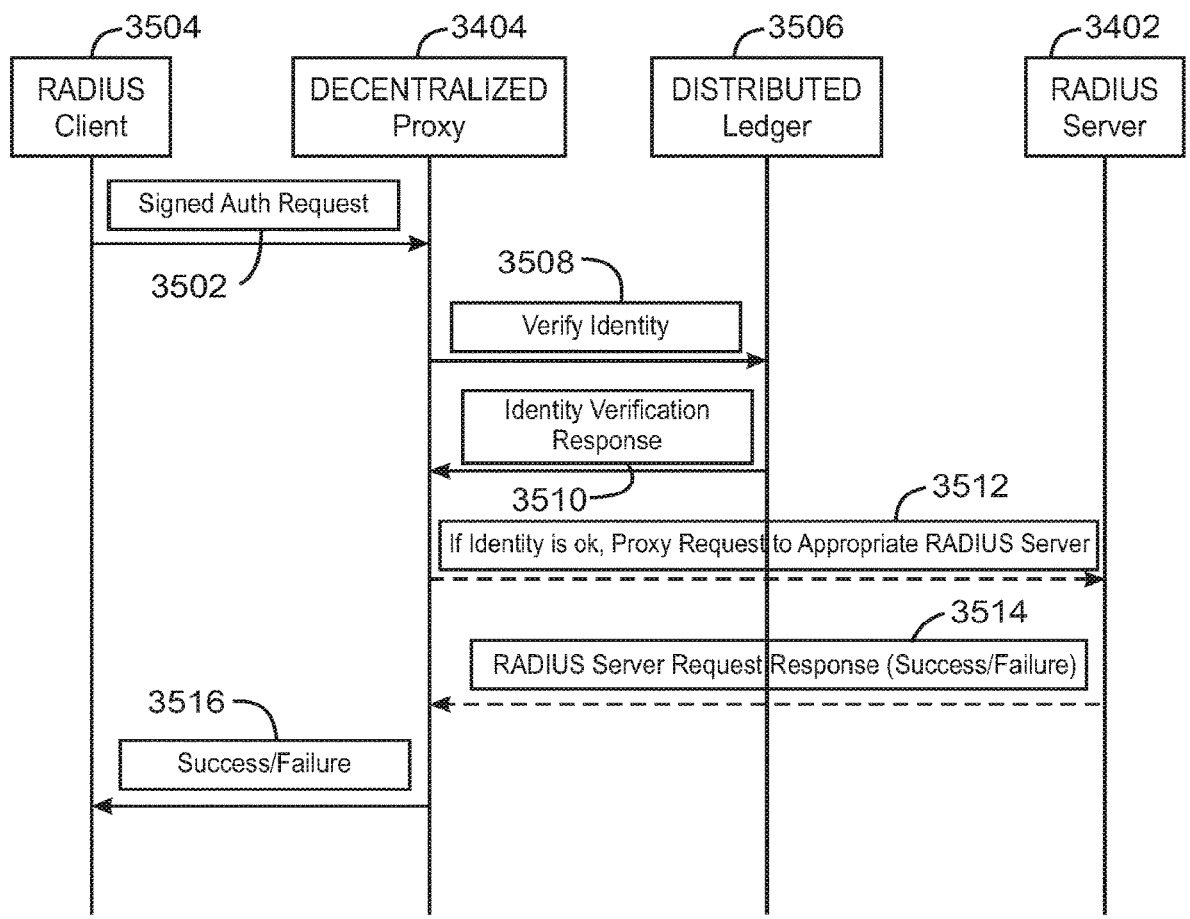
FIG. 35 is a schematic diagram of an action diagram for the components of FIG. 34 to act through a decentralized RADIUS proxy for authorization, authentication, and accounting on an IoT device in accordance with some embodiments.

FIG. 35 is a ladder diagram of an example method 3500 for the components of FIG. 34 to act through a decentralized RADIUS proxy 3404 for authorization, authentication, and accounting on an IoT device in accordance with some embodiments. The method 3500 of FIG. 35 may be implemented by the IoT device 3800 described with respect to FIG. 38. Like numbered items are as disclosed with regards to FIG. 34.

The decentralized RADIUS proxy 3404 may process a RADIUS authentication request 3502 from a RADIUS client 3504. The RADIUS client 3504 may be modified to sign the RADIUS request with a private key from the RADIUS client block-chain or from an identity of a distributed ledger 3506. An identity may be used to verify the identity 3508 the source of the request, and if the request may actually be the holder of the private key corresponding to the identity on the block-chain or distributed ledger 3506. The identity on the block-chain or the distributed ledger 3506 may have been previously established using a permissions guide as described in previous sections. For example, the identity may have registered for a service, joined a permissions guide, and may be listed as a participating entity within that contract, or the identity may also be a token holder. The identity verification could be done at runtime where a block-chain or a distributed ledger 3506 may accept the identity of the request the first time an authentication request signed by a new identity are seen. An identity verification response 3510 may be returned to the decentralized proxy 3404. In response to an identity being verified as acceptable, the decentralized proxy 3404 may request 3512 an appropriate RADIUS server. In response, the RADIUS server 3402 may respond 3514 that the request was approved as a success or denied as a failure.

A successful verification of identity may link multiple identities so that future RADIUS requests from the same user may be signed by the correct private key, where requests not including the private key may be rejected. The identity may present a token with a RADIUS request and respond with by comparing the verification against the block-chain or the ledger to validate that the identity. As before, validation may indicate that a request as a valid token holder, and an unsuccessful validation may still have identity verified by being listed as a member of a particular permissions guide. Validation may indicate when a currency on the block-chain is spent against the RADIUS request. For example, to make a RADIUS request, the identity may have some credit and coins on the block-chain to spend.

Figure 36:
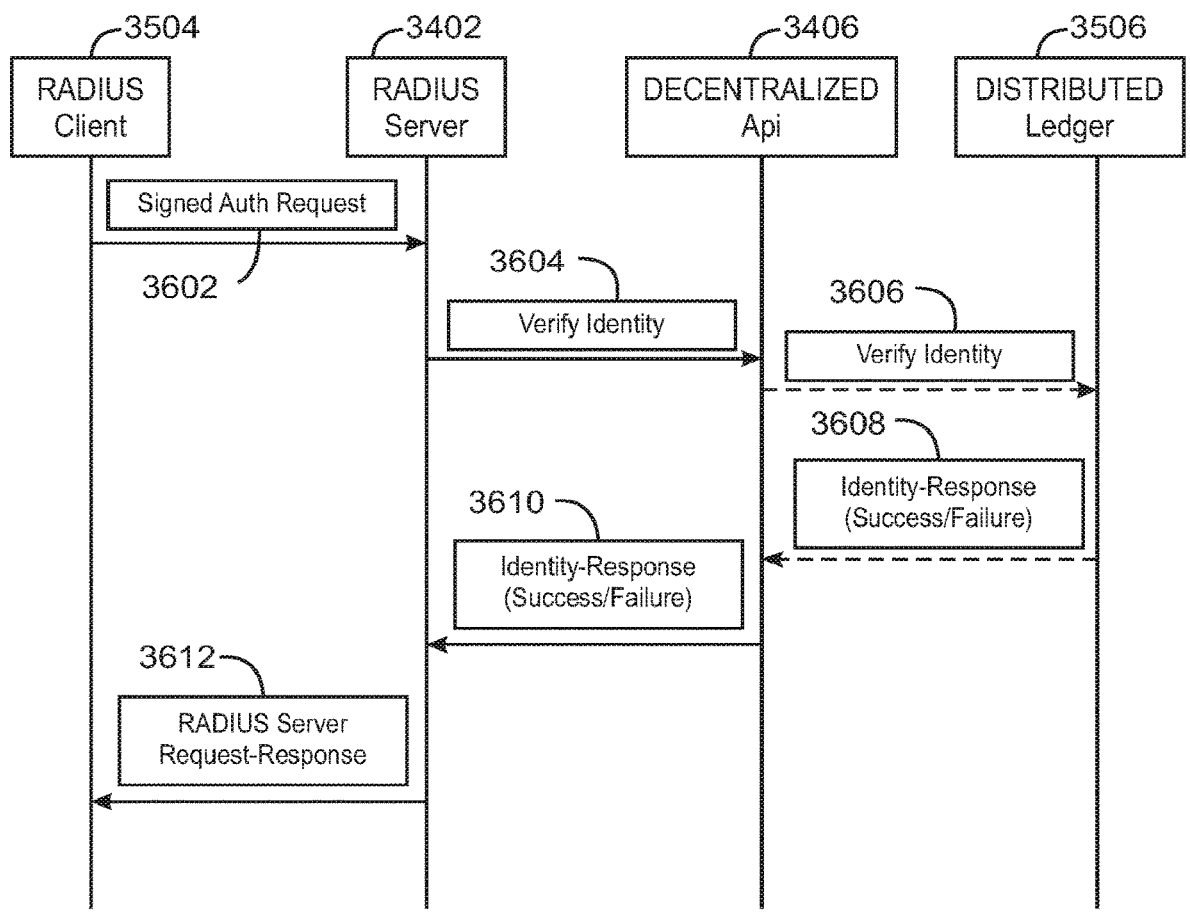
FIG. 36 is a ladder diagram of an example method for the components of FIG. 34 to act through a decentralized API 3406 for authorization, authentication, and accounting on an IoT device in accordance with some embodiments.

FIG. 36 is a ladder diagram of an example method 3600 for the components of FIG. 34 to act through a decentralized API 3406 for authorization, authentication, and accounting on an IoT device in accordance with some embodiments. The method 3600 of FIG. 36 may be implemented by the IoT device 3800 described with respect to FIG. 38. Like numbered items are as disclosed with regards to FIGS. 34 and 35.

The sequence of calls varies from the sequence of calls with regard to FIG. 35 as the calls, while similar in substance, may be addressing different actors. For example, in FIG. 36, the signed authorization request 3602 may be from the RADIUS client 3504 to the RADIUS server 3402. A verification of identity 3604 may be from the RADIUS server 3402 to the decentralized API 3406. A second verification of identity request 3606 may be sent from the decentralized API 3406 and to the distributed ledger 3506. In response, the distributed ledger 3506 may return an identity response 3608 to the decentralized API 3406 indicating either success or failure of the identity verification. In response, the decentralized API 3406 may return a second identity response 3610 to the RADIUS server 3402 indicating either success or failure of the identity verification. The RADIUS server 3402 may return a RADIUS server request-response to the RADIUS client 3504. A result of these actions may be the validation of the identity of the source of the RADIUS request, where the validation may, for example, be passed through a block-chain or a decentralized ledger, before the request for validation may be processed.

Figure 37:
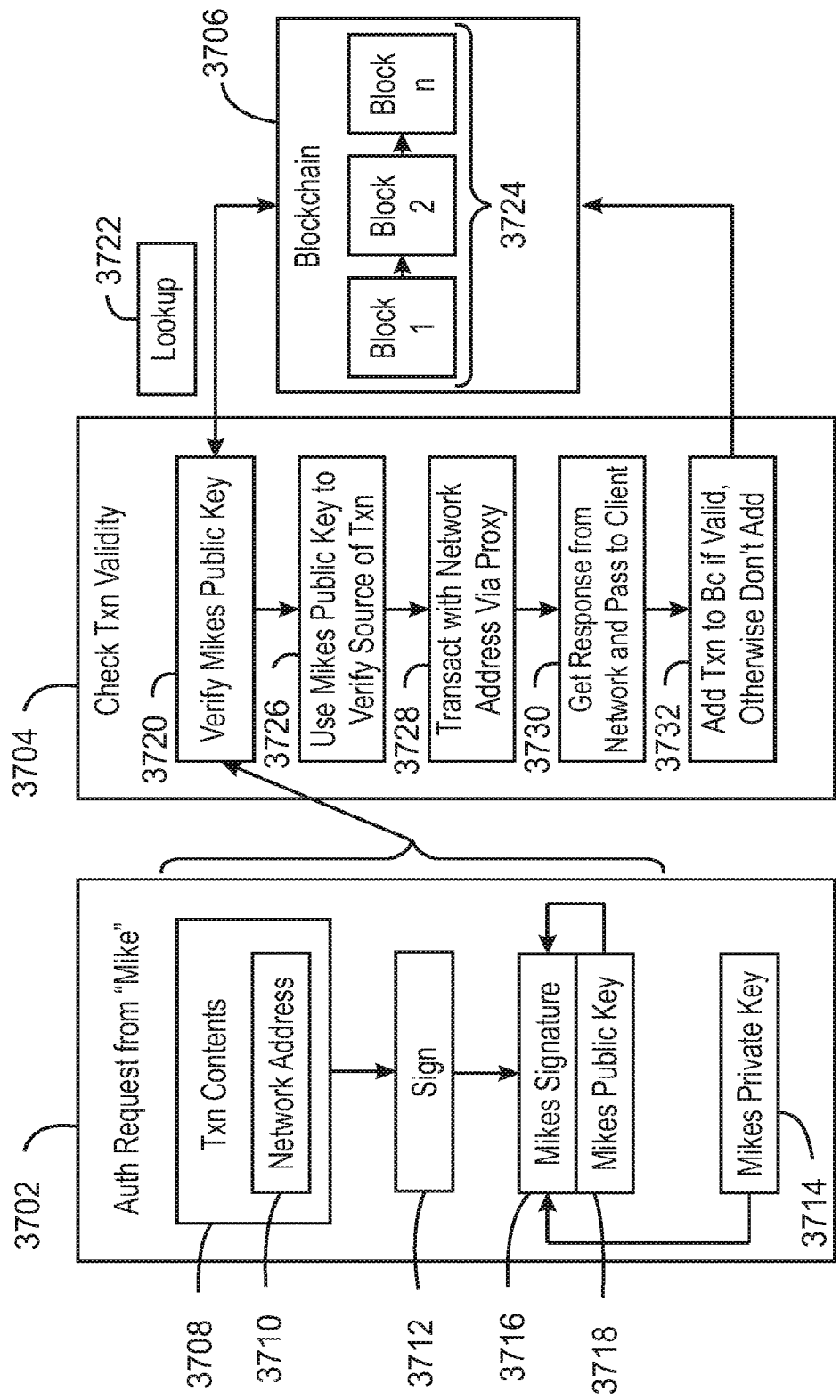
FIG. 37 is a schematic diagram of an action diagram for decentralized authorization, authentication, and accounting on an IoT device in accordance with some embodiments.

FIG. 37 is a schematic diagram of an action diagram 3700 for decentralized authorization, authentication, and accounting on an IoT device in accordance with some embodiments. An authorization request 3702 interacts with a transaction validation checker 3704 that makes use of a block-chain 3706.

Within the authorization request 3702, at block 3708, the transaction contents may be added to a message. In the example shown in FIG. 37, the transaction contents may be a username and password, for example, the username and credentials for "Mike." The sensitive information is not exposed to third parties through this method as described below. The transaction may include metadata. The metadata may be stored in a public ledger. If money or crypto currency denominations are part of the transaction, then the transaction contents may include the details of how much value is being transacted. The validity of the transaction may depend on the conditions of the transaction being satisfied. For example, conditions of the transaction being met can include payment actions and authentication actions in the example described above.

Within the authorization request 3702, at block 3710, a network address being requested may be included in the transaction contents. In place of the network address, a resource being requested may be included in the transaction contents. The network address may, for example, be a fully qualified domain name (FDQN) or interne protocol (IP) address for a RADIUS server. The network address may be a resource on the network. The network address may include a wallet address based on the private key of the RADIUS server or network resource owner. A network address may include the wallet in response to a payment being requested for the use of the service can be performed.

Within the authorization request 3702, at block 3712, the transaction contents may be signed by the private key of the party. The process of signing contents of a transaction may include forming a signature 3714, a reference to the location of the public key may be included 3716, or the transaction could contain the public key itself and provide the public key 3718 to the authorization request 3702 itself Within the transaction validation checker 3704, a request to verify a public key 3720 can be made. The location of the public key may be looked up 3722 or requested from the block-chain 3706. A network owner may create the block-chain 3706, and entities may purchase or acquire identities on the block-chain 3706 by posting a public key of the entity to the block-chain 3706. The posting of a public key for an entity to the block-chain 3706 during negotiation may be in exchange for crypto currencies, tokens, or other payment. An amount of a payment may determine how long a key may be held in the block-chain 3706. A key may be held by a block-chain 3706 indefinitely or for a specified period of time. Conditions for an identity to be established or confirmed may be adjusted by a network administrator.

The block-chain 3706 may include a number of blocks 3724. The block-chain 3706 used for storing identities may be a virtual block-chain that sits on top of a larger block-chain which has a critical mass of miners. The block-chain may, for example, incorporate the concept of dual mining, where the work done for the proof in one block-chain 3706 also serves as the proof in another. The lookup 3722 may, for example, be performed using a bloom filter hop method disclosed above. A result of the lookup 3722 may be that a public key is known. A result of the lookup 3722 may be that the key was included in the transaction to begin with.

Within the transaction validation checker 3704, at block 3726, the key may decrypt the transaction, and may confirm the identified entity. The key may be public, in the case of an asymmetric key, or private, in the case of a symmetric key. Message communications will generally use private symmetric keys for the encryption/decryption. A transaction may be committed to the block-chain 3706. A transaction may be a reference to an off-chain storage mechanism. The off-chain storage mechanism may be used at block 3726 to record the result of the identify verification step. The recording of a result of the identify verification step may provide accounting. A record may, for example, be committed to the block-chain 3706 of network providers and/or to a virtual block-chain. Recordation on the block-chain 3706 may in some cases be limited to metadata about the transaction. Information relating to usernames and passwords may in some cases be barred from being included on the block-chain 3706. If the information is included in the block-chain 3706, the information may be part of the transactions between a RADIUS proxy and/or a modified RADIUS server.

Within the transaction validation checker 3704, an off chain event may occur at block 3728, where contents of the transaction may be passed along to the RADIUS server for normal processing if the transaction identity is valid. In the case of an authentication request, the contents may, for example, include a username and password. The passing of contents to a server may occur between the RADIUS server and its proxy or the modified decentralized code within the RADIUS proxy.

Within the transaction validation checker 3704, an off chain event may occur at block 3730, where a response from the RADIUS server may be routed directly back to a client. The routing of a response may be through a proxy and/or by a RADIUS server, depending, in part, on an implementation architecture choice. The RADIUS server may perform logging and accounting of requests the RADIUS server receives.

Within the transaction validation checker 3704, at block 3732, a response may be routed back. The response may be a positive or negative. The response may be stored to the block-chain 3706 as an immutable record. Storing a response on the block-chain 3706 may increase the difficulty for a malicious actor to hide their actions.

Figure 38:
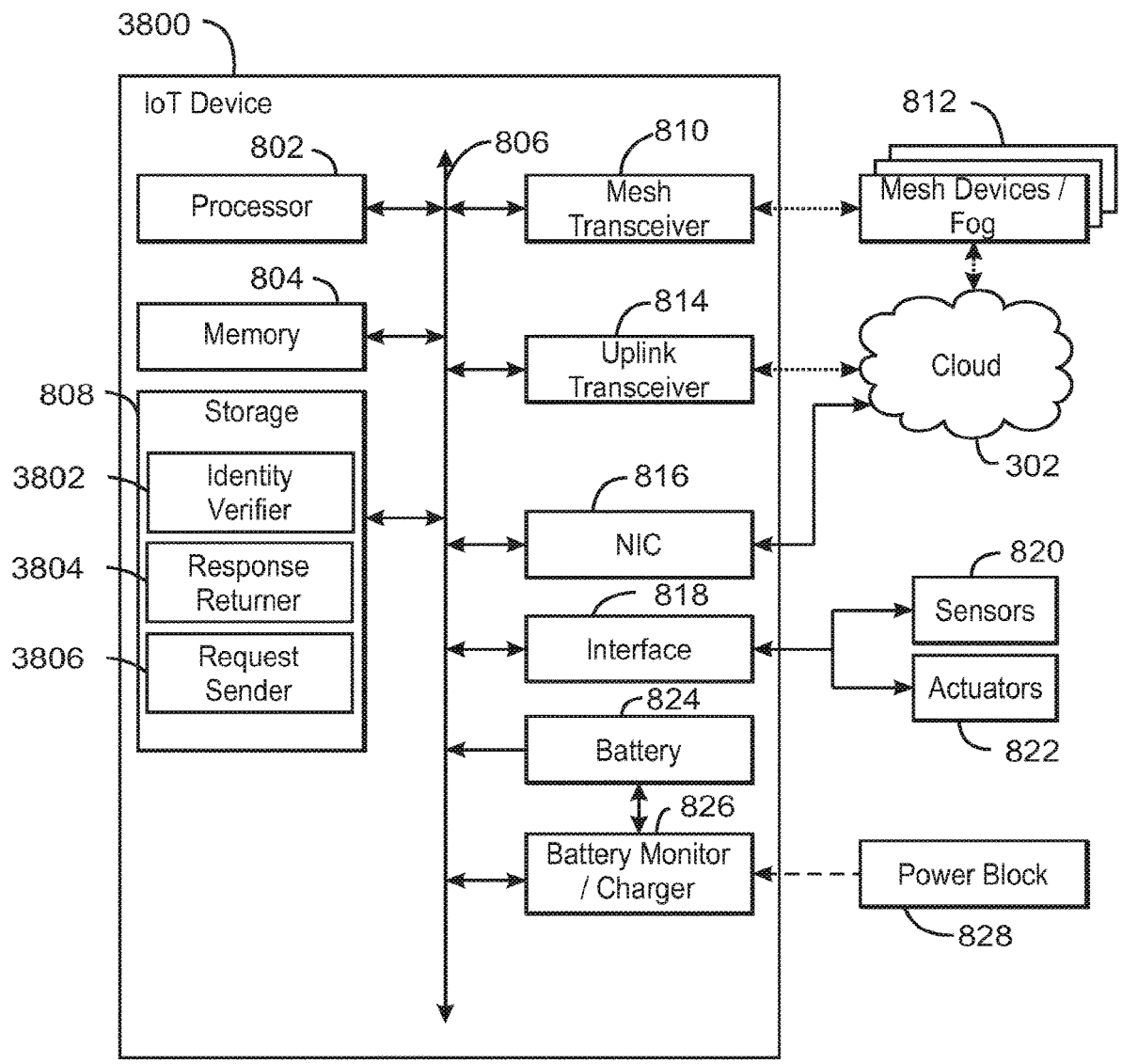
FIG. 38 is a block diagram of an example of components that may be present in an IoT device for decentralized authorization, authentication, and accounting with an IoT device in accordance with some embodiments.

FIG. 38 is a block diagram of an example of components that may be present in an IoT device 3800 for decentralized authorization, authentication, and accounting with an IoT device in accordance with some embodiments. Like numbered items are as described with respect to FIGS. 3 and 8. It can be noted that different components may be selected and used for the IoT device 3800 than for those selected for the IoT device 800 discussed with respect to FIG. 8, and other IoT devices discussed herein.

The mass storage 808 may include a number of modules to implement decentralized authorization, authentication, and accounting with an IoT device. Although shown as code blocks in the mass storage 808, it may be understood that any of the modules may be fully or partially replaced with hardwired circuits, for example, built into an application specific integrated circuit (ASIC).

The mass storage 808 may include an identity verifier 3802 to verify the identity of an authentication request with a decentralized API, the authentication request received from a RADIUS client, the decentralized API to verify the identity by sending a request to a distributed ledger and returning, to a RADIUS server, a response in response to receiving an identity verification response from the distributed ledger. The RADIUS client may make a transaction in response to a response of authenticated identity. The transaction may include at least one of username, password, and metadata. The transaction may include a value transaction. The transaction may be a cryptocurrency transaction. The authentication request may include a request for a network address. The network address may include at least one of a fully qualified domain name for the RADIUS server or an internet protocol address for the RADIUS server. The RADIUS server may verify a public key by requesting a location of the public key from a block-chain. The request to a RADIUS server may occur off chain, in response to a RADIUS client receiving a confirmation of authenticated identity. The RADIUS server may perform logging and accounting of requests the RADIUS server receives. The response to the authentication request may be stored in to a block-chain as an immutable record.

The mass storage 808 may include a response returner 3804 to return a response to the authentication request to the RADIUS client in response to receiving the response from the decentralized API. The mass storage 808 may include a request sender 3806 to send a request to a RADIUS server in response to receiving a positive identity verification response from the distributed ledger.

Figure 39:
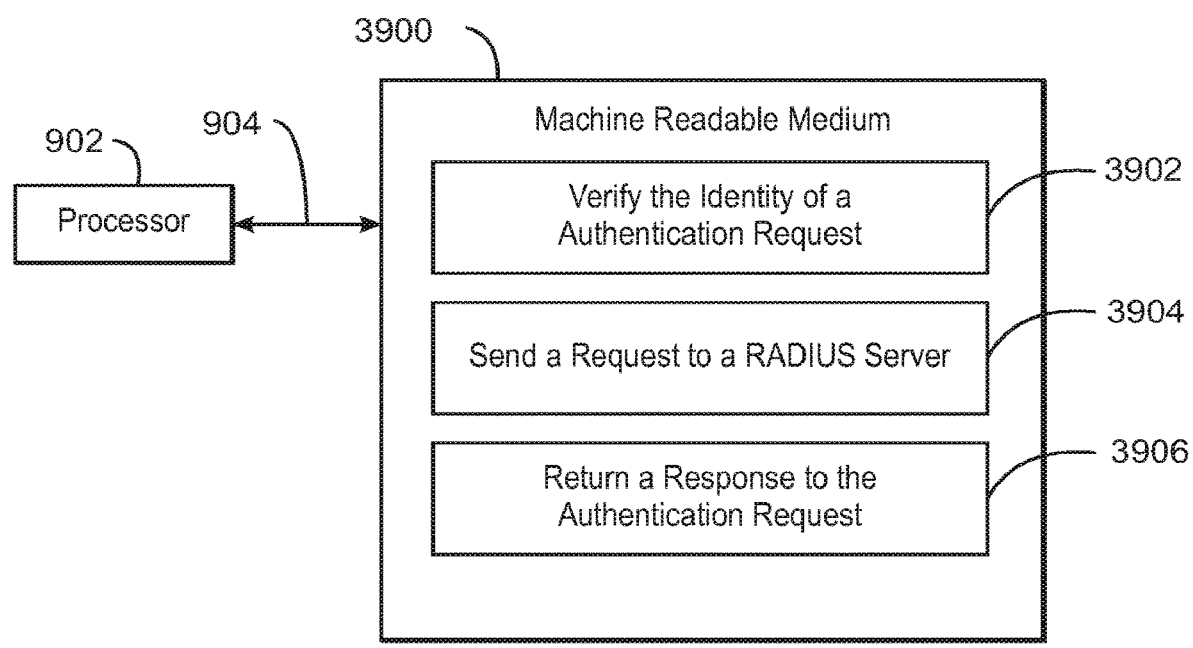
FIG. 39 is a block diagram of a non-transitory, machine readable medium including code to direct a processor for decentralized authorization, authentication, and accounting with an IoT device in accordance with some embodiments.

FIG. 39 is a block diagram of a non-transitory, machine readable medium 3900 including code to direct a processor 902 for decentralized authorization, authentication, and accounting with an IoT device in accordance with some embodiments. The processor 902 may access the non-transitory, machine readable medium 3900 over a bus 904. The processor 902 and bus 904 may be implemented in a manner similar to the processor 902 and bus 904 described with respect to FIG. 9. The non-transitory, machine readable medium 3900 may include devices described for the mass storage 808 of FIG. 8 or may include optical disks, thumb drives, or any number of other hardware devices.

The non-transitory, machine readable medium 3900 may include code 3902 to direct the processor 902 to verify the identity of an authentication request with a distributed ledger, the authentication request received from a Remote Authentication Dial-In User Service (RADIUS) client. The RADIUS client may make a transaction in response to a response of authenticated identity. The transaction may include at least one of username, password, and metadata. The transaction may include a value transaction. The transaction may be a cryptocurrency transaction. The authentication request may include a request for a network address. The network address may include at least one of a fully qualified domain name for the RADIUS server or an interne protocol address for the RADIUS server. The RADIUS server may verify a public key by requesting a location of the public key from a block-chain. The request to a RADIUS server may occur off chain, in response to a RADIUS client receiving a confirmation of authenticated identity. The RADIUS server may perform logging and accounting of requests the RADIUS server receives. The response to the authentication request may be stored in a block-chain as an immutable record.

The non-transitory, machine readable medium 3900 may include code 3904 to direct the processor 902 to send a request to a RADIUS server in response to receiving a positive identity verification response from the distributed ledger. The non-transitory, machine readable medium 3900 may include code 3906 to direct the processor 902 to return a response to the authentication request to the RADIUS client in response to receiving a response from the RADIUS server.

In some embodiments the techniques herein disclose access control in an IoT object. In IoT systems, security is complicated by the constrained nature of the devices involved, which may not be able to implement the security systems used in less constrained devices, such as desktops, laptops, or smartphones, among others. Implementing an access control that uses less complicated parameters may enhance the secure implementation of IoT applications in secure environments, and improve the operation and adoption of IoT systems.

In IoT system design an object may refer to a data model description and physical instantiation of a unit of operation. An IoT system may be described in terms of multiple objects interacting to achieve a goal or outcome. Objects may be composed of multiple layers of operation, in that sense the definition of object may be recursive. An object decomposition method, such as introspection, may resolve recursion to its leaf node attributes. An IoT object access may in some cases be understood according to a layering decomposition having at least six layers, and in other cases, more or fewer layers may be used.

FIG. 40 is a schematic diagram of logical division 4000 for access control in an IoT object in accordance with some embodiments. In an example, the logical division for access control may show that a caller's authorization may accompany a request for access. The caller authorization may be qualified within access control list (ACL) structure 4002 that identifies a caller object 4004 and a target object 4006. The ACL structure 4002 may show that Create, Read, Update, Delete, and Notify (CRUDN) permissions 4008 may be applied at any layer in the layering decomposition. The ACL caller object 4004 and ACL target object 4006 may be structures having the same object reference type so there may be full flexibility in specifying a range of caller object 4004 and target object 4006 granularity according to the layering model respectively. The CRUDN policy 4008 may be meaningful at each layer of granularity.

A caller object 4004 may be issued a credential with an authorization structure defining the privileges with which the caller is making a request. Privileges may be defined according to the layering structure above. The platform, device, collection, resource, record or property originating the request may be specified in the authorization section.

Figure 41:
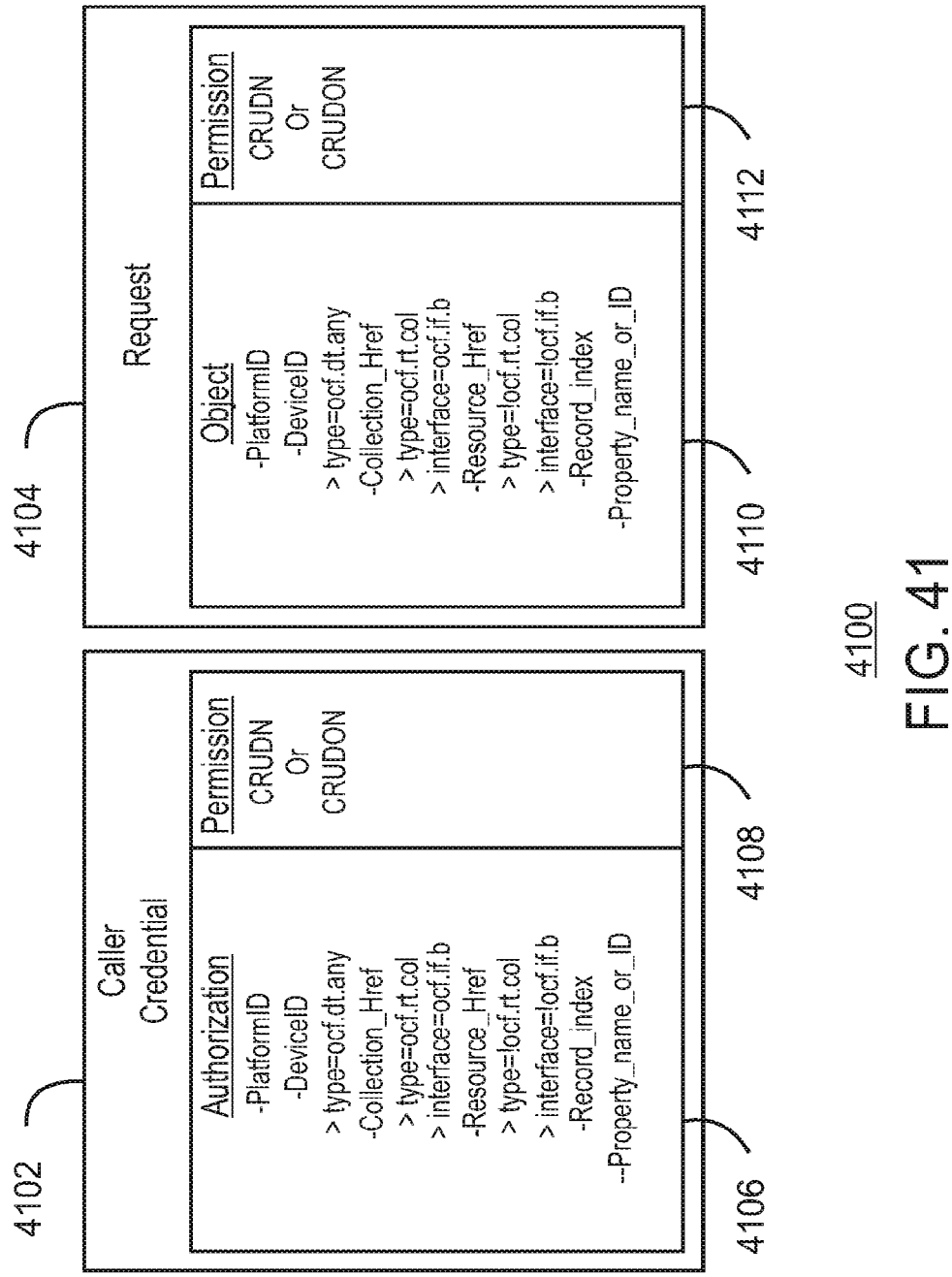
FIG. 41 is a schematic diagram of logical divisions between a caller credential and a request for access control in an IoT object in accordance with some embodiments.

FIG. 41 is a schematic diagram of logical divisions 4100 between a caller credential 4102 and a request 4104 for access control in an IoT object in accordance with some embodiments. The authorization 4106 of a caller may accompany a request for access and resulting permissions 4108. An object to be accessed may be constrained by the intrinsic limitations placed on the object by the physicality of the object. For example, a read-only storage device (ROM) may not have physicality that permits write operations. Physicality may be expressed using CRUDN. The expected access may be limited by the physicality of an object, hence the access request may expect the requested permission to be dominated by physicality. The expected access may be a request 4104 including an object 4110 and permissions 4112. If not limited by the physicality of an object, an access request by an object, if honored, may in some cases cause a device to behave in an undefined or unsafe manner.

Figure 42:
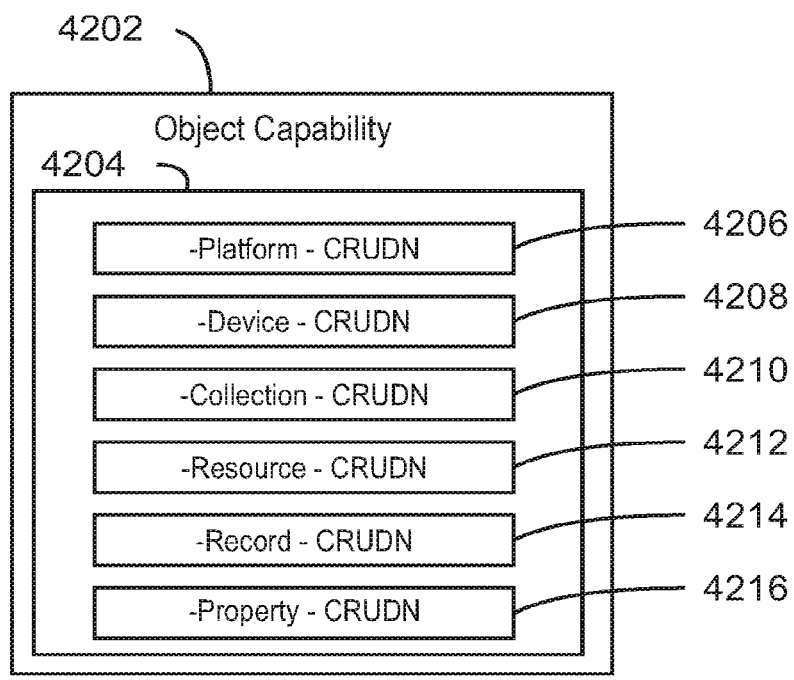
FIG. 42 is a schematic diagram of logical divisions between of an object capability for access control using layers in an IoT object in accordance with some embodiments.

FIG. 42 is a schematic diagram of logical divisions 4200 between an object capability 4202 for access control using layers 4204 in an IoT object in accordance with some embodiments. A first layer of an IoT object access may be a platform layer 4206. A platform layer may include a physical instance of a computer containing computational, networking, storage, sensing or actuation capabilities. Platform access control may be understood in terms of a platform identifier and a credential. The credential may, for example, be embedded by a manufacturer, or stored in the unit during configuration or implementation, such that the credential could serve as an attestation credential. The platform credential may verify at an access request without the credential if the access request may be a condition of device credential issuance. The platform credential may be used to re-attest platform properties including its physicality.

A second layer of an IoT object access may be a device layer 4208. A device layer may include a logical instance of a computer containing computational, networking, storage, sensing or actuation capabilities. Device access control may be understood in terms of a device identifier and credential.

A third layer of an IoT object access may be a collection layer 4210. A collection layer may include a logical structure of one or more resources, as disclosed below. Access control may be understood in terms of a type identifier, interface definition and an authority identifier that names the structure.

A fourth layer of an IoT object access may be a resource layer 4212. A resource layer may include a logical structure of one or more records as disclosed below. Access control may be understood in terms of a type identifier, interface definition and an authority identifier that names the structure.

A fifth layer of an IoT object access may be a record layer 4214. A record layer may include a logical structure of one or more properties as disclosed below. Access control may be understood in terms of a resource plus a record index offset.

A sixth layer of an IoT object access may be property layer 4216. A property layer may, for example, include atomic data structure and/or a complex data structure of any structure definable using a data modeling language (DML). For example, an atomic data structure may include a string, a number, and/or a date. The DML may provide a structure of metadata to capture, for example, limitations on acceptable data formatting, structure, and data value constraints such as JSON Schema. Access control policy may be expressed in terms of a data structure life cycle of Create, Read, Update, Delete, and Notify (CRUDN). Notify may be further divided into Observe and Notify where Observe presumes read permission on a structure change event and Notify presumes write permission to another object.

Access control list (ACL) evaluation may be a process of verifying the authorization of a caller object that dominates and/or overlaps a caller section. ACL evaluation may be a process where a structure being accessed may be dominated and/or overlapped by a target section. Unless a complete set of layers in the target section match the structure to be accessed, the ACL may be limited in application. Access may be denied unless an ACL is found to match.

Figure 43:
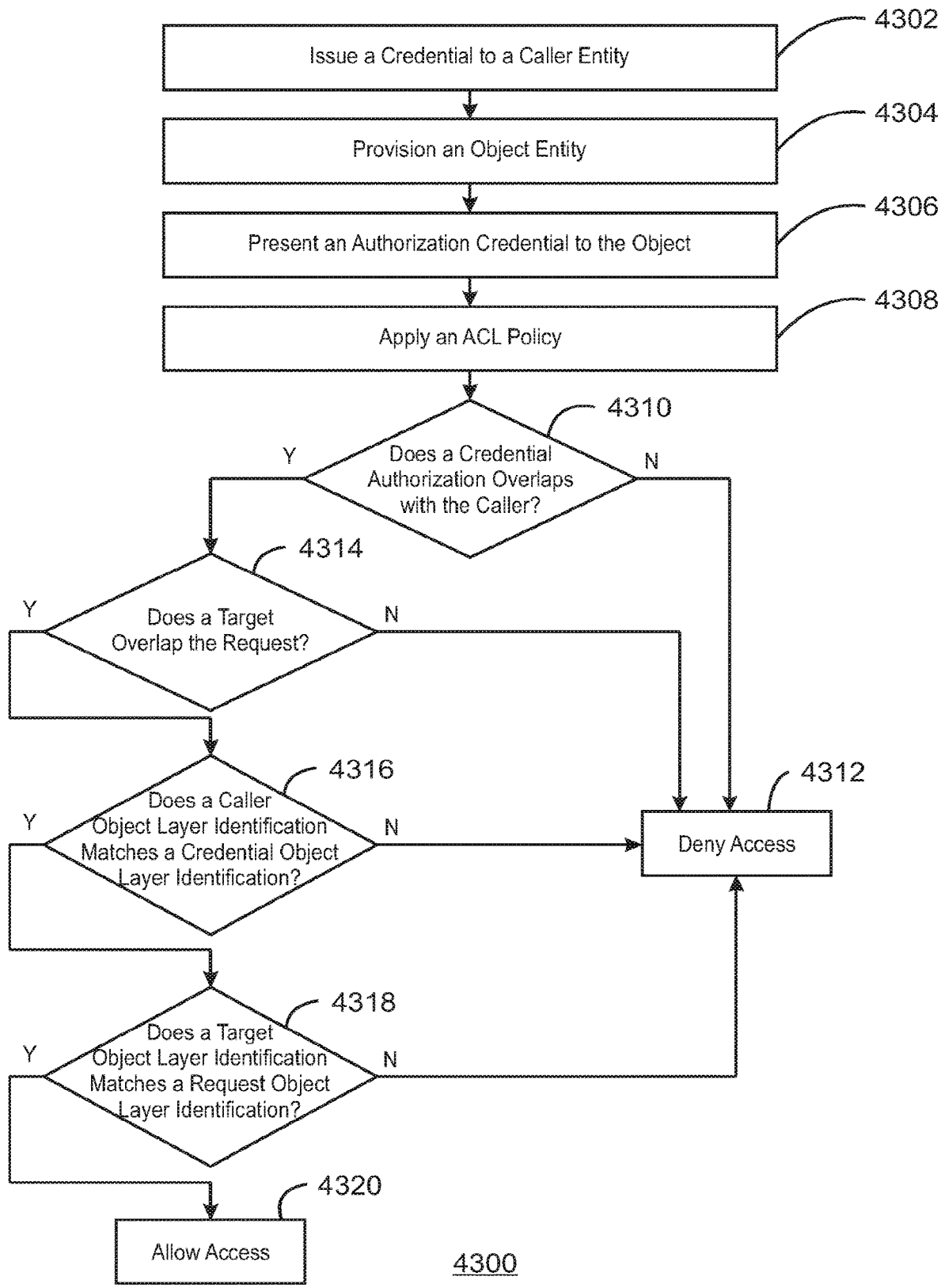
FIG. 43 is a process flow diagram of an example method for access control in an IoT object in accordance with some embodiments.

FIG. 43 is a process flow diagram of an example method 4300 for access control in an IoT object in accordance with some embodiments. The method 4300 of FIG. 43 may be implemented by the IoT device 4400 described with respect to FIG. 44. Process flow may begin at block 4302. At block 4302, a credential may be issued to a caller entity. The credential may, for example, contain a six-layer authorization structure, although other authorization structures, such as four-layer, may be used, depending on the security requirements. At block 4304, object entities may be provisioned with ACLs. The ACLs may specify the six-layer reference to the target object and a CRUDN or CRUDON permission. At block 4306, caller may present an authorization credential to the object over a suitable connection interface. At block 4308, an access enforcement engine (AEE) may apply the ACL policy given the supplier credential.

At block 4310, a determination may be made as to whether or not the credential authorization overlaps with the caller. If, no, the credential authorization does not overlap with the caller, the process flow proceeds to block 4312, where access may be denied.

At block 4314, a determination may be made as to whether or not a target overlaps the request. If no, the target does not overlap the request, the process flow proceeds to bock 4312, where access may be denied.

At block 4316, layers of the caller object layer identifications may be compared to the credential object layer identifications to determine if there is a match. If no, the caller object layer identifications do not match the credential object layer identifications, the process flow proceeds to block 4312, where access may be denied. Caller object layer identifications may include a platform layer, a device layer, a collection layer, a resources layer, a record layer, and a property layer.

At block 4318, layers of the target object layer identifications may be compared to the request object layer identifications to determine if there is a match. If no, the target object layer identifications do not match the request object layer identifications, the process flow proceeds to block 43012, where access may be denied. Target object layer identifications may include a platform layer, a device layer, a collection layer, a resources layer, a record layer, and a property layer. If yes to the above determinations, at block 4320, access may be allowed for an IoT object.

Figure 44:
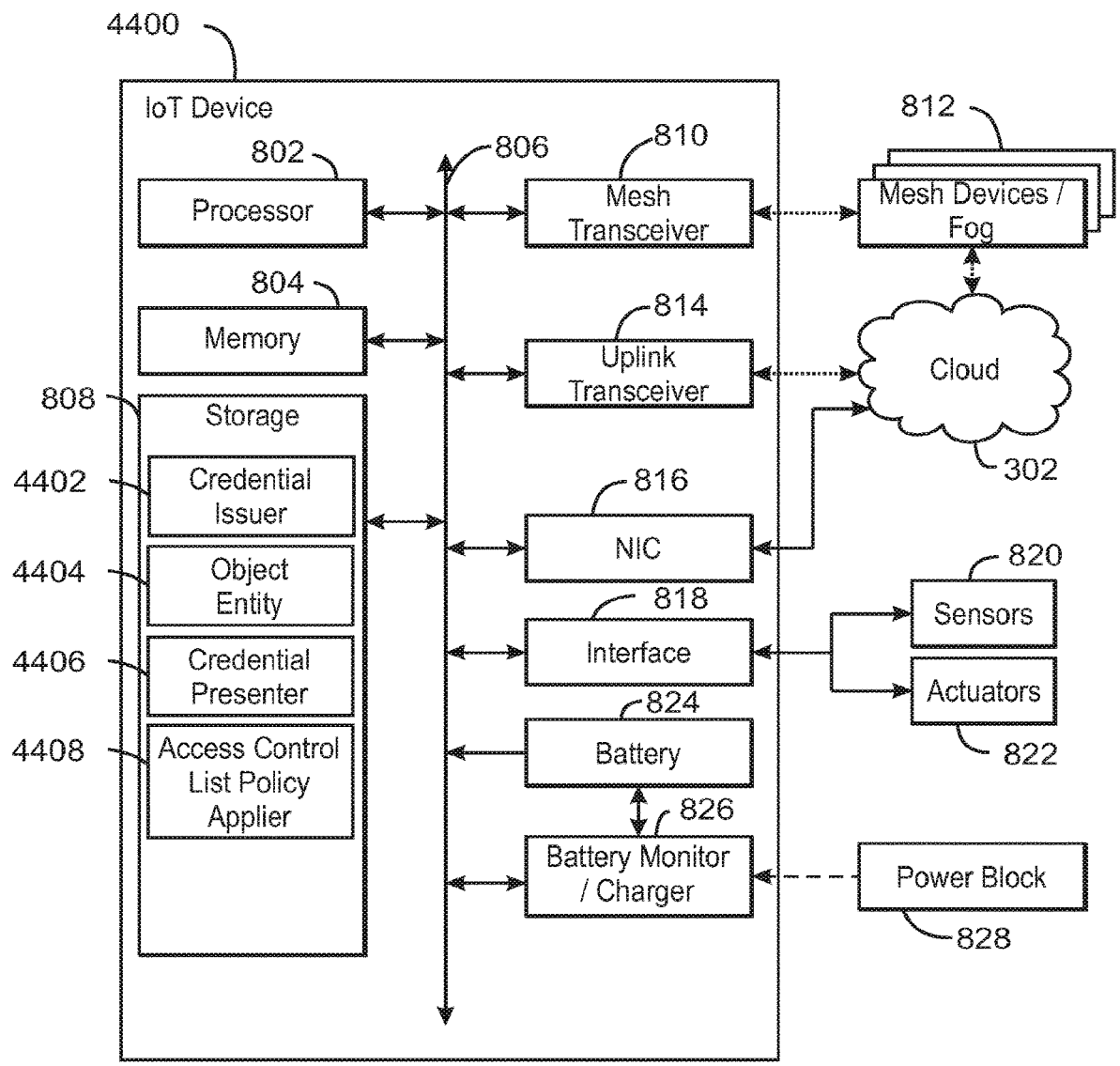
FIG. 44 is a block diagram of an example of components that may be present in an IoT device for access control in an IoT object in accordance with some embodiments.

FIG. 44 is a block diagram of an example of components that may be present in an IoT device 4400 for access control in an IoT object in accordance with some embodiments. Like numbered items are as described with respect to FIGS. 3 and 8. It can be noted that different components may be selected and used for the IoT device 4400 than for those selected for the IoT device 800 discussed with respect to FIG. 8, and other IoT devices discussed herein.

The mass storage 808 may include a number of modules for access control in an IoT object. Although shown as code blocks in the mass storage 808, it may be understood that any of the modules may be fully or partially replaced with hardwired circuits, for example, built into an application specific integrated circuit (ASIC).

The mass storage 808 may include a credential issuer 4402 to issue a credential to a caller entity, the credential including a number of layers of authorization structure. The credential may be a six-layer permission. The six-layer permission may include a platform layer, a device layer, a collection layer, a resource layer, a record layer, and a property layer. The number of layers may include a platform layer to reflect a physical instance of a computer and includes at least one of computational, networking, storage, sensing and actuation capabilities. The number of layers may include a device layer to reflect a logical instance of a computer including at least one of computational, networking, storage, sensing and actuation capabilities. The number of layers may include a collection layer to a logical structure of a resource, where the resource includes a logical structure for a record, where the record includes a logical structure of a property, and where the property includes at least one of an atomic data structure and a complex data structure. The property may be a complex data structure, and the complex data structure is for a structure definable using a data modeling language. The property may include an atomic data structure, and the atomic data structure may be at least one of a string, a number, or a date. The credential may indicate installation by a manufacturer.

The mass storage 808 may include an object entity provisioner 4404 to provision an object entity with an access control list specifying a reference to a target object and a permission. The mass storage 808 may include a credential presenter 4406 to present an authorization credential to the object entity. The authorization credential to the object entity may be limited by limitations placed on the object by a physicality of object data based on a Create, Read, Update, Delete, and Notify (CRUDN) life cycle notification. The mass storage 808 may include an access control list policy applier 4408 to apply an access control list policy to determine if access is allowed for an IoT device based on a comparison of if the credential overlaps the caller entity, if the target object overlaps a request, if a number of device layer identifications match a number of credential layer identifications, and if a number of target layer identifications match a number of request layer identifications.

Figure 45:
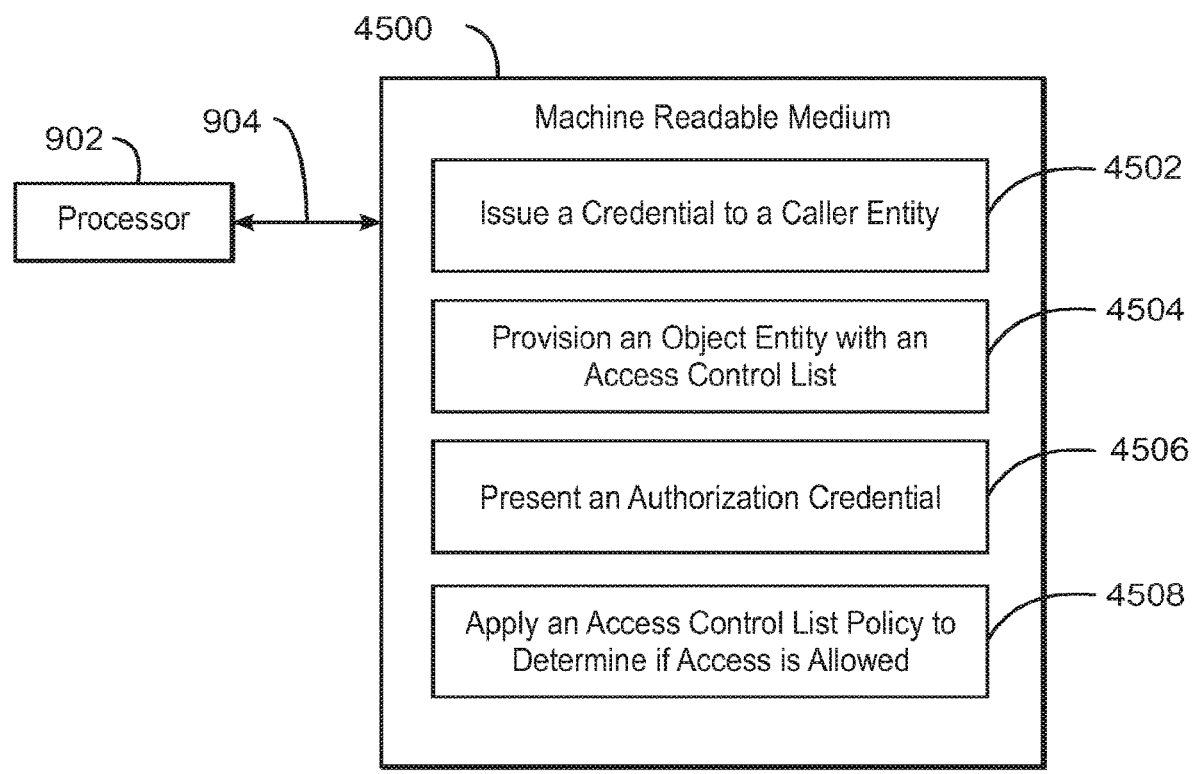
FIG. 45 is a block diagram of a non-transitory, machine readable medium 19600 including code to direct a processor for access control in an IoT object in accordance with some embodiments.

FIG. 45 is a block diagram of a non-transitory, machine readable medium 4500 including code to direct a processor 902 for access control in an IoT object in accordance with some embodiments. The processor 902 may access the non-transitory, machine readable medium 4500 over a bus 904. The processor 902 and bus 904 may be implemented in a manner similar to the processor 902 and bus 904 described with respect to FIG. 9. The non-transitory, machine readable medium 19600 may include devices described for the mass storage 808 of FIG. 8 or may include optical disks, thumb drives, or any number of other hardware devices.

The non-transitory, machine readable medium 4500 may include code 4502 to direct the processor 902 to issue a credential to a caller entity, the credential including a number of layers of authorization structure. The credential may be a six-layer permission. The six-layer permission may include a platform layer, a device layer, a collection layer, a resource layer, a record layer, and a property layer. The number of layers may include a platform layer to reflect a physical instance of a computer and includes at least one of computational, networking, storage, sensing and actuation capabilities. The number of layers may include a device layer to reflect a logical instance of a computer including at least one of computational, networking, storage, sensing and actuation capabilities. The number of layers may include a collection layer to a logical structure of a resource, where the resource includes a logical structure for a record, where the record includes a logical structure of a property, and where the property includes at least one of an atomic data structure and a complex data structure. The property may be a complex data structure, and the complex data structure may be for a structure definable using a data modeling language. The property may include an atomic data structure, and the atomic data structure may be at least one of a string, a number, or a date. The credential may indicate installation by a manufacturer.

The non-transitory, machine readable medium 4500 may include code 4504 to direct the processor 902 to provision an object entity with an access control list specifying a reference to a target object and a permission. The non-transitory, machine readable medium 4500 may include code 4506 to direct the processor 902 to present an authorization credential to the object entity. The authorization credential to the object entity may in some cases be limited by limitations placed on the object by a physicality of object data based on a Create, Read, Update, Delete, and Notify (CRUDN) life cycle notification. The non-transitory, machine readable medium 4500 may include code 4508 to direct the processor 902 to apply an access control list policy to determine if access is allowed for an IoT device based on a comparison of if the credential overlaps the caller entity, if the target object overlaps a request, if a number of device layer identifications match a number of credential layer identifications, and if a number of target layer identifications match a number of request layer identifications.

Example 1 includes an apparatus. The apparatus includes a composite object which includes a device owner This also includes a name server to provide names to sub-objects forming the composite object, and a sub-object list of the sub-objects forming the composite object, and a plurality of sub-objects forming the composite object, and a blockchain recording the sub-objects forming the composite object.

Example 2 includes the subject matter of example 1. In example 2, a sub-object includes a composite object formed from lower level sub-objects.

Example 3 includes the subject matter of either of examples 1 or 2. In example 3, a sub-object includes an atomic object.

Example 4 includes the subject matter of any of examples 1 to 3. In example 4, the name of the composite object includes a hash calculated from the names of the plurality of sub-objects.

Example 5 includes the subject matter of any of examples 1 to 4. In example 5, each sub-object includes a group key permitting the sub-object to act on behalf of the group.

Example 6 includes the subject matter of any of examples 1 to 5. In example 6, the device owner includes an EPID server.

Example 7 includes the subject matter of any of examples 1 to 6. In example 7, the device owner includes a proxy broker.

Example 8 includes the subject matter of any of examples 1 to 7. In example 8, the device owner includes a blockchain.

Example 9 includes the subject matter of any of examples 1 to 8. In example 9, the blockchain includes a record of the composite object.

Example 10 includes a method for forming a composite object in an IoT network. The method for forming a composite object in an IoT network includes building a list of sub-objects in a device owner, creating a collection group identifier, committing the collection group identifier to a blockchain in a blockchain transaction, and obtaining a group name from the blockchain in the name server.

Example 11 includes the subject matter of example 10. In example 11, the method includes determining, from the blockchain, if the collection group identifier is already in use, and, if so, generating a new collection group identifier.

Example 12 includes the subject matter of either of examples 10 or 11. In example 12, the method includes accepting a join request from a sub-object, confirming that the sub-object is a group member, looking up the name of the sub-object in the blockchain, and providing a group key to the sub-object from the name server.

Example 13 includes the subject matter of any of examples 10 to 12. In example 13, the method includes determining if group membership is private, and, if so, providing a group key to the sub-object from the device owner acting as a proxy to the name server.

Example 14 includes the subject matter of any of examples 10 to 13. In example 14, the method includes creating the collection group identifier by combining the names of the sub-object to form a combination, and calculating a hash code of the combination.

Example 15 includes the subject matter of any of examples 10 to 14. In example 15, the method includes creating a name for a sub-object by combining the names of all sub-sub-objects forming the sub-object to form a combination, and calculating a hash code of the combination.

Example 16 includes the subject matter of any of examples 10 to 15. In example 16, the method includes confirming that blockchain transaction is valid in a group of devices in a mesh network, and reversing the blockchain transaction if not valid.

Example 17 includes a non-transitory, machine readable medium. The non-transitory, machine readable medium includes instructions to direct a processor to store a list of sub-objects for a group, calculate a collection group identity for the group, and provide group identity credentials to sub-objects in the group.

Example 18 includes the subject matter of any of example 17. In example 18, the non-transitory, machine readable medium includes instructions to direct the processor to act as a proxy server for sub-objects.

Example 19 includes the subject matter of either of examples 17 or 18. In example 19, the non-transitory, machine readable medium includes instructions to direct the processor to commit a transaction including a collection group identity to a blockchain, and migrate the blockchain to other devices in a mesh.

Example 20 includes the subject matter of any of examples 17 to 19, including a blockchain including transaction blocks to 20. In example 20, a transaction block includes a collection group identity.

Example 21 includes an apparatus that includes a composite object. This includes a device owner including a type name server to create type names for the composite object, and a blockchain including a transaction including types of sub-objects forming the composite object.

Example 22 includes the subject matter of example 21. In example 22, the apparatus includes a type inspector to determine the types of sub-objects including the composite object.

Example 23 includes the subject matter of either of examples 21 and 22. In example 23, the type inspector includes a type introspection system.

Example 24 includes the subject matter of any of examples 21 to 23. In example 24, the type inspector includes a type attestation system.

Example 25 includes the subject matter of any of examples 21 to 24. In example 25, the apparatus includes a type graph generator to generate a type graph of types of sub-sub-objects forming the sub-objects.

Example 26 includes the subject matter of any of examples 21 to 25. In example 26, the apparatus includes a type name calculator to generate a type name from a type graph.

Example 27 includes the subject matter of any of examples 21 to 26. In example 27, the transaction includes a type graph.

Example 28 includes the subject matter of any of examples 21 to 27. In example 28, an object includes a type credential.

Example 29 includes the subject matter of any of examples 21 to 28. In example 29, a type credential includes a manufacturer's key.

Example 30 includes the subject matter of any of examples 21 to 29. In example 30, the type credential is provided by a name server.

Example 31 includes the subject matter of any of examples 21 to 30. In example 31, a sub-object includes sub-sub-objects, and the type name of the sub-object is determined from the types of the sub-sub-objects.

Example 32 includes the subject matter of any of examples 21 to 31. In example 32, the apparatus includes a type graph generated by a sub-object including the types of the sub-sub-objects.

Example 33 includes a method for creating an object type in an IoT network. The method for creating an object type in an IoT network includes requesting a creation of a type group by a name server, performing a type inspection of sub-objects making up a composite object to build a type graph of objects forming the composite object, calculating a type group name from the type graph, and accessing a blockchain to determine if type group name is already created.

Example 34 includes the subject matter of example 33. In example 34, the method includes creating the type group name by writing a transaction including the type graph to the blockchain.

Example 35 includes the subject matter of either of examples 33 or 34. In example 35, the method includes issuing an EPID join request from the name server to the composite object.

Example 36 includes the subject matter of any of examples 33 to 35. In example 36, the method includes issuing type credentials to the sub-objects forming the composite object.

Example 37 includes the subject matter of any of examples 33 to 36. In example 37, the name server requests the composite object perform the type inspection.

Example 38 includes the subject matter of any of examples 33 to 37. In example 38, the type inspection includes a recursive introspection of the sub-objects forming the composite object.

Example 39 includes the subject matter of any of examples 33 to 38. In example 39, the recursive introspection includes sending a type introspection request to each of the sub-objects forming the composite object, performing a type introspection to determine a type for each sub-sub-object forming the sub-object, building a type graph at each of the sub-objects that are formed from sub-sub-objects, returning the type graphs to the composite object, and verifying signatures on the type graphs.

Example 40 includes the subject matter of any of examples 33 to 39. In example 40, the method includes performing a recursive type introspection from each sub-sub-object to lower level objects in a hierarchy, building a type graph for objects at each level of the hierarchy, and returning the type graph to a next higher level of the hierarchy.

Example 41 includes the subject matter of any of examples 33 to 40. In example 41, the type inspection includes performing a recursive attestation of the sub-objects forming the composite object.

Example 42 includes the subject matter of any of examples 33 to 41. In example 42, the recursive attestation includes sending a type attestation request from each level to objects at a next lower level, returning a type graph of all objects making up the objects at a particular level of a hierarchy to a next higher level, and building an overall type graph in the composite object.

Example 43 includes a non-transitory, machine readable medium. The non-transitory, machine readable medium includes instructions to direct a processor to build a type graph of objects forming a composite object, calculate a type name for the composite object, and record the type name and type graph in a blockchain.

Example 44 includes the subject matter of example 43. In example 44, the non-transitory, machine readable medium includes instructions to direct the processor to perform a recursive type introspection of the objects forming the composite object.

Example 45 includes the subject matter of either of examples 43 or 44. In example 45, the non-transitory, machine readable medium includes instructions to direct the processor to perform a recursive type attestation of the objects forming the composite object.

Example 46 includes the subject matter of any of examples 43 to 45. In example 46, the non-transitory, machine readable medium includes instructions to direct the processor to create the type name if not present in the blockchain.

Example 47 includes the subject matter of any of examples 43 to 46. In example 47, the non-transitory, machine readable medium includes sending an EPID join request to a sub-object with a type credential.

Example 48 includes an apparatus. The apparatus includes a coalition group, including a coalition group name server to provide names to objects forming the coalition group, a coalition group member list of the objects belonging to the coalition group, and a blockchain recording the names of the objects forming the coalition group.

Example 49 includes the subject matter of example 48. In example 49, the apparatus includes a publisher to broadcast a coalition group existence.

Example 50 includes the subject matter of either of examples 48 or 49. In example 50, the apparatus includes a credential verifier to confirm an identity credential received from an object.

Example 51 includes the subject matter of any of examples 48 to 50. In example 51, the apparatus includes an EPID server to provide a credential to an object to join the coalition group.

Example 52 includes the subject matter of any of examples 48 to 51. In example 52, the apparatus includes a device owner to verify an identity credential from an object and provide a coalition group credential to the object, and a plurality of objects that each have a coalition group credential indicating membership in the coalition group.

Example 53 includes the subject matter of any of examples 48 to 52. In example 53, objects in the coalition group are grouped by location.

Example 54 includes the subject matter of any of examples 48 to 53. In example 54, objects in the coalition group are grouped by function.

Example 55 includes a method for forming a coalition group in an IoT network. The method for forming a coalition group in an IoT network includes defining a coalition group, receiving a request from an object to join the coalition group, and issuing coalition group credentials to the object.

Example 56 includes the subject matter of example 55. In example 56, defining the coalition group includes grouping devices by location.

Example 57 includes the subject matter of either of examples 55 or 56. In example 57, defining the coalition group includes grouping devices by function.

Example 58 includes the subject matter of any of examples 55 to 57. In example 58, the method includes publishing the coalition group to a blockchain if the coalition group is not discoverable.

Example 59 includes the subject matter of any of examples 55 to 58. In example 59, the method includes verifying the request before issuing the coalition group credentials.

Example 60 includes the subject matter of any of examples 59 to 59. In example 60, the method includes verifying the request by confirming that the request includes a valid identity credential.

Example 61 includes the subject matter of any of examples 59 to 60. In example 61, the method includes verifying the request by confirming that the request includes a valid instance credential.

Example 62 includes the subject matter of any of examples 59 to 61. In example 62, the method includes verifying the request by confirming that the request includes a valid type credential.

Example 63 includes a non-transitory, machine readable medium. The non-transitory, machine readable medium includes instructions to direct a processor to define a coalition group, publish the coalition group to a blockchain, and accept a join request from an object.

Example 64 includes the subject matter of example 63. In example 64, the non-transitory, machine readable medium includes instructions to direct the processor to confirm that the coalition group is discoverable.

Example 65 includes the subject matter of either of examples 63 or 64. In example 65, the non-transitory, machine readable medium includes instructions to direct the processor to confirm if the join request from the object is valid.

Example 66 includes the subject matter of any of examples 63 to 65. In example 66, the non-transitory, machine readable medium includes instructions to direct the processor to issue credentials in response to a valid join request.

Example 67 includes the subject matter of any of examples 63 to 66. In example 67, the non-transitory, machine readable medium includes instructions to direct the processor to generate EPID credentials.

Example 68 includes an apparatus for use in an Internet-of-Things (IoT) network. The apparatus for use in an Internet-of-Things (IoT) network includes a permissions guide drafter to draft a permissions guide for a plurality of discovered peers, where the plurality of discovered peers each have a parameter, and where a term of the permissions guide is generated in response to the term being allowable by at least two of the plurality of discovered peers. The parameter of each discoverable peer of the plurality of discovered peers includes a range of an allowable term range for an associated peer, and an action executor to execute an action of the permissions guide in response to detecting that a condition of the term is satisfied.

Example 69 includes the subject matter of example 68. In example 69, the permissions guide drafter includes a function for listing of the terms and conditions of the plurality of discovered peers.

Example 70 includes the subject matter of either of examples 68 or 69. In example 70, the permissions guide drafter includes a listing of the quality of service terms and conditions for the plurality of discovered peers.

Example 71 includes the subject matter of any of examples 68 to 70. In example 71, the permissions guide drafter includes a listing of data plane terms and conditions for the plurality of the discovered peers.

Example 72 includes the subject matter of any of examples 68 to 71. In example 72, the data plane is to indicate a process for how the data is to be supplied and consumed by the peers.

Example 73 includes the subject matter of any of examples 68 to 72. In example 73, the permissions guide includes a time-to-live.

Example 74 includes the subject matter of any of examples 68 to 73. In example 74, the permissions guide includes a protocol conversion broker to manage the joining and leaving of the permissions guide by a peer.

Example 75 includes the subject matter of any of examples 68 to 74. In example 75, executing an action of the permissions guide includes auto-commissioning of a service to a peer instructing the peer to process data.

Example 76 includes the subject matter of any of examples 68 to 75. In example 76, the permissions guide includes a preamble to manage the exchange of a configuration between the plurality of discovered peers.

Example 77 includes the subject matter of any of examples 68 to 76. In example 77, the term refers to a rate of payment to be paid between the plurality of discovered peers, and a final payment is made between peers upon a detection that a peer of the plurality of discovered peers is terminating participation in the permissions guide.

Example 78 includes a method for task definition and commissioning in an internet-of-things (IoT) device. The method for task definition and commissioning in an internet-of-things (IoT) device includes drafting a permissions guide for a plurality of discovered peers, where the plurality of discovered peers each have a parameter, and where a term of the permissions guide is generated in response to the term being allowable by at least two of the plurality of discovered peers, and executing an action of the permissions guide in response to detecting that a condition of the term is satisfied.

Example 79 includes the subject matter of example 78. In example 79, the drafting of the permissions guide includes a function for listing of the terms and conditions of the plurality of discovered peers.

Example 80 includes the subject matter of any of examples 78 to 79. In example 80, the drafting of the permissions guide includes a listing of the quality of service terms and conditions for the plurality of discovered peers.

Example 81 includes the subject matter of any of examples 78 to 80. In example 81, the drafting of the permissions guide includes a listing of data plane terms and conditions for the plurality of the discovered peers.

Example 82 includes the subject matter of any of examples 78 to 81. In example 82, the data plane is to indicate a process for how the data is to be supplied and consumed by the peers.

Example 83 includes the subject matter of any of examples 78 to 82. In example 83, the permissions guide includes a time-to-live.

Example 84 includes the subject matter of any of examples 78 to 83. In example 84, the permissions guide includes a protocol conversion broker to manage the joining and leaving of the permissions guide by a peer.

Example 85 includes the subject matter of any of examples 78 to 84. In example 85, executing an action of the permissions guide includes auto-commissioning of a service to a peer instructing the peer to process data.

Example 86 includes the subject matter of any of examples 78 to 85. In example 86, the permissions guide includes a preamble to manage the exchange of a configuration between the plurality of discovered peers.

Example 87 includes the subject matter of any of examples 78 to 86. In example 87, the term refers to a rate of payment to be paid between the plurality of discovered peers, and a final payment is made between peers upon a detection that a peer of the plurality of discovered peers is terminating participation in the permissions guide.

Example 88 includes a non-transitory, machine readable medium. The non-transitory, machine readable medium includes instructions that, when executed, direct a processor to draft a permissions guide for a plurality of discovered peers, where the plurality of discovered peers each have a parameter, and where a term of the permissions guide is generated in response to the term being allowable by at least two of the plurality of discovered peers, and execute an action of the permissions guide in response to detecting that a condition of the term is satisfied.

Example 89 includes the subject matter of example 88. In example 89, the drafting of the permissions guide includes a function for listing of the terms and conditions of the plurality of discovered peers.

Example 90 includes the subject matter of either of examples 88 or 89. In example 90, the drafting of the permissions guide includes a listing of the quality of service terms and conditions for the plurality of discovered peers.

Example 91 includes the subject matter of any of examples 88 to 90. In example 91, the drafting of the permissions guide includes a listing of data plane terms and conditions for the plurality of the discovered peers.

Example 92 includes the subject matter of any of examples 88 to 91. In example 92, the data plane is to indicate a process for how the data is to be supplied and consumed by the peers.

Example 93 includes the subject matter of any of examples 88 to 92. In example 93, the permissions guide includes a time-to-live.

Example 94 includes the subject matter of any of examples 88 to 93. In example 94, the permissions guide includes a protocol conversion broker to manage the joining and leaving of the permissions guide by a peer.

Example 95 includes the subject matter of any of examples 88 to 94. In example 95, executing an action of the permissions guide includes auto-commissioning of a service to a peer instructing the peer to process data.

Example 96 includes the subject matter of any of examples 88 to 95. In example 96, the permissions guide includes a preamble to manage the exchange of a configuration between the plurality of discovered peers.

Example 97 includes the subject matter of any of examples 88 to 96. In example 97, the term refers to a rate of payment to be paid between the plurality of discovered peers, and a final payment is made between peers upon a detection that a peer of the plurality of discovered peers is terminating participation in the permissions guide.

Example 98 includes an apparatus for use in an Internet-of-Things (IoT) network. The apparatus for use in an Internet-of-Things (IoT) network includes a device identity generator to generate a device identity for a device as a block-chain client, a message publisher to publish a discovery broadcast message from the device, a network applier to apply, from the device, to join a decentralized network access proxy (DNAP) network in response to the device receiving a response from a DNAP based on the published discovery broadcast message, a device describer to describe the identity and attributes of the device to the DNAP, and a packet sender to send a packet from the device through the network in response to access being granted to the device by the network based on the identity and attributes of the device.

Example 99 includes the subject matter of example 98. In example 99, the device requests tokens from the DNAP.

Example 100 includes the subject matter of either of examples 98 or 99. In example 100, tokens grant the device the ability to send and receive network data other than peer to peer.

Example 101 includes the subject matter of any of examples 98 to 100. In example 101, tokens grant the device the ability to send and receive data on a layer of an open system interconnection layer of a network.

Example 102 includes the subject matter of any of examples 98 to 101. In example 102, the packet appends a token and the combination of the packet and the token is to be sent to be DNAP for verification, where the DNAP rejects both the packet and the token in response to a detection that the token is not accepted by the DNAP.

Example 103 includes the subject matter of any of examples 98 to 102. In example 103, the token is valid to be used with at least one of a threshold number of packets, a threshold volume of data, and a threshold period of time.

Example 104 includes the subject matter of any of examples 98 to 103. In example 104, the device stores a transaction record of transactions received and sent by the device, the transaction record to be shared with the DNAP.

Example 105 includes the subject matter of any of examples 98 to 104. In example 105, the device generates keys to indicate an origin of a packet sent from the device.

Example 106 includes the subject matter of any of examples 98 to 105. In example 106, the device is a block-chain enabled device and the device stores all transactions sent by the device and received by the device on the block-chain.

Example 107 includes the subject matter of any of examples 98 to 106. In example 107, descriptions of the device attributes are stored off of a block-chain.

Example 108 includes a method for secure communication with an interne-of-things (IoT) device. The method for secure communication with an interne-of-things (IoT) device includes generating a device identity for a device as a block-chain client, publishing a discovery broadcast message from the device, applying, from the device, to join a decentralized network access proxy (DNAP) network in response to the device receiving a response from a DNAP based on the published discovery broadcast message, describing the identity and attributes of the device to the DNAP, and sending a packet from the device through the network in response to access being granted to the device by the network based on the identity and attributes of the device.

Example 109 includes the subject matter of example 108. In example 109, the device requests tokens from the DNAP.

Example 110 includes the subject matter of either of examples 108 or 109. In example 110, tokens grant the device the ability to send and receive network data other than peer to peer.

Example 111 includes the subject matter of any of examples 108 to 110. In example 111, tokens grant the device the ability to send and receive data on a layer of an open system interconnection layer of a network.

Example 112 includes the subject matter of any of examples 108 to 111. In example 112, the packet appends a token and the combination of the packet and the token is to be sent to be DNAP for verification, where the DNAP rejects both the packet and the token in response to a detection that the token is not accepted by the DNAP.

Example 113 includes the subject matter of any of examples 108 to 853. In example 113, the token is valid to be used with at least one of a threshold number of packets, a threshold volume of data, and a threshold period of time.

Example 114 includes the subject matter of any of examples 108 to 113. In example 114, the device stores a transaction record of transactions received and sent by the device, the transaction record to be shared with the DNAP.

Example 115 includes the subject matter of any of examples 108 to 114. In example 115, the device generates keys to indicate an origin of a packet sent from the device.

Example 116 includes the subject matter of any of examples 108 to 115. In example 116, the device is a block-chain enabled device and the device stores all transactions sent by the device and received by the device on the block-chain.

Example 117 includes the subject matter of any of examples 108 to 116. In example 117, descriptions of the device attributes are stored off of a block-chain.

Example 118 includes a non-transitory, machine readable medium. The non-transitory, machine readable medium includes instructions that, when executed, direct a processor to generate a device identity for a device as a block-chain client, publish a discovery broadcast message from the device, apply, from the device, to join a decentralized network access proxy (DNAP) network in response to the device receiving a response from a DNAP based on the published discovery broadcast message, describe the identity and attributes of the device to the DNAP, and send a packet from the device through the network in response to access being granted to the device by the network based on the identity and attributes of the device.

Example 119 includes the subject matter of example 118. In example 119, the device requests tokens from the DNAP.

Example 120 includes the subject matter of either of examples 118 or 119. In example 120, tokens grant the device the ability to send and receive network data other than peer to peer.

Example 121 includes the subject matter of any of examples 118 to 120. In example 121, tokens grant the device the ability to send and receive data on a layer of an open system interconnection layer of a network.

Example 122 includes the subject matter of any of examples 118 to 121. In example 122, the packet appends a token and the combination of the packet and the token is to be sent to be DNAP for verification, where the DNAP rejects both the packet and the token in response to a detection that the token is not accepted by the DNAP.

Example 123 includes the subject matter of any of examples 118 to 122. In example 123, the token is valid to be used with at least one of a threshold number of packets, a threshold volume of data, and a threshold period of time.

Example 124 includes the subject matter of any of examples 118 to 123. In example 124, the device stores a transaction record of transactions received and sent by the device, the transaction record to be shared with the DNAP.

Example 125 includes the subject matter of any of examples 118 to 124. In example 125, the device generates keys to indicate an origin of a packet sent from the device.

Example 126 includes the subject matter of any of examples 118 to 125. In example 126, the device is a block-chain enabled device and the device stores all transactions sent by the device and received by the device on the block-chain.

Example 127 includes the subject matter of any of examples 118 to 126. In example 127, descriptions of the device attributes are stored off of a block-chain.

Example 128 includes an apparatus for use in an Internet-of-Things (IoT) network. The apparatus for use in an Internet-of-Things (IoT) network includes a device registrar to register a device to a first network through a portal to a second network, where the second network is authorized to access the first network, a device joiner to join a device to a permissions guide through agreement to obligations of the permissions guide, a token requestor to request a token using a function of the permissions guide, the token identifying the device as authenticated to access the second network, and a request sender to send an authentication request from the device to the first network, wherein the first network confirms the authentication in response to detecting the token.

Example 129 includes the subject matter of example 128. In example 129, the device executes a payment exchange to a wallet in the second network.

Example 130 includes the subject matter of either of examples 128 or 129. In example 130, the request for the token results in a reservation of coins on an accounting block-chain to correspond to a token generated on a sidechain.

Example 131 includes the subject matter of any of examples 128 to 130. In example 131, the token is consumed on a sidechain in response to authentication of the device by presentation by the device of the token to the first network.

Example 132 includes the subject matter of any of examples 128 to 131. In example 132, a coin of the block-chain is released in response to detecting a token being at least one of revoked and consumed by a sidechain.

Example 133 includes the subject matter of any of examples 128 to 132. In example 133, joining the permissions guide includes providing, from the device, attributes of the device to the permissions guide for an attribute filter to validate that the attributes of the device is allowed in the first network.

Example 134 includes the subject matter of any of examples 128 to 133. In example 134, the attributes include an attribute of a user profile active while the device is joining the permissions guide.

Example 135 includes the subject matter of any of examples 128 to 134. In example 135, the token destroys itself in response to being used as a form of authorization for the device.

Example 136 includes the subject matter of any of examples 128 to 135. In example 136, the device is authorized to access the first network based on authentication to the first network that the device has credentials to access to second network.

Example 137 includes the subject matter of any of examples 128 to 136. In example 137, the authorization of the device to use the first network expires based on at least one of number of accesses, volume of data accessed through the first network, and time of granted access.

Example 138 includes a method for decentralized authorization, authentication, and accounting with an internet-of-things (IoT) device. The method for decentralized authorization, authentication, and accounting with an internet-of-things (IoT) device includes registering a device to a first network through a portal to a second network, where the second network is authorized to access the first network, joining a device to a permissions guide through agreement to obligations of the permissions guide, requesting a token using a function of the permissions guide, the token identifying the device as authenticated to access the second network, and sending an authentication request from the device to the first network, wherein the first network confirms the authentication in response to detecting the token.

Example 139 includes the method of example 138. In example 138, the device executes a payment exchange to a wallet in the second network.

Example 140 includes the subject matter of either of examples 138 or 139. In example 140, the request for the token results in a reservation of coins on an accounting block-chain to correspond to a token generated on a sidechain.

Example 141 includes the subject matter of any of examples 138 to 140. In example 141, the token is consumed on a sidechain in response to authentication of the device by presentation by the device of the token to the first network.

Example 142 includes the subject matter of any of examples 138 to 141. In example 142, a coin of the blockchain is released in response to detecting a token being at least one of revoked and consumed by a sidechain.

Example 143 includes the subject matter of any of examples 138 to 142. In example 143, joining the permissions guide includes providing, from the device, attributes of the device to the permissions guide for an attribute filter to validate that the attributes of the device is allowed in the first network.

Example 144 includes the subject matter of any of examples 138 to 143. In example 144, the attributes include an attribute of a user profile active while the device is joining the permissions guide.

Example 145 includes the subject matter of any of examples 138 to 144. In example 145, the token destroys itself in response to being used as a form of authorization for the device.

Example 146 includes the subject matter of any of examples 138 to 145. In example 146, the device is authorized to access the first network based on authentication to the first network that the device has credentials to access to second network.

Example 147 includes the subject matter of any of examples 138 to 146. In example 147, the authorization of the device to use the first network has an expires based on at least one of number of accesses, volume of data accessed through the first network, and time of granted access.

Example 148 includes a non-transitory, machine readable medium. The non-transitory, machine readable medium includes instructions that, when executed, direct a processor to register a device to a first network through a portal to a second network, where the second network is authorized to access the first network, join a device to a permissions guide through agreement to obligations of the permissions guide, request a token using a function of the permissions guide, the token identifying the device as authenticated to access the second network, and send an authentication request from the device to the first network, wherein the first network confirms the authentication in response to detecting the token.

Example 149 includes the subject matter of examples 148. In example 149, the device executes a payment exchange to a wallet in the second network.

Example 150 includes the subject matter of either of examples 148 or 149. In example 150, the request for the token results in a reservation of coins on an accounting block-chain to correspond to a token generated on a sidechain.

Example 151 includes the subject matter of any of examples 148 to 150. In example 151, the token is consumed on a sidechain in response to authentication of the device by presentation by the device of the token to the first network.

Example 152 includes the subject matter of any of examples 148 to 151. In example 152, a coin of the blockchain is released in response to detecting a token being at least one of revoked and consumed by a sidechain.

Example 153 includes the subject matter of any of examples 148 to 152. In example 153, joining the permissions guide includes providing, from the device, attributes of the device to the permissions guide for an attribute filter to validate that the attributes of the device is allowed in the first network.

Example 154 includes the subject matter of any of examples 148 to 153. In example 154, the attributes include an attribute of a user profile active while the device is joining the permissions guide.

Example 155 includes the subject matter of any of examples 148 to 154. In example 155, the token destroys itself in response to being used as a form of authorization for the device.

Example 156 includes the subject matter of any of examples 148 to 155. In example 156, the device is authorized to access the first network based on authentication to the first network by the second network that the device has credentials to access to second network.

Example 157 includes the subject matter of any of examples 148 to 156. In example 157, the authorization of the device to use the first network has an expires based on at least one of number of accesses, volume of data accessed through the first network, and time of granted access.

Example 158 includes an apparatus for use in an Internet-of-Things (IoT) network. The apparatus for use in an Internet-of-Things (IoT) network includes an identity verifier to verifying the identity of a authentication request with a decentralized application program interface (API). The apparatus also includes the authentication request received from a Remote Authentication Dial-In User Service (RADIUS) client, the decentralized API to verify the identity by sending a request to a distributed ledger and returning, to a RADIUS server a response in response to receiving an identity verification response from the distributed ledger, a response returner to return a response to the authentication request to the RADIUS client in response to receiving the response from the decentralized API, and wherein the RADIUS client makes a transaction in response to a response of authenticated identity.

Example 159 includes the subject matter of example 158. In example 159, the transaction include at least one of username, password, and metadata.

Example 160 includes the subject matter of either of examples 158 or 159. In example 160, the transaction includes a value transaction.

Example 161 includes the subject matter of any of examples 158 to 160. In example 161, the transaction is a cryptocurrency transaction.

Example 162 includes the subject matter of any of examples 158 to 161. In example 162, the authentication request comprises a request for a network address.

Example 163 includes the subject matter of any of examples 158 to 162. In example 163, the network address includes at least one of a fully qualified domain name for the RADIUS server and an internet protocol address for the RADIUS server.

Example 164 includes the subject matter of any of examples 158 to 163. In example 164, the RADIUS server verifies a public key by requesting a location of the public key from a block-chain.

Example 165 includes the subject matter of any of examples 158 to 164. In example 165, the request to a RADIUS server occurs off chain, in response to a RADIUS client receiving a confirmation of authenticated identity.

Example 166 includes the subject matter of any of examples 158 to 165. In example 166, the RADIUS server performs logging and accounting of requests the RADIUS server receives.

Example 167 includes the subject matter of any of examples 158 to 166. In example 167, the response to the authentication request is stored in to a block-chain as an immutable record.

Example 168 includes a method for decentralized authorization, authentication, and accounting with an internet-of-things (IoT) device. The method for decentralized authorization, authentication, and accounting with an internet-of-things (IoT) device includes verifying the identity of a authentication request with a distributed ledger, the authentication request received from a Remote Authentication Dial-In User Service (RADIUS) client, sending a request to a RADIUS server in response to receiving a positive identity verification response from the distributed ledger, returning a response to the authentication request to the RADIUS client in response to receiving a response from the RADIUS server, and wherein the RADIUS client makes a transaction with the RADIUS server in response to a response of authenticated identity.

Example 169 includes the subject matter of examples 168. In example 169, the transaction include at least one of username, password, and metadata.

Example 170 includes the subject matter of either of examples 168 or 169. In example 170, the transaction includes a value transaction.

Example 171 includes the subject matter of any of examples 168 to 170. In example 171, the transaction is a cryptocurrency transaction.

Example 172 includes the subject matter of any of examples 168 to 171. In example 172, the authentication request includes a request for a network address.

Example 173 includes the subject matter of any of examples 168 to 172. In example 173, the network address includes at least one of a fully qualified domain name for the RADIUS server and an internet protocol address for the RADIUS server.

Example 174 includes the subject matter of any of examples 168 to 173. In example 174, the RADIUS server verifies a public key by requesting a location of the public key from a block-chain.

Example 175 includes the subject matter of any of examples 168 to 174. In example 175, the request to a RADIUS server occurs off chain, in response to a RADIUS client receiving a confirmation of authenticated identity.

Example 176 includes the subject matter of any of examples 168 to 175. In example 176, the RADIUS server performs logging and accounting of requests the RADIUS server receives.

Example 177 includes the subject matter of any of examples 176 to 176. In example 177, the response to the authentication request is stored in to a block-chain as an immutable record.

Example 178 includes a non-transitory, machine readable medium. The non-transitory, machine readable medium includes instructions that, when executed, direct a processor to verify the identity of a authentication request with a distributed ledger, the authentication request received from a Remote Authentication Dial-In User Service (RADIUS) client, send a request to a RADIUS server in response to receiving a positive identity verification response from the distributed ledger, return a response to the authentication request to the RADIUS client in response to receiving a response from the RADIUS server, and wherein the RADIUS client makes a transaction with the RADIUS server in response to a response of authenticated identity.

Example 179 includes the subject matter of examples 178. In example 179, the transaction include at least one of username, password, and metadata.

Example 180 includes the subject matter of either of examples 178 or 179. In example 180, the transaction includes a value transaction.

Example 181 includes the subject matter of any of examples 178 to 180. In example 181, the transaction is a cryptocurrency transaction.

Example 182 includes the subject matter of any of examples 178 to 181. In example 182, the authentication request includes a request for a network address.

Example 183 includes the subject matter of any of examples 178 to 182. In example 183, the network address includes at least one of a fully qualified domain name for the RADIUS server and an internet protocol address for the RADIUS server.

Example 184 includes the subject matter of any of examples 178 to 183. In example 184, the RADIUS server verifies a public key by requesting a location of the public key from a block-chain.

Example 185 includes the subject matter of any of examples 178 to 184. In example 185, the request to a RADIUS server occurs off chain, in response to a RADIUS client receiving a confirmation of authenticated identity.

Example 186 includes the subject matter of any of examples 178 to 185. In example 186, the RADIUS server performs logging and accounting of requests the RADIUS server receives.

Example 187 includes the subject matter of any of examples 178 to 186. In example 187, the response to the authentication request is stored in to a block-chain as an immutable record.

Example 188 includes an apparatus for use in an Internet-of-Things (IoT) network. The apparatus for use in an Internet-of-Things (IoT) network includes a credential issuer to issue a credential to a caller entity, the credential including a plurality of layers of authorization structure, and an object entity provisioner to provision an object entity with an access control list specifying a reference to a target object and a permission. The apparatus also includes a credential presenter to present an authorization credential to the object entity and an access control list policy applier to apply an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 189 includes the subject matter of example 188. In example 189, the credential is a six layer permission.

Example 190 includes the subject matter of either of examples 188 or 189. In example 190, the six layer permission includes a platform layer, a device layer, a collection layer, a resource layer, a record layer, and a property layer.

Example 191 includes the subject matter of any of examples 188 to 190. In example 191, the plurality of layers includes a platform layer to reflect a physical instance of a computer and includes at least one of computational, networking, storage, sensing and actuation capabilities.

Example 192 includes the subject matter of any of examples 188 to 191. In example 192, the plurality of layers includes a device layer to reflect a logical instance of a computer including at least one of computational, networking, storage, sensing and actuation capabilities.

Example 193 includes the subject matter of any of examples 188 to 192. In example 193, the plurality of layers includes a collection layer to a logical structure of a resource, where the resource includes a logical structure for a record, where the record includes a logical structure of a property, and where the property includes at least one of an atomic data structure and a complex data structure.

Example 194 includes the subject matter of any of examples 188 to 193. In example 194, the property is a complex data structure, and the complex data structure is for a structure definable using a data modeling language.

Example 195 includes the subject matter of any of examples 188 to 194. In example 195, the property includes an atomic data structure, and the atomic data structure is at least one of a string, a number, and a date.

Example 196 includes the subject matter of any of examples 188 to 195. In example 196, the authorization credential to the object entity is limited by limitations placed on the object by a physicality of object data based on a Create, Read, Update, Delete, and Notify (CRUDN) life cycle notification.

Example 197 includes the subject matter of any of examples 188 to 196. In example 197, the credential indicates installation by a manufacturer.

Example 198 includes a method for access control in an IoT object. The method for access control in an IoT object includes issuing a credential to a caller entity, the credential including a plurality of layers of authorization structure, provisioning an object entity with an access control list specifying a reference to a target object and a permission, presenting an authorization credential to the object entity, and applying an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 199 includes the subject matter of example 198. In example 199, the credential is a six layer permission.

Example 200 includes the subject matter of either of examples 198 or 199. In example 200, the six layer permission includes a platform layer, a device layer, a collection layer, a resource layer, a record layer, and a property layer.

Example 201 includes the subject matter of any of examples 198 to 200. In example 201, the plurality of layers includes a platform layer to reflect a physical instance of a computer and includes at least one of computational, networking, storage, sensing and actuation capabilities.

Example 202 includes the subject matter of any of examples 198 to 201. In example 202, the plurality of layers includes a device layer to reflect a logical instance of a computer including at least one of computational, networking, storage, sensing and actuation capabilities.

Example 203 includes the subject matter of any of examples 198 to 202. In example 203, the plurality of layers includes a collection layer to a logical structure of a resource, where the resource includes a logical structure for a record, where the record includes a logical structure of a property, and where the property includes at least one of an atomic data structure and a complex data structure.

Example 204 includes the subject matter of any of examples 198 to 203. In example 204, the property is a complex data structure, and the complex data structure is for a structure definable using a data modeling language.

Example 205 includes the subject matter of any of examples 198 to 204. In example 205, the property includes an atomic data structure, and the atomic data structure is at least one of a string, a number, and a date.

Example 206 includes the subject matter of any of examples 198 to 205. In example 206, the authorization credential to the object entity is limited by limitations placed on the object by a physicality of object data based on a Create, Read, Update, Delete, and Notify (CRUDN) life cycle notification.

Example 207 includes the subject matter of any of examples 198 to 206. In example 207, the credential indicates installation by a manufacturer.

Example 208 includes a non-transitory, machine readable medium. The non-transitory, machine readable medium includes instructions that, when executed, direct a processor to issue a credential to a caller entity, the credential including a plurality of layers of authorization structure, provision an object entity with an access control list specifying a reference to a target object and a permission, present an authorization credential to the object entity, and apply an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 209 includes the subject matter of examples 208. In example 209, the credential is a six layer permission.

Example 210 includes the subject matter of either of examples 208 or 209. In example 210, the six layer permission includes a platform layer, a device layer, a collection layer, a resource layer, a record layer, and a property layer.

Example 211 includes the subject matter of any of examples 208 to 210. In example 211, the plurality of layers includes a platform layer to reflect a physical instance of a computer and includes at least one of computational, networking, storage, sensing and actuation capabilities.

Example 212 includes the subject matter of any of examples 208 to 211. In example 212, the plurality of layers includes a device layer to reflect a logical instance of a computer including at least one of computational, networking, storage, sensing and actuation capabilities.

Example 213 includes the subject matter of any of examples 208 to 212. In example 213, the plurality of layers includes a collection layer to a logical structure of a resource, where the resource includes a logical structure for a record, where the record includes a logical structure of a property, and where the property includes at least one of an atomic data structure and a complex data structure.

Example 214 includes the subject matter of any of examples 208 to 213. In example 214, the property is a complex data structure, and the complex data structure is for a structure definable using a data modeling language.

Example 215 includes the subject matter of any of examples 208 to 214. In example 215, the property includes an atomic data structure, and the atomic data structure is at least one of a string, a number, and a date.

Example 216 includes the subject matter of any of examples 208 to 215. In example 216, the authorization credential to the object entity is limited by limitations placed on the object by a physicality of object data based on a Create, Read, Update, Delete, and Notify (CRUDN) life cycle notification.

Example 217 includes the subject matter of any of examples 208 to 216. In example 217, the credential indicates installation by a manufacturer.

Example 218 includes an apparatus including means to perform a method as in any other Example.

Example 219 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising:
   at least one memory;
   machine readable instructions; and
   processor circuitry to execute the machine readable instructions to:
      generate a permissions guide associated with access to a decentralized network;
      obtain a request from a first device to join the decentralized network as a blockchain client, the request including at least one of a first attribute or an identity of the first device, the decentralized network including network devices that are authorized to access a private blockchain, the authorization to occur before the request;
      authenticate the first device to access the decentralized network based on a comparison of at least one of the first attribute or the identity to authentication data in the permissions guide, the permissions guide to reflect the authorization of access to the decentralized network by the network devices;
      record a blockchain transaction in the blockchain after an authentication of the first device based on the comparison, the blockchain transaction associated with network data sent from the first device; and
      cause transmission of the network data from the first device to a second device via the decentralized network.

2. The apparatus of claim 1, wherein the permissions guide is off of the blockchain.

3. The apparatus of claim 1, wherein the processor circuitry is to determine that the request is for an issuance of a token to the first device, the token associated with an authorization of the first device to at least one of send or receive the network data via the decentralized network.

4. The apparatus of claim 3, wherein the processor circuitry is to generate the token as a data object that describes a function associated with the decentralized network, the function to correspond to at least one of sending or receiving the network data via the decentralized network, and the data object includes at least one of a number, a constant, an identifier, an operator, a reserved word, a separator, or a preamble.

5. The apparatus of claim 1, wherein the processor circuitry is to:
   determine that the network data includes an encryption key;

identify the first device as an origin of the network data based on the encryption key; and record the encryption key as part of the blockchain transaction in the blockchain.

6. The apparatus of claim 1, wherein the processor circuitry is to determine that the first attribute is at least one of an address, a network, a device type, a device capability, or a device feature associated with the first device.

7. The apparatus of claim 1, wherein the processor circuitry is to execute the comparison through a hardware enabled secure enclave.

8. The apparatus of claim 1, wherein the blockchain transaction is a first blockchain transaction, and the processor circuitry is to record a second blockchain transaction associated with the second device receiving the network data in the blockchain.

9. The apparatus of claim 1, wherein the network data includes a data packet, and the processor circuitry is to:
   obtain the data packet from the first device;
   identify a token appended to the data packet; and
   authenticate the first device based on at least one of the token or the data packet.

10. The apparatus of claim 9, wherein the processor circuitry is to authenticate the first device based on an identification of the token in a header of the data packet.

11. The apparatus of claim 9, wherein the processor circuitry is to:
   determine that the data packet is signed with an encryption key;
   identify an association of the first device and the encryption key; and
   authenticate the first device based on the association.

12. The apparatus of claim 9, wherein the processor circuitry is to:
   generate a negative acknowledgment data packet after a determination that at least one of the token or a portion of the data packet is not valid; and
   send the negative acknowledgment data packet to the first device.

13. The apparatus of claim 12, wherein the processor circuitry is to execute the determination based on a validity of the token for at least one of a threshold number of packets, a threshold volume of data, or a threshold period of time.

14. The apparatus of claim 1, wherein the processor circuitry is to generate the permissions guide to define at least one of a first technique for joining the decentralized network, a second technique for leaving the decentralized network, a third technique for generating a token associated with a function of the decentralized network, a time constraint associated with the function, a quality of service associated with the function, or a quality of data associated with the function.

15. At least one storage disk or device comprising instructions that, when executed, cause processor circuitry to at least:
   generate a permissions guide associated with access to a decentralized network;
   obtain a request from a first device to join the decentralized network as a blockchain client, the request including at least one of a first attribute or an identity of the first device, the decentralized network including network devices that are authorized to access a private blockchain, the authorization to occur prior to the request;
   validate the first device to access the decentralized network based on a comparison of at least one of the first attribute or the identity to authentication data in the permissions guide, the permissions guide to reflect the authorization of access to the decentralized network by the network devices;
   cause storage of a blockchain transaction in the blockchain after a validation of the first device based on the comparison, the blockchain transaction associated with network data transmitted from the first device; and
   facilitate transmission of the network data from the first device to a second device via the decentralized network.

16. The at least one storage disk or device of claim 15, wherein the instructions, when executed, cause the processor circuitry to determine that the request is for an issuance of a token to the first device, the token associated with an authorization of the first device to at least one of send or receive the network data via the decentralized network.

17. The at least one storage disk or device of claim 16, wherein the instructions, when executed, cause the processor circuitry to generate the token as a data object that describes a function associated with the decentralized network, the function to correspond to at least one of sending or receiving the network data via the decentralized network, and the data object includes at least one of a number, a constant, an identifier, an operator, a reserved word, a separator, or a preamble.

18. The at least one storage disk or device of claim 15, wherein the instructions, when executed, cause the processor circuitry to:
   locate an encryption key in the network data;
   determine the first device as an origin of the network data based on the encryption key; and
   store the encryption key as part of the blockchain transaction in the blockchain.

19. The at least one storage disk or device of claim 15, wherein the instructions, when executed, cause the processor circuitry to identify the first attribute as at least one of an address, a network, a device type, a device capability, or a device feature associated with the first device.

20. The at least one storage disk or device of claim 15, wherein the instructions, when executed, cause the processor circuitry to execute the comparison in a hardware enabled secure enclave.

21. A method comprising:
   generating a permissions guide associated with access to a decentralized network;
   obtaining a request from a first device to join the decentralized network as a blockchain client, the request including at least one of a first attribute or an identity of the first device, the decentralized network including network devices that are authorized to access a private blockchain, the authorization to occur before the request;
   authenticating the first device to access the decentralized network based on a comparison of at least one of the first attribute or the identity to authentication data in the permissions guide, the permissions guide to reflect the authorization of access to the decentralized network by the network devices;
   recording a blockchain transaction in the blockchain after an authentication of the first device based on the comparison, the blockchain transaction associated with network data sent from the first device; and
   transmitting the network data from the first device to a second device via the decentralized network.

22. The method of claim 21, wherein the network data includes a data packet, and the method further including:
obtaining the data packet from the first device;
identifying a token appended to the data packet; and
authenticating the first device based on at least one of the token or the data packet.

23. The method of claim 22, further including:
determining that the data packet is signed with an encryption key;
identifying an association of the first device and the encryption key; and
authenticating the first device based on the association.

24. The method of claim 22, further including:
creating a negative acknowledgment data packet after a determination that at least one of the token or a portion of the data packet is not valid; and
transmitting the negative acknowledgment data packet to the first device.

25. The method of claim 24, wherein the determination is based on a validity of the token for at least one of a threshold number of packets, a threshold volume of data, or a threshold period of time.

26. The method of claim 21, wherein the permissions guide is to define at least one of a first technique for joining the decentralized network, a second technique for leaving the decentralized network, a third technique for generating a token associated with a function of the decentralized network, a time constraint associated with the function, a quality of service associated with the function, or a quality of data associated with the function.

* * * * *